US012765557B2

(12) United States Patent
Sekiguchi et al.

(10) Patent No.: US 12,765,557 B2
(45) Date of Patent: Oct. 20, 2026

(54) CERIUM OXIDE NANOPARTICLE, DISPERSION SOLUTION, ANTIVIRAL AGENT, ANTIBACTERIAL AGENT, RESIN COMPOSITION, RESIN PRODUCT, FIBER MATERIAL, FIBER PRODUCT, AND METHOD OF PRODUCING CERIUM OXIDE NANOPARTICLE

(71) Applicant: Toray Industries, Inc., Tokyo (JP)

(72) Inventors: Shota Sekiguchi, Kamakura (JP); Takahiro Motoshiromizu, Kamakura (JP); Yoichiro Koshi, Kamakura (JP); Masateru Ito, Kamakura (JP); Akira Saito, Ichihara (JP); Yetao Song, Nagoya (JP); Hideaki Karasaki, Otsu (JP); Yoshiaki Kokubo, Otsu (JP)

(73) Assignee: Toray Industries, Inc., Tokyo (JP)

( * ) Notice: Subject to any disclaimer, the term of this patent is extended or adjusted under 35 U.S.C. 154(b) by 211 days.

(21) Appl. No.: 18/696,281

(22) PCT Filed: Sep. 28, 2022

(86) PCT No.: PCT/JP2022/036129

§ 371 (c)(1),
(2) Date: Mar. 27, 2024

(87) PCT Pub. No.: WO2023/054456

PCT Pub. Date: Apr. 6, 2023

(65) Prior Publication Data

US 2025/0000097 A1 Jan. 2, 2025

(30) Foreign Application Priority Data

| | | |
|---|---|---|
| Sep. 29, 2021 | (JP) | 2021-160105 |
| Nov. 24, 2021 | (JP) | 2021-190336 |
| Mar. 18, 2022 | (JP) | 2022-044631 |

(51) Int. Cl.

| | |
|---|---|
| ***A01N 59/16*** | (2006.01) |
| ***A01N 25/04*** | (2006.01) |
| ***A01N 25/22*** | (2006.01) |
| ***B82Y 40/00*** | (2011.01) |
| ***C01F 17/235*** | (2020.01) |
| ***C08K 3/22*** | (2006.01) |
| ***D06M 11/47*** | (2006.01) |

(52) U.S. Cl.

CPC ............. *A01N 59/16* (2013.01); *A01N 25/04* (2013.01); *A01N 25/22* (2013.01); *C01F 17/235* (2020.01); *C08K 3/22* (2013.01); *D06M 11/47* (2013.01); *B82Y 40/00* (2013.01); *C01P 2002/72* (2013.01); *C01P 2004/64* (2013.01); *C08K 2003/2213* (2013.01); *C08K 2201/002* (2013.01); *C08K 2201/005* (2013.01); *C08K 2201/011* (2013.01)

(58) Field of Classification Search

CPC ........ A01N 59/16; A01N 25/04; A01N 25/22; C01F 17/235; C08K 3/22; C08K 2003/2213; C08K 2201/002; C08K 2201/005; C08K 2201/011; C08K 3/015; D06M 11/47; B82Y 40/00; B82Y 5/00; C01P 2002/72; C01P 2004/64; D01F 1/10; D01F 1/103; A01P 1/00; A01P 3/00; C08L 101/00; D10B 2401/13

See application file for complete search history.

(56) References Cited

U.S. PATENT DOCUMENTS

| | | | |
|---|---|---|---|
| 2003/0114083 | A1 | 6/2003 | Jernakoff et al. |
| 2013/0273659 | A1 | 10/2013 | Costanzo et al. |
| 2016/0263557 | A1 | 9/2016 | Bang et al. |
| 2020/0331795 | A1 | 10/2020 | Ranasinghe et al. |
| 2022/0030857 | A1 | 2/2022 | Sekiguchi et al. |
| 2023/0030648 | A1 | 2/2023 | Sekiguchi et al. |

FOREIGN PATENT DOCUMENTS

| | | | |
|---|---|---|---|
| CN | 104258839 | A | 1/2015 |
| CN | 108821324 | A | 11/2018 |
| CN | 113194932 | A | 7/2021 |
| JP | 2003-183631 | A | 7/2003 |
| JP | 2005-193237 | A | 7/2005 |
| JP | 2019-127405 | A | 8/2019 |
| WO | 2020/129963 | | 6/2020 |
| WO | 2021/132628 | A1 | 7/2021 |
| WO | 2021/132643 | A1 | 7/2021 |

OTHER PUBLICATIONS

Sekiguchi et al. (WO2020129963A1 Machine English translation) (Year: 2020).*

International Search Report dated Dec. 13, 2022, of counterpart International Application No. PCT/JP2022/036129 along with an English translation.

Masui, T. et al., "Synthesis of cerium oxide nanoparticles by hydrothermal crystallization with citric acid," *Journal of Materials Science Letters,* 2002, vol. 21, pp. 489-491.

Alpaslan, E. et al., "pH-Controlled Cerium Oxide Nanoparticle Inhibition of Both Gram-Positive and Gram-Negative Bacteria Growth," *Scientific Reports,* 2017, 7:45859, pp. 1-12.

Office Action dated Apr. 1, 2026, from counterpart Chinese Application No. 202280065453.5.

* cited by examiner

*Primary Examiner* — Robert A Wax
*Assistant Examiner* — Quanglong N Truong
(74) *Attorney, Agent, or Firm* — DLA Piper LLP (US)

(57) ABSTRACT

A cerium oxide nanoparticle includes a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein an APHA of a 1 mass % dispersion solution is 400 or less.

22 Claims, 14 Drawing Sheets

| | HAVING PIPERAZINE SKELETON IN MAIN CHAIN | HAVING PIPERAZINE SKELETON IN SIDE CHAIN |
|---|---|---|
| VINYL-BASED POLYMER | FIG.2(a) 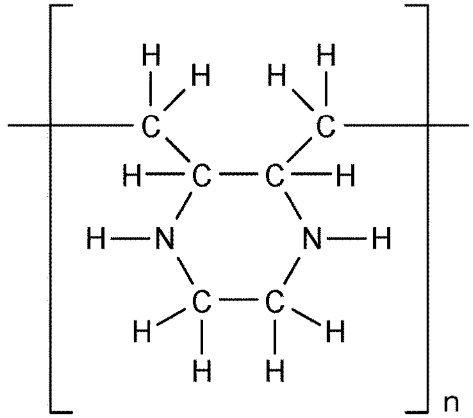 | FIG.2(b) 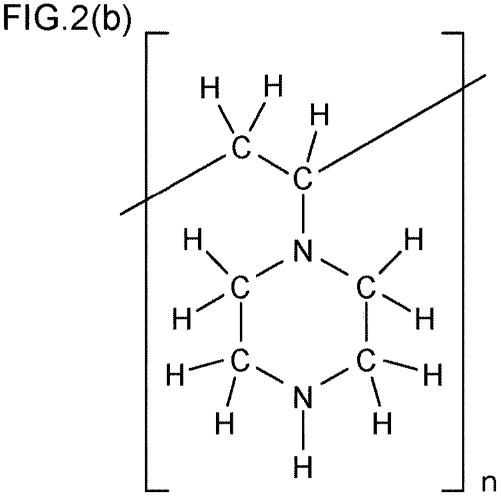 |
| POLY-AMIDE | FIG.2(c) 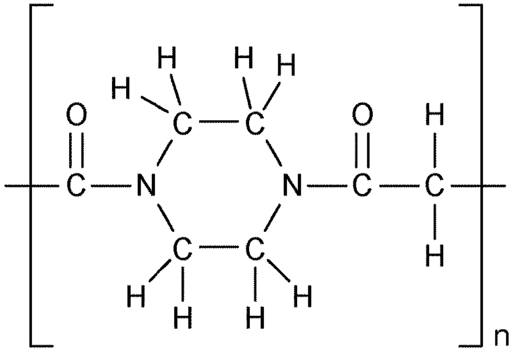 | FIG.2(d) 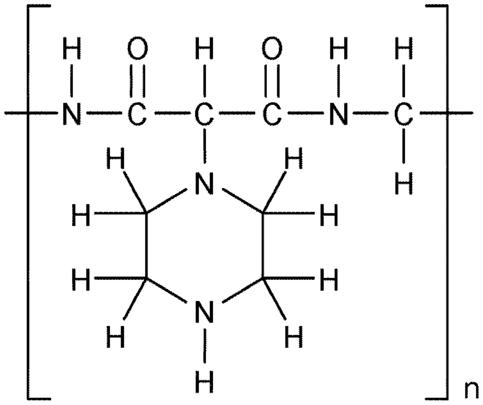 |
n IS OPTIONAL INTEGER

CERIUM OXIDE NANOPARTICLE, DISPERSION SOLUTION, ANTIVIRAL AGENT, ANTIBACTERIAL AGENT, RESIN COMPOSITION, RESIN PRODUCT, FIBER MATERIAL, FIBER PRODUCT, AND METHOD OF PRODUCING CERIUM OXIDE NANOPARTICLE

TECHNICAL FIELD

This disclosure relates to a cerium oxide nanoparticle, a dispersion solution containing the nanoparticle, an antiviral agent and an antibacterial agent containing the nanoparticle or the dispersion solution, a method of producing the cerium oxide nanoparticle, and a resin composition, a resin product, a fiber material, and a fiber product containing the cerium oxide nanoparticle.

BACKGROUND

In recent years, with increasing awareness of safety and health management, antibacterial technologies for decomposing harmful substances and microorganisms have attracted attention. For example, titanium oxide has a property of oxidatively decomposing organic substances through its photocatalytic characteristics, and the performance thereof is evaluated in the degradation reaction of organic dyes or the like. Such oxidative degradation characteristics are expected to be used, in addition to the use as an antibacterial agent, for decomposing low-molecular weight substances such as acetaldehyde and ammonia as well as various harmful substances such as allergens and viruses.

On the other hand, a cerium oxide nanoparticle (nanoceria) has the same catalytic activities as those of oxidizing enzymes such as an oxidase or a peroxidase, and thus is expected to be applied as an oxidizing agent. Such catalytic activities do not require a special light source such as ultraviolet rays, and thus the cerium oxide nanoparticle can be expected to be developed to applications for decomposing harmful substances even in places where titanium oxide is difficult to be used such as indoor and dark places.

In the production of the nanoparticle, a method of allowing a stabilizer to coexist with the nanoparticle to thereby prevent aggregation of the nanoparticles and stably disperse the nanoparticles is used. In the cerium oxide nanoparticle, for example, a particle dispersion solution is obtained by oxidizing a cerium (III) ion with hydrogen peroxide using polyacrylic acid as a stabilizer, or a particle dispersion solution is obtained by alkali neutralization of a cerium (III) ion in an aqueous ammonia using dextran as a stabilizer.

US 2013/0273659 A1 discloses a cerium oxide nanoparticle using an amino acid as a stabilizer. US 2013/0273659 A1 describes that among amino acids, particularly when lysine or arginine is used as a stabilizer as a basic amino acid, the zeta potential of the nanoparticle increases. US 2013/0273659 A1 describes that the cerium oxide nanoparticle obtained is colored in yellow.

In addition, WO 2021/132643 A1 discloses a cerium oxide nanoparticle using an alicyclic amine as a stabilizer. WO 2021/132643 A1 describes that high oxidation performance is obtained by using piperazine or HEPES as a stabilizer. WO 2021/132643 A1 describes that the cerium oxide nanoparticle obtained is colored in orange.

WO 2021/132628 A1 discloses a cerium oxide nanoparticle using an aromatic heterocyclic compound containing a nitrogen atom in the ring structure thereof as a stabilizer. WO 2021/132628 A1 describes that high oxidation performance is obtained by using pyridine or imidazole as a stabilizer. WO 2021/132628 A1 describes that the cerium oxide nanoparticle obtained is colored in orange.

WO 2020/129963 A1 describes a cerium oxide nanoparticle having a surface covered with a vinyl-based polymer having a heterocyclic amine skeleton or a polyamide having a heterocyclic amine skeleton. WO 2020/129963 A1 describes that the nanoparticle has a high ratio of $Ce^{4+}$ and has oxidation performance and an antiviral activity. WO 2020/129963 A1 describes that the cerium oxide nanoparticle obtained is colored in orange.

Further, JP 2003-183631 A discloses a polishing composition containing colloidal ceria whose surface is modified with boric acid. JP 2003-183631 A describes that the particles are stably dispersed over a wide pH range by being negatively charged. JP 2003-183631 A describes that the cerium oxide nanoparticle obtained is colored in orange.

T. Masui et. al., *Journal of Materials Science Letters* 2002, 21, 489 discloses a cerium oxide nanoparticle using citric acid as a stabilizer. T. Masui et. al., *Journal of Materials Science Letters* 2002, 21, 489 describes that the crystallinity of the particle is improved by heating at 50° C. and hydrothermal treatment at 80°° C. T. Masui et. al., *Journal of Materials Science Letters* 2002, 21, 489 describes that the cerium oxide nanoparticle obtained is colored in brown.

E. Alpaslan et. al., *Scientific Reports* 2017, 7:45859 discloses a cerium oxide nanoparticle using dextran as a stabilizer. E. Alpaslan et. al., *Scientific Reports* 2017, 7:45859 describes that the particle has an antibacterial activity. E. Alpaslan et. al., *Scientific Reports* 2017, 7:45859 describes that the cerium oxide nanoparticle obtained is colored in brown.

We studied developing a cerium oxide nanoparticle that effectively decomposes harmful substances and microorganisms. However, in the cerium oxide nanoparticles containing lysine, HEPES, imidazole, and polyvinylimidazole as a stabilizer, described in US 2013/0273659 A1, WO 2021/132643 A1, WO 2021/132628 A1, WO 2020/129963 A1, the particle dispersion solution is colored orange. For this reason, to spray the nanoparticle produced using the dispersion solution as an antibacterial agent or an antiviral agent or to combine the nanoparticle with a base material such as a resin or a fiber, the use thereof is limited, and therefore improvement in coloring property is required. Even when boric acid disclosed in JP 2003-183631 A is used as a stabilizer to produce a dispersion solution by the methods of US 2013/0273659 A1, WO 2021/132643 A1, WO 2021/132628 A1, WO 2020/129963 A1, the orange coloration is not improved. In the cerium oxide nanoparticle containing citric acid as a stabilizer in T. Masui et. al., *Journal of Materials Science Letters* 2002, 21, 489 and the cerium oxide nanoparticle containing dextran as a stabilizer in E. Alpaslan et. al., *Scientific Reports* 2017, 7:45859, the particle dispersion solution is colored brown, and improvement in coloring property is required similarly. From such results, we sought to find a cerium oxide nanoparticle having an excellent antibacterial activity and antiviral activity and a low coloring property.

SUMMARY

We focused on a process of producing a cerium oxide nanoparticle and a stabilizer. As a result, we found that the coloring property is improved by adding an oxidizing agent to a solution containing a basic amino acid, an alicyclic amine, an aromatic heterocyclic compound containing a nitrogen atom in the ring structure thereof, a polymer having a heterocyclic amine skeleton or a boron compound as a stabilizer, and a cerium (III) ion, and subjecting the resulting solution to a hydrothermal treatment. The obtained nanoparticle has features of having a maximum absorption of more than 5,729 eV and 5,731 eV or less and 5,735 eV or more and 5,739 eV or less in an XANES spectrum, and having a molar ratio of $Ce^{4+}$ to $Ce^{3+}$ of 40:60 to 100:0. In addition, the obtained nanoparticle has features of having diffraction peaks at Bragg angles (2θ) of 27° to 29°, 31° to 33°, 46° to 48°, and 55° to 57° in an XRD spectrum, and having a peak intensity ratio of the peak intensity at 27° to 29° to the peak intensity at 46° to 48° of 1.8 or less. We also found that the nanoparticle has a positive zeta potential when formed into a dispersion solution and has high antibacterial activity and antiviral activity.

We thus provide:

(1) A cerium oxide nanoparticle including a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein an APHA of a 1 mass % dispersion solution is 400 or less.

(2) The cerium oxide nanoparticle according to (1), wherein the cerium oxide nanoparticle has a zeta potential at pH 7 of +10 mV or more.

(3) The cerium oxide nanoparticle according to (1) or (2), wherein the cerium oxide nanoparticle has a molar ratio of $Ce^{4+}$ to $Ce^{3+}$ of 40:60 to 100:0.

(4) A cerium oxide nanoparticle including a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein the cerium oxide nanoparticle has a maximum absorption of more than 5,729 eV and 5,731 eV or less and 5,735 to 5,739 eV in a Ce L3 edge XANES spectrum obtained by measurement of an X-ray absorption fine structure spectrum, and has a molar ratio of $Ce^{4+}$ to $Ce^{3+}$ of 40:60 to 100:0.

(5) A cerium oxide nanoparticle including a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein the cerium oxide nanoparticle has diffraction peaks at Bragg angles (2θ) of 27° to 29°, 31° to 33°, 46° to 48°, and 55° to 57° in an XRD spectrum, and has a peak intensity ratio of a peak intensity at 27° to 29° to a peak intensity at 46° to 48° of 1.8 or less.

(6) The cerium oxide nanoparticle according to any one of (1) to (5), wherein the alicyclic amine is represented by general formula (I):

(I)

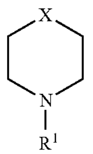

wherein X represents $NR^2$, O, or S, $R^1$ and $R^2$ represent a hydrogen atom, an alkyl group having 1 to 4 carbon atoms, a hydroxyalkyl group having 1 to 4 carbon atoms, an aminoalkyl group having 1 to 4 carbon atoms, or an alkyl sulfonate group having 1 to 4 carbon atoms, and $R^1$ and $R^2$ are optionally the same or different.

(7) The cerium oxide nanoparticle according to any one of (1) to (5), wherein the aromatic heterocyclic compound containing the nitrogen atom in the ring structure of the aromatic heterocyclic compound is an aromatic heterocyclic compound having no substituent or having at least one substituent selected from the group consisting of a methyl group, an ethyl group, an amino group, an aminomethyl group, a monomethylamino group, a dimethylamino group, and a cyano group, and containing 2 to 8 carbon atoms and 1 to 4 nitrogen atoms in the ring structure of the aromatic heterocyclic compound.

(8) The cerium oxide nanoparticle according to any one of (1) to (5), wherein the polymer having the heterocyclic amine skeleton is a vinyl-based polymer having a heterocyclic amine skeleton or a polyamide having a heterocyclic amine skeleton.

(9) The cerium oxide nanoparticle according to any one of (1) to (5), wherein the boron compound is represented by general formula (II):

$$BR_n(OR')_{3-n} \quad \text{(II)}$$

wherein n is an integer of 0 to 2, R represents any of an alkyl group having 1 to 4 carbon atoms, a phenyl group, or a tolyl group, R' represents any of hydrogen, an alkyl group having 1 to 4 carbon atoms, a phenyl group, or a tolyl group, and when a plurality of Rs or R's are present, the plurality of Rs or R's are optionally the same or different.

(10) The cerium oxide nanoparticle according to any one of (1) to (9), wherein the cerium oxide nanoparticle has a particle size of 1 to 300 nm.

(11) A dispersion solution including the cerium oxide nanoparticle according to any one of (1) to (10).

(12) An antiviral agent including the cerium oxide nanoparticle according to any one of (1) to (10) or the dispersion solution according to (11).

(13) An antibacterial agent including the cerium oxide nanoparticle according to any one of (1) to (10) or the dispersion solution according to (11).

(14) A resin composition including the cerium oxide nanoparticle according to any one of (1) to (10).

(15) A resin product including the resin composition according to (14).

(16) The resin product according to (15), wherein the resin product is selected from the group consisting of an automobile interior material, an electrical appliance housing, a strap, a handrail, a door knob, and a partition plate.

(17) A fiber material including the cerium oxide nanoparticle according to any one of (1) to (10).

(18) The fiber material according to (17), wherein the fiber material has a water pressure resistance of 500 $mmH_2O$ or more.

(19) A fiber product including the fiber material according to (17) or (18).

(20) The fiber product according to (18), wherein the fiber product is selected from the group consisting of a mask, a protective clothing, a filter, a mat, a chair, a gown, a white coat, a curtain, a sheet, an automobile interior material, and a wipe.

(21) A method of producing a cerium oxide nanoparticle, including:

step a) adding an oxidizing agent to a solution containing a basic amino acid, an alicyclic amine, an aromatic heterocyclic compound containing a nitrogen atom in a ring structure of the aromatic heterocyclic compound, a polymer having a heterocyclic amine skeleton or a boron compound, and a cerium (III) ion; and step b) subjecting a solution obtained in step a) to a hydrothermal treatment.

(22) The method of producing a cerium oxide nanoparticle according to (21), wherein an APHA of a 1 mass % dispersion solution of the cerium oxide nanoparticle is 400 or less.

Both the cerium oxide nanoparticle and the dispersion solution containing the nanoparticle have a feature of having a lower coloring property than conventional cerium oxide nanoparticles. In addition, the cerium oxide nanoparticle and the dispersion solution containing the nanoparticle are excellent in antibacterial activity and antiviral activity, and can be used as a high-performance antiviral agent and antibacterial agent that inactivate viruses and bacterium. In addition, the resin composition and the fiber material containing the cerium oxide nanoparticle have a feature of having a lower coloring property than a resin composition and a fiber material containing conventional cerium oxide nanoparticles.

BRIEF DESCRIPTION OF THE DRAWINGS

FIGS. 2(*a*)-2(*d*) are views illustrating the structures of polymers having a piperazine skeleton.

DETAILED DESCRIPTION

Figure 1A:
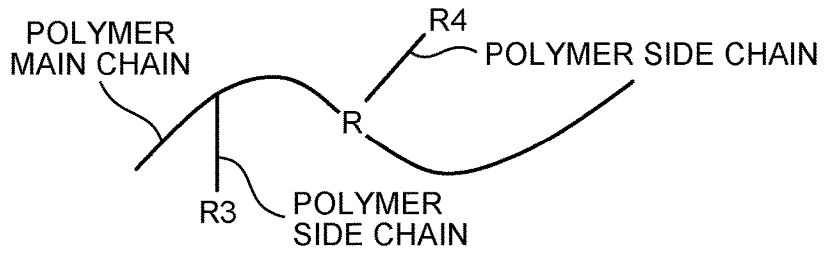
FIGS. 1(*a*) to 1(*c*) are views illustrating the structures of polymers.

The cerium oxide nanoparticle may be described as the nanoparticle or our nanoparticle, and the dispersion solution containing the cerium oxide nanoparticle may be described as the dispersion solution or our dispersion solution.

Cerium Oxide Nanoparticle

The nanoparticle has a feature of having a low coloring property when formed into a dispersion solution. Conventionally known cerium oxide nanoparticles are colored in yellow, orange, red, brown or the like when formed into a dispersion solution, but our dispersion solution containing the nanoparticle is transparent or very pale yellow.

The 1 mass % dispersion solution of the nanoparticle exhibits a value of 400 or less as evaluated by the Hazen color number (APHA). The APHA is known as an index capable of evaluating an unknown coloring causative substance with high sensitivity.

In the dispersion solution of the cerium oxide nanoparticle, which has been adjusted to 1 mass %, the APHA at which the coloring is improved may be 400 or less, preferably 300 or less, more preferably 250 or less, and most preferably 200 or less.

The APHA is measured according to the method specified in JIS, or measured by a commercially available measuring device. The APHA can be measured by using, for example, OME2000 manufactured by Nippon Denshoku Industries Co., Ltd.

The APHA is measured using a dispersion solution containing nanoparticles. The measurement is performed at 25° C. with the particle concentration adjusted to 1 mass % and the pH adjusted to 2 to 12. When the particle concentration is low, the concentration is adjusted by membrane concentration or evaporation, and when the particle concentration is high, the concentration is adjusted by dilution with a solvent. In the measurement, when the particle concentration of the dispersion solution is known, the concentration may be adjusted by the above methods. When the concentration of cerium oxide is unknown, for example, the cerium ion concentration is determined by ICP emission spectrometry (ICP-OES) or ICP mass spectrometry (ICP-MS), and the cerium oxide concentration is determined on the assumption that all the cerium ions are $CeO_2$, and the concentration is adjusted. When the nanoparticle is in the form of a dispersion solution and does not contain impurities that affect the value of the APHA, the APHA of only a solvent (for example, water) constituting the dispersion solution is measured as a reference, and then the APHA of the dispersion solution may be measured. When the dispersion solution contains a compound that affects the value of the APHA other than the nanoparticle containing cerium oxide, the measurement may be performed after removing the compound by membrane purification or the like. When the compound that affects the value of the APHA is difficult to remove, a solution containing the compound is measured as a reference, and the APHA may be measured from the difference. When debris is contained other than cerium oxide, a supernatant obtained by removing the debris by centrifugation can be measured. It is also possible to perform the measurement after ultrasonic treatment of the dispersion solution.

When the nanoparticle is a powder, the nanoparticle is redispersed in a solvent, and then measurement is performed. The solvent is selected from hexane, ethyl acetate, chloroform, methanol, ethanol, DMSO, water, or a mixed solvent thereof. Among them, water is preferably used, but the pH can be adjusted to increase dispersibility, or a mixed solvent with an organic solvent compatible with water such as methanol, ethanol, or DMSO can be used. When a mixed solvent is used, the mixing ratio thereof may be water: organic solvent=1:99 to 99:1. When the dispersibility of the nanoparticle in a polar solvent is low, hexane, ethyl acetate, or chloroform can also be used. To promote dispersion, heating and/or cooling, or ultrasonic treatment can also be performed.

In the production of the cerium oxide nanoparticle, a salt of a water-soluble cerium is used as one of raw materials, and the production is performed with water or a solvent compatible with water.

The stabilizer used is a compound that has moderate hydrophilicity and has properties such as forming a complex with a metal ion, forming a crystal nucleus of a nanoparticle by being coordinated with a hydroxyl group, and stably dispersing the formed nanoparticle. As the stabilizer, a basic amino acid (A), an alicyclic amine (B), an aromatic heterocyclic compound (C) containing a nitrogen atom in the ring structure thereof, a polymer (D) having a heterocyclic amine skeleton, or a boron compound (E) is used.

(A) Basic Amino Acid

Specific examples of the basic amino acid (A) used as the stabilizer include lysine, arginine, histidine, and tryptophan. These may be any of D-form and L-form optical isomers, or may be a mixture thereof.

(B) Alicyclic Amine

Examples of the alicyclic amine (B) used as the stabilizer include an alicyclic amine represented by chemical formula (I).

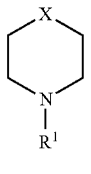

(I)

In formula (I), X represents $NR^2$, O, or S, and $R^1$ and $R^2$ represent a hydrogen atom, an alkyl group having 1 to 4 carbon atoms, a hydroxyalkyl group having 1 to 4 carbon atoms, an aminoalkyl group having 1 to 4 carbon atoms, or an alkyl sulfonate group having 1 to 4 carbon atoms. $R^1$ and $R^2$ are optionally the same or different.

As a more preferred example of the alicyclic amine (B) used as the stabilizer, in chemical formula (I), X represents $NR^2$ or O, and $R^1$ and $R^2$ represent a hydrogen atom, an alkyl group having 1 to 2 carbon atoms, a hydroxyalkyl group having 2 to 3 carbon atoms, an aminoalkyl group having 2 to 3 carbon atoms, or an alkyl sulfonate group having 2 to 3 carbon atoms. $R^1$ and $R^2$ are optionally the same or different.

As an example, such an alicyclic amine (B) includes piperazine, 1-methylpiperazine, N,N'-dimethylpiperazine, 1-ethylpiperazine, N,N'-diethylpiperazine, 1-(2-hydroxyethyl)piperazine, 1,4-bis(2-hydroxyethyl)piperazine, N-(2-aminoethyl) piperazine, 1,4-bis(2-aminoethyl)piperazine, 2-[4-(2-hydroxyethyl)-1-piperazinyl]ethanesulfonic acid, piperazine-1,4-bis(2-ethanesulfonic acid), morpholine, 4-methylmorpholine, 4-ethylmorpholine, 4-(2-aminoethyl) morpholine, 4-(2-hydroxyethyl)morpholine, 2-morpholinoethanesulfonic acid, and 3-morpholinopropanesulfonic acid.

(C) Aromatic Heterocyclic Compound

Examples of the aromatic heterocyclic compound (C) containing a nitrogen atom in the ring structure thereof used as the stabilizer include aromatic heterocyclic compounds containing 2 to 8 carbon atoms and 1 to 4 nitrogen atoms in the ring structure thereof. In addition, at least one of the nitrogen atoms preferably has an electron lone pair not included in the x conjugated system. A more preferred example of the aromatic heterocyclic compound includes a monocyclic or bicyclic compound having a 5-membered ring or a 6-membered ring structure in addition to the above characteristics. As an example, such an aromatic heterocyclic compound includes pyrazole, imidazole, triazole, pyridine, pyridazine, pyrimidine, pyrazine, triazine, tetrazine, indazole, benzimidazole, azaindole, pyrazolopyrimidine, purine, benzotriazole, quinoxaline, cinnoline, quinazoline, phthalazine, naphthyridine, and pteridine. The aromatic heterocyclic compound may also be a derivative having a substituent such as a methyl group, an ethyl group, an amino group, an aminomethyl group, a monomethylamino group, a dimethylamino group, or a cyano group as a substituent that does not significantly change the form of complex formation or the solubility in the reaction solvent.

(D) Polymer Having Heterocyclic Amine Skeleton

Examples of the polymer (D) having a heterocyclic amine skeleton used as the stabilizer include vinyl-based polymers having a heterocyclic amine skeleton or polyamides having a heterocyclic amine skeleton.

Figure 1B:
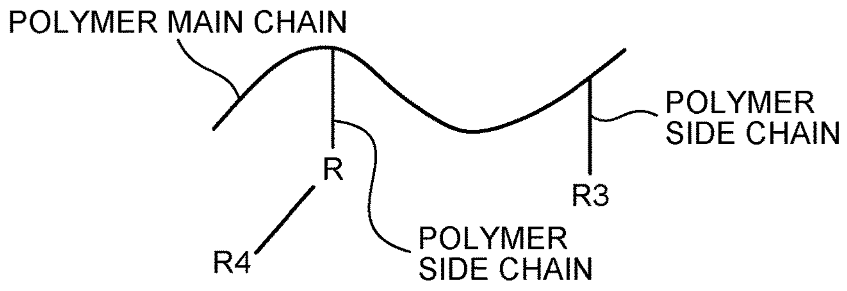
Figure 1C:
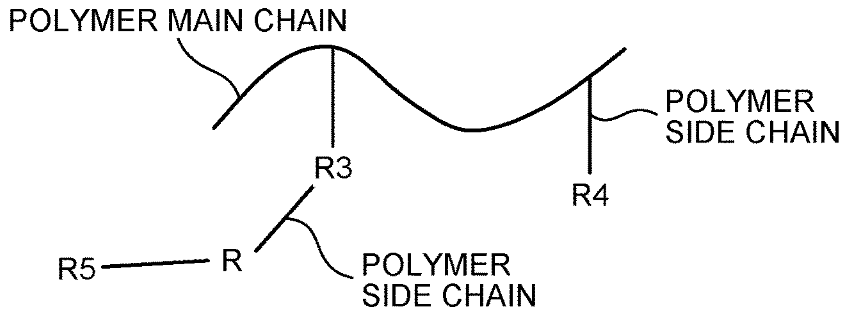
Figure 3:
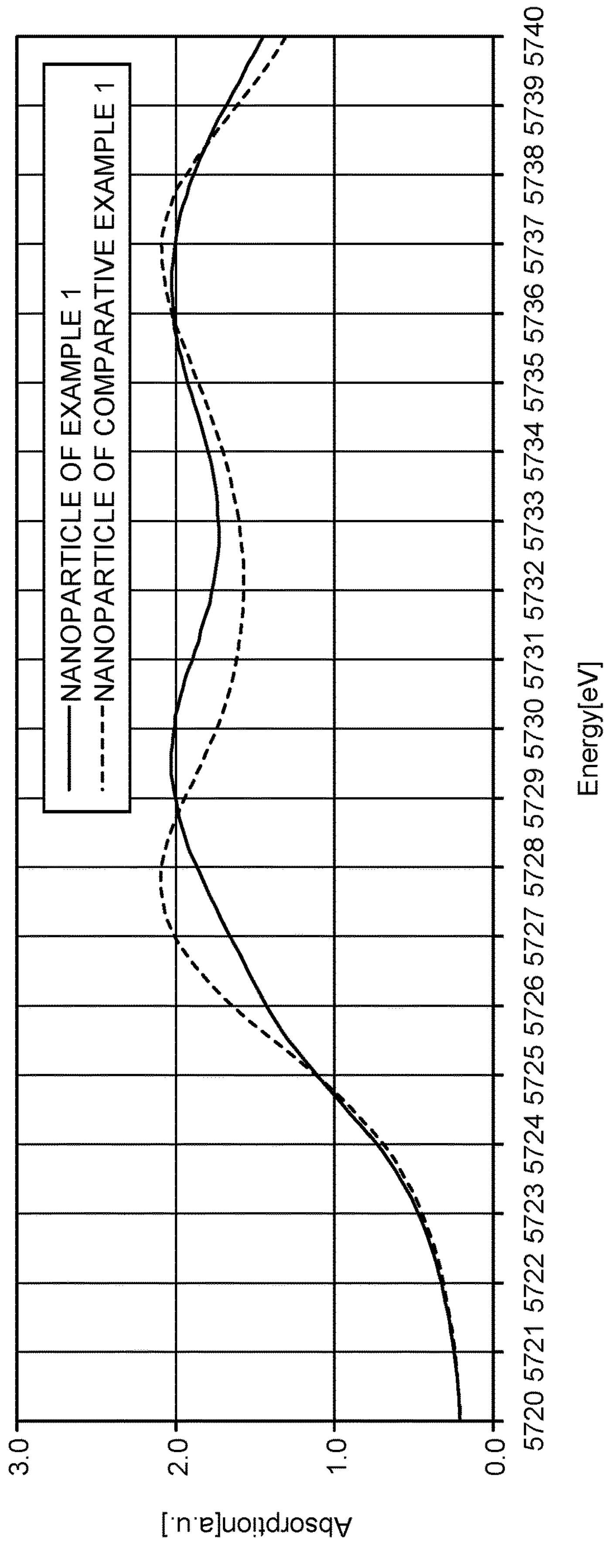
FIG. 3 is a view illustrating Ce L3 edge XANES spectra of the cerium oxide nanoparticles produced in Example 1 and Comparative Example 1, measured in Example 11 and Comparative Example 10.
Figure 4:
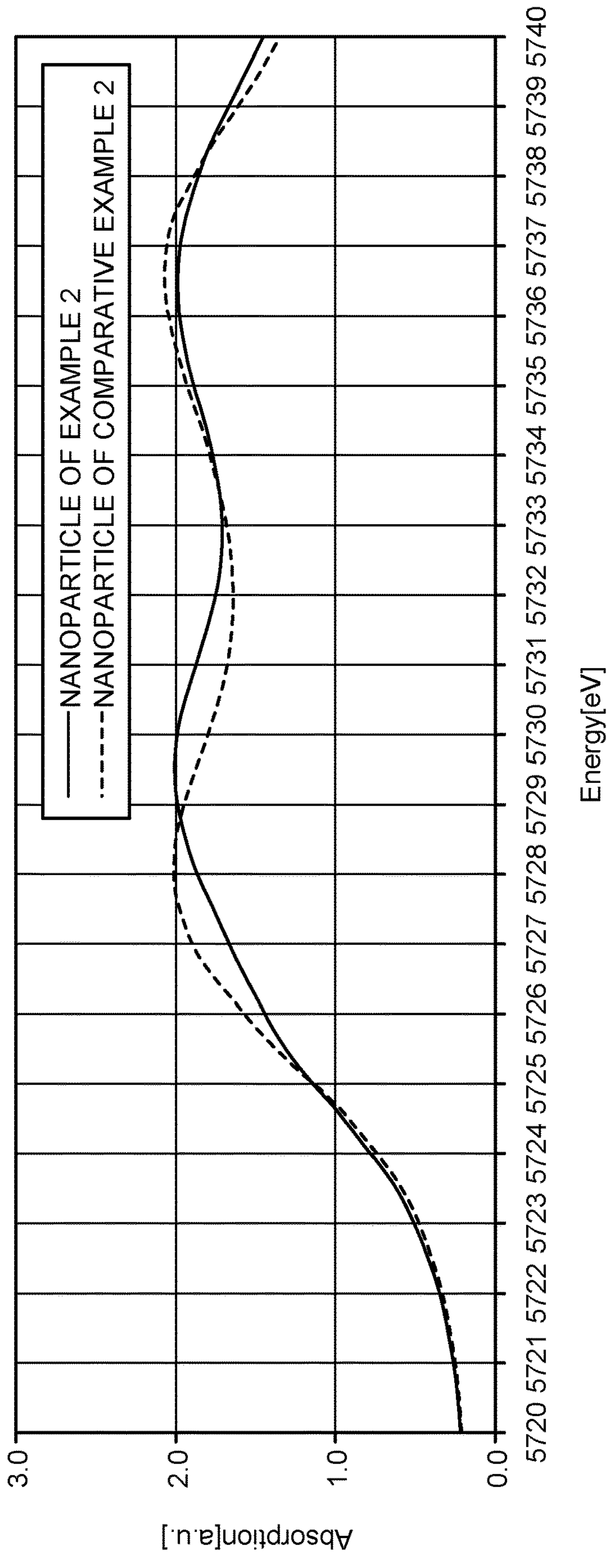
FIG. 4 is a view illustrating Ce L3 edge XANES spectra of the cerium oxide nanoparticles produced in Example 2 and Comparative Example 2, measured in Example 11 and Comparative Example 10.
Figure 5:
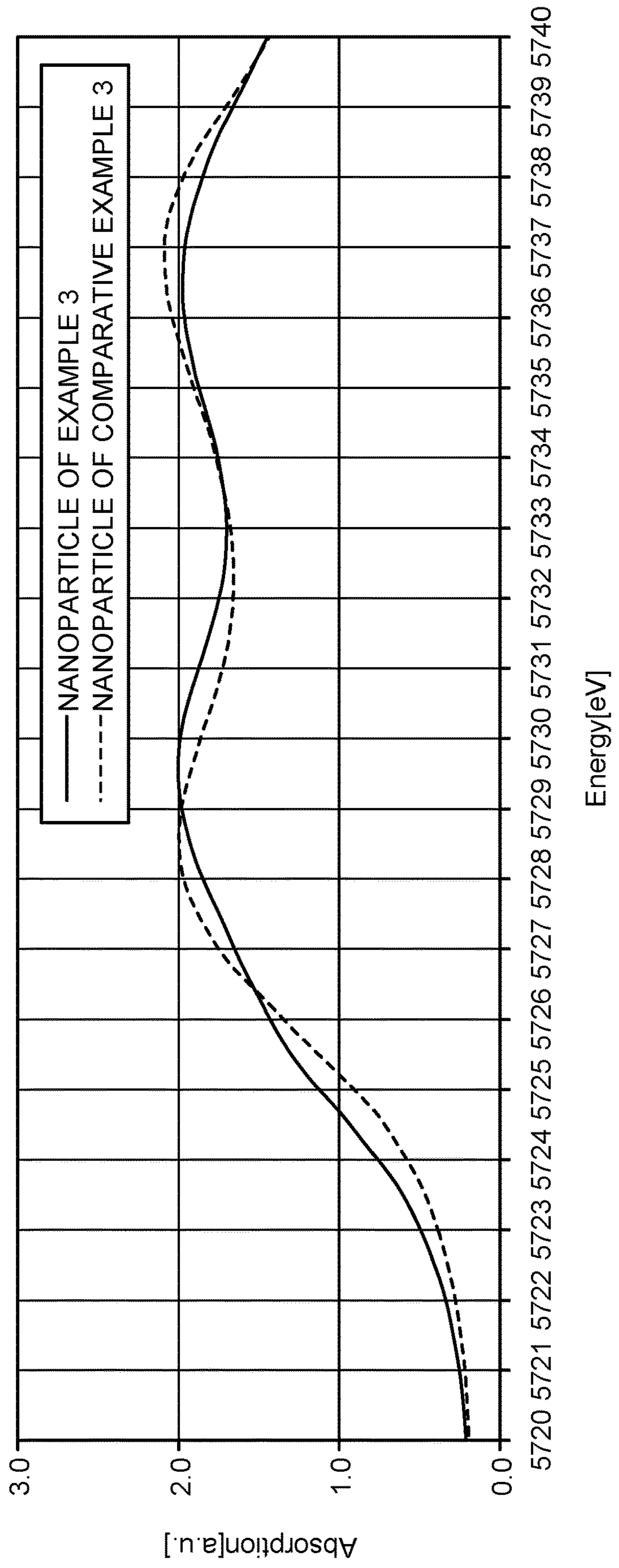
FIG. 5 is a view illustrating Ce L3 edge XANES spectra of the cerium oxide nanoparticles produced in Example 3 and Comparative Example 3, measured in Example 11 and Comparative Example 10.
Figure 6:
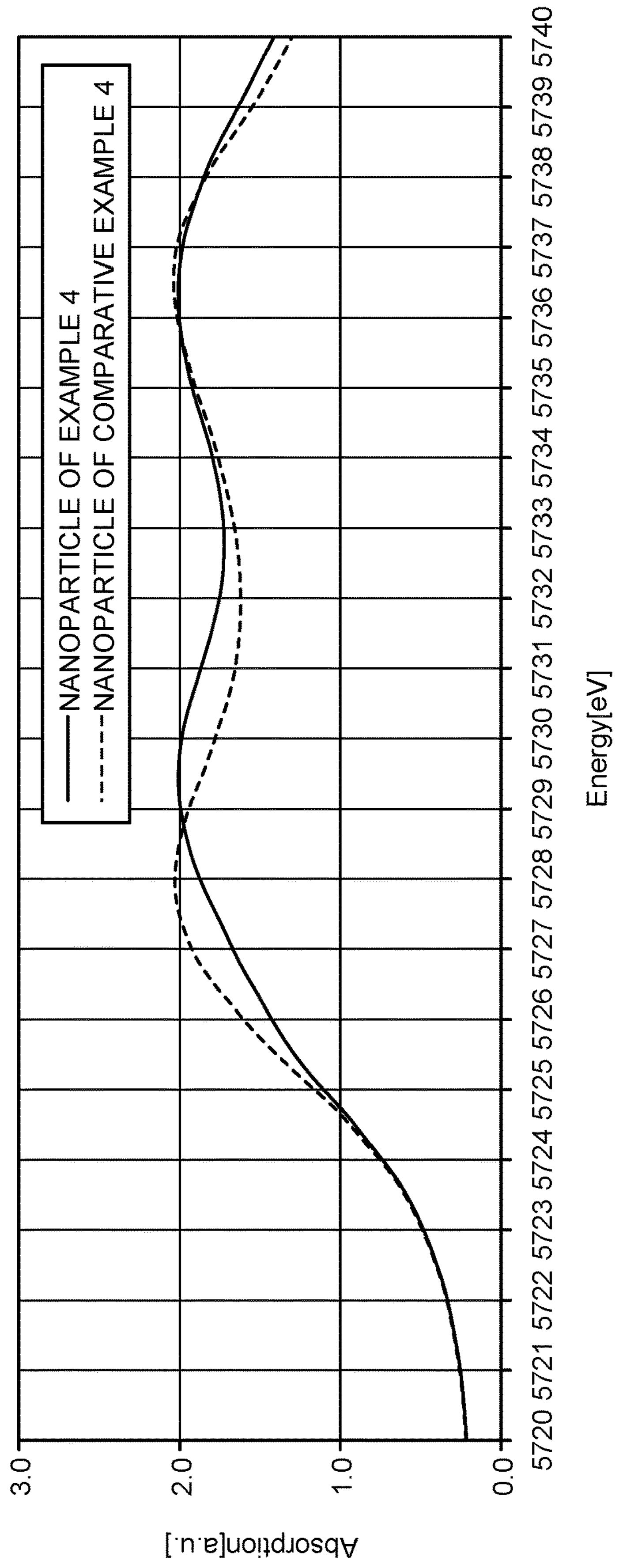
FIG. 6 is a view illustrating Ce L3 edge XANES spectra of the cerium oxide nanoparticles produced in Example 4 and Comparative Example 4, measured in Example 11 and Comparative Example 10.
Figure 7:
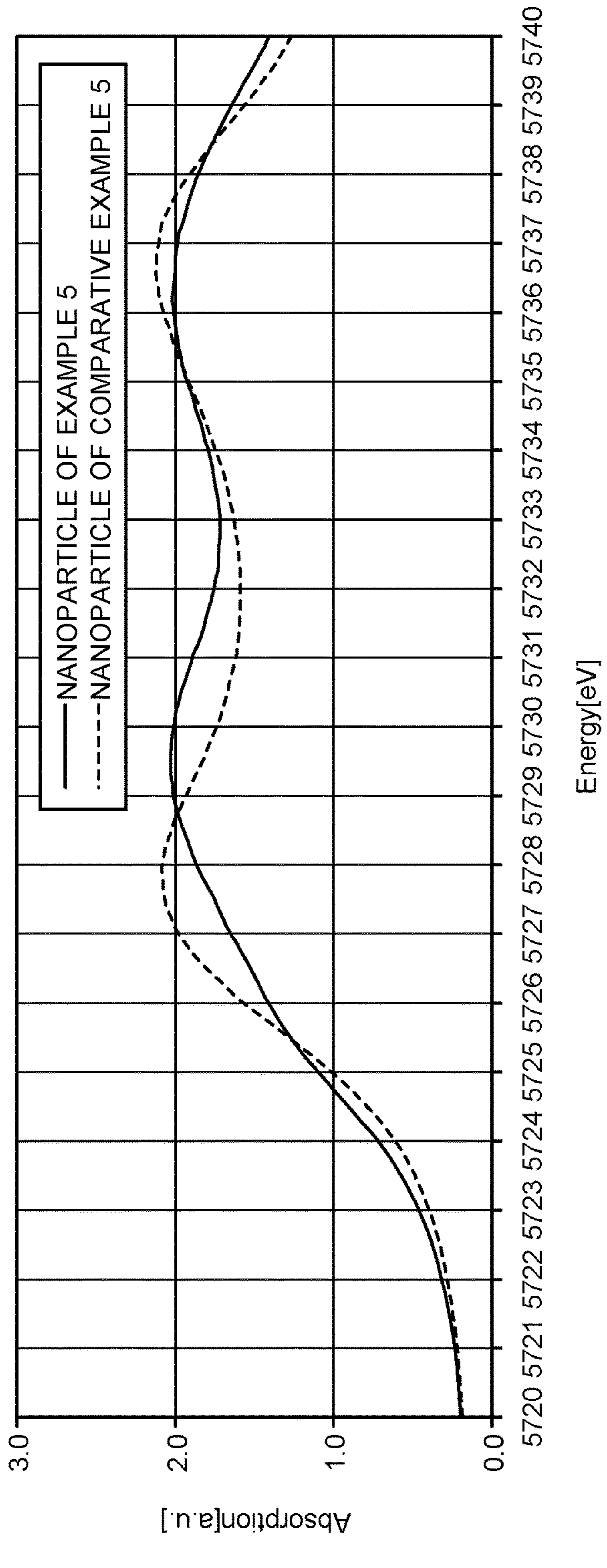
FIG. 7 is a view illustrating Ce L3 edge XANES spectra of the cerium oxide nanoparticles produced in Example 5 and Comparative Example 5, measured in Example 11 and Comparative Example 10.
Figure 8:
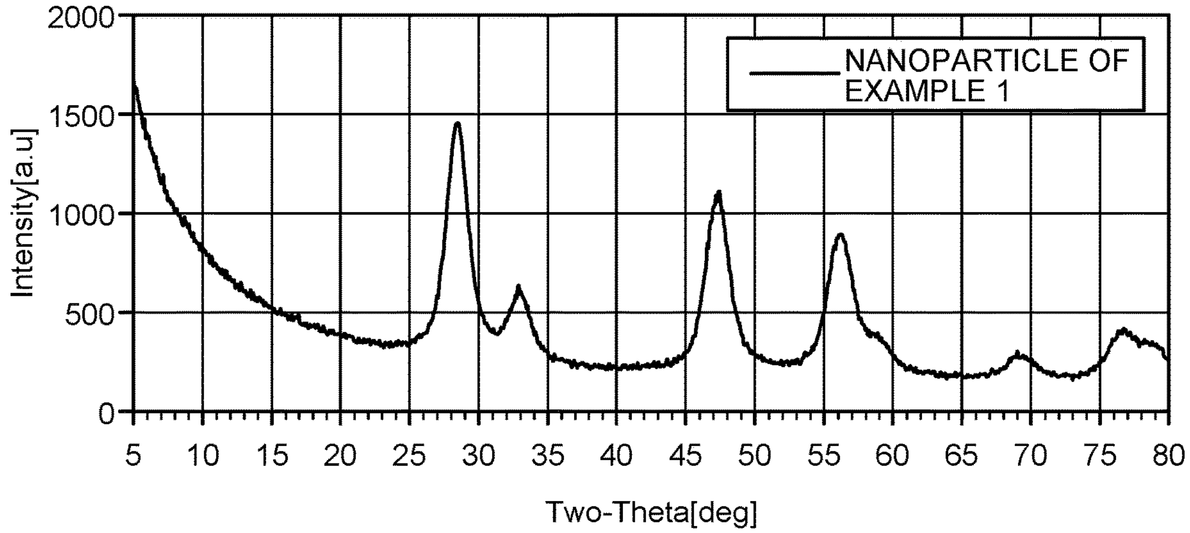
FIG. 8 is a view illustrating an XRD spectrum of the cerium oxide nanoparticle produced in Example 1, measured in Example 13.
Figure 9:
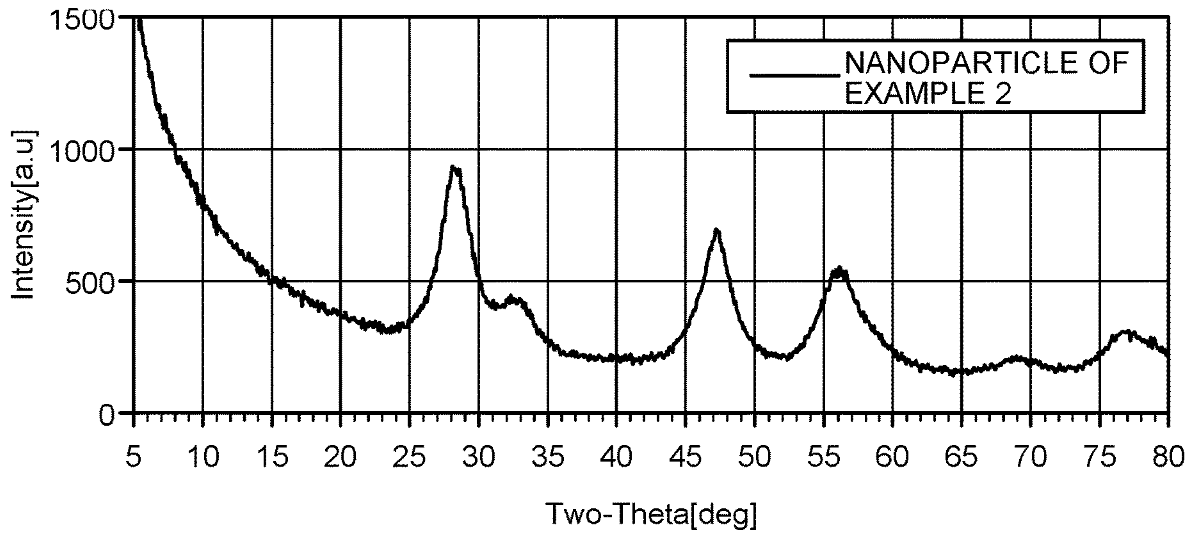
FIG. 9 is a view illustrating an XRD spectrum of the cerium oxide nanoparticle produced in Example 2, measured in Example 13.
Figure 10:
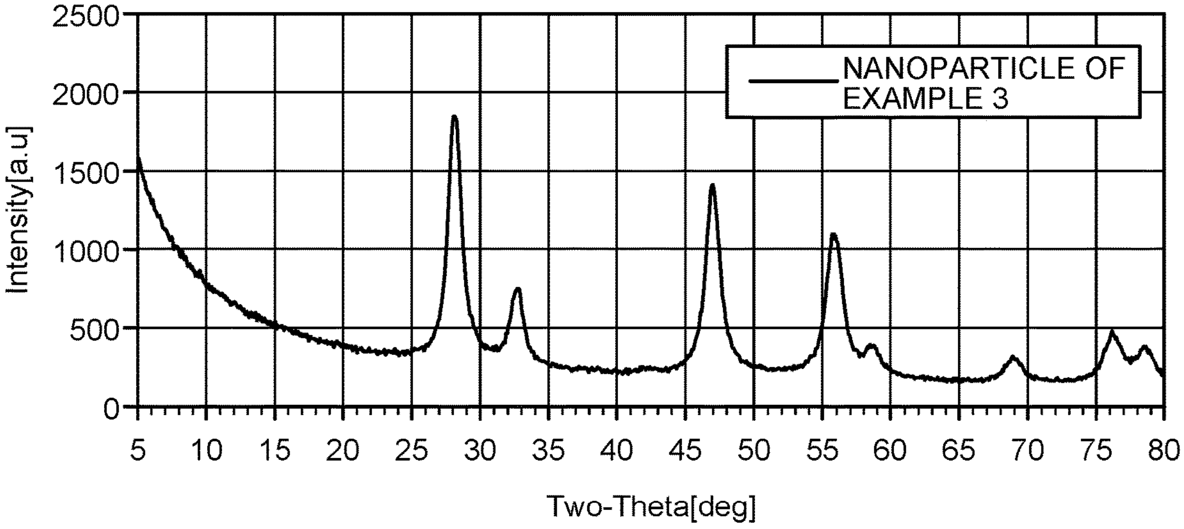
FIG. 10 is a view illustrating an XRD spectrum of the cerium oxide nanoparticle produced in Example 3, measured in Example 13.
Figure 11:
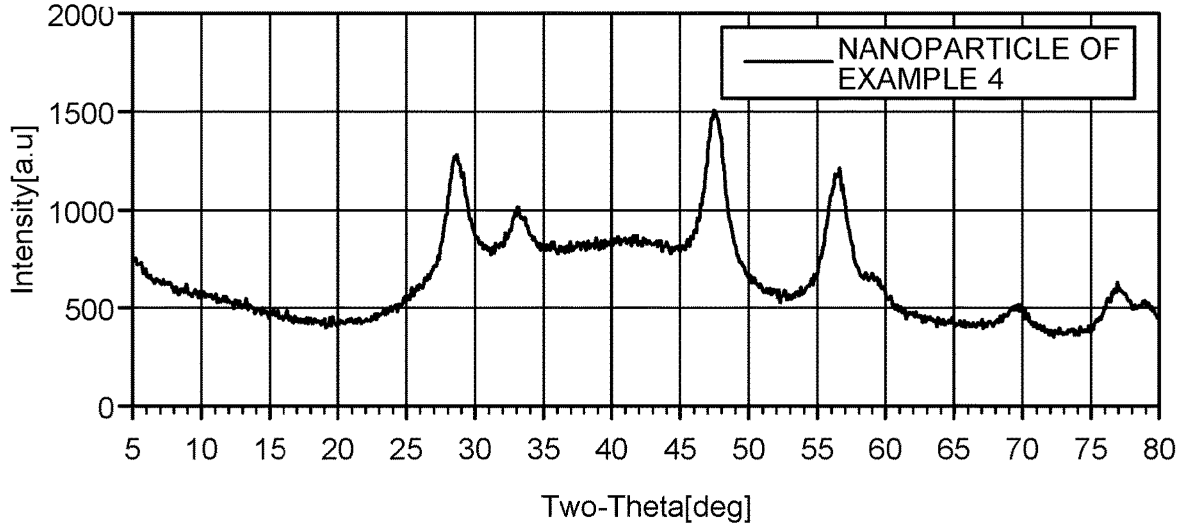
FIG. 11 is a view illustrating an XRD spectrum of the cerium oxide nanoparticle produced in Example 4, measured in Example 13.
Figure 12:
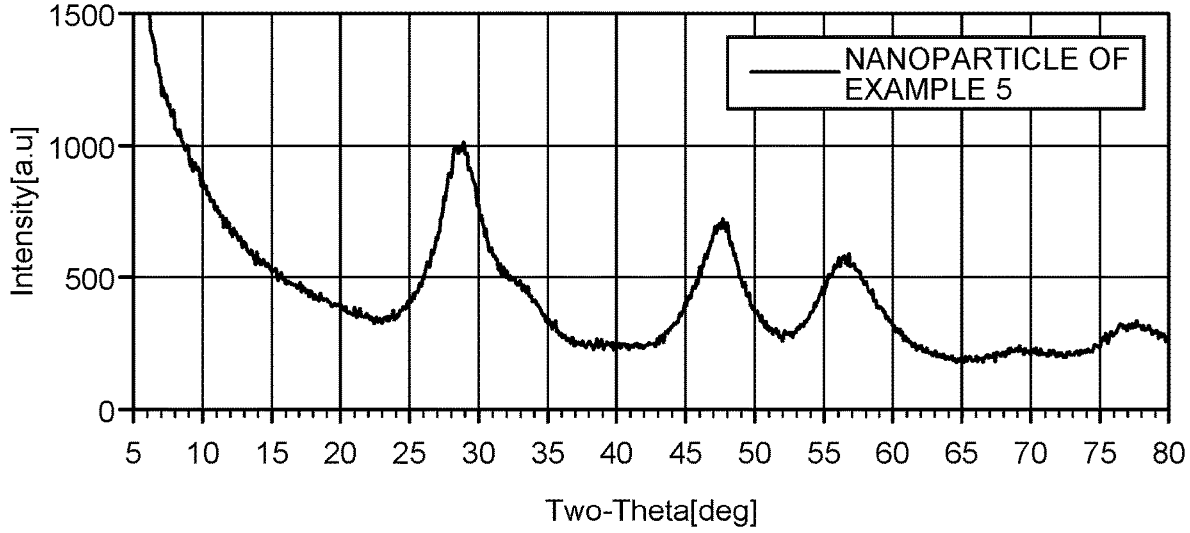
FIG. 12 is a view illustrating an XRD spectrum of the cerium oxide nanoparticle produced in Example 5, measured in Example 13.
Figure 13:
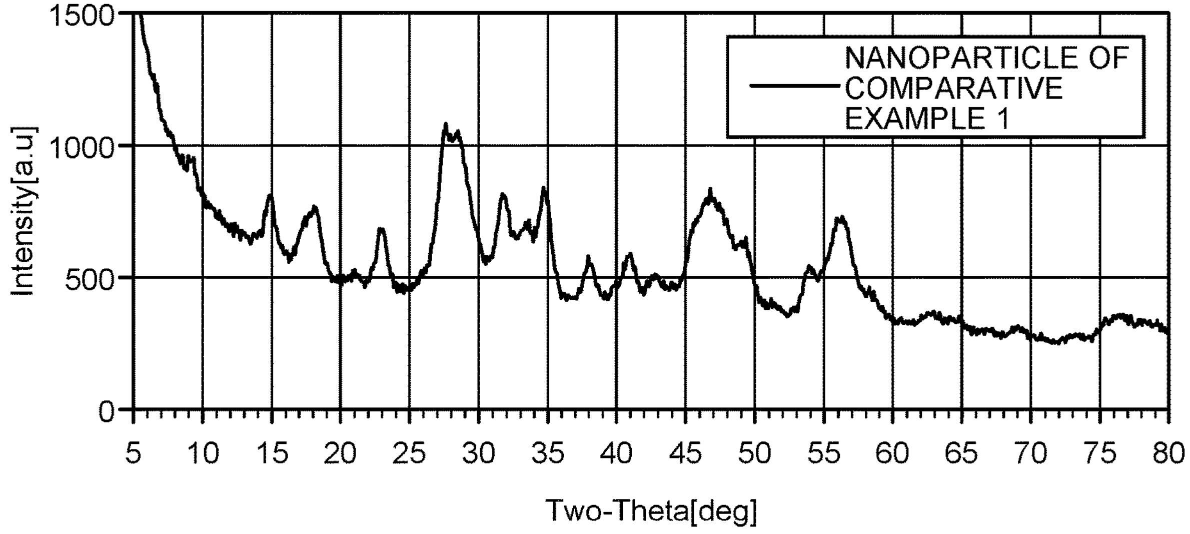
FIG. 13 is a view illustrating an XRD spectrum of the cerium oxide nanoparticle produced in Comparative Example 1, measured in Comparative Example 12.
Figure 14:
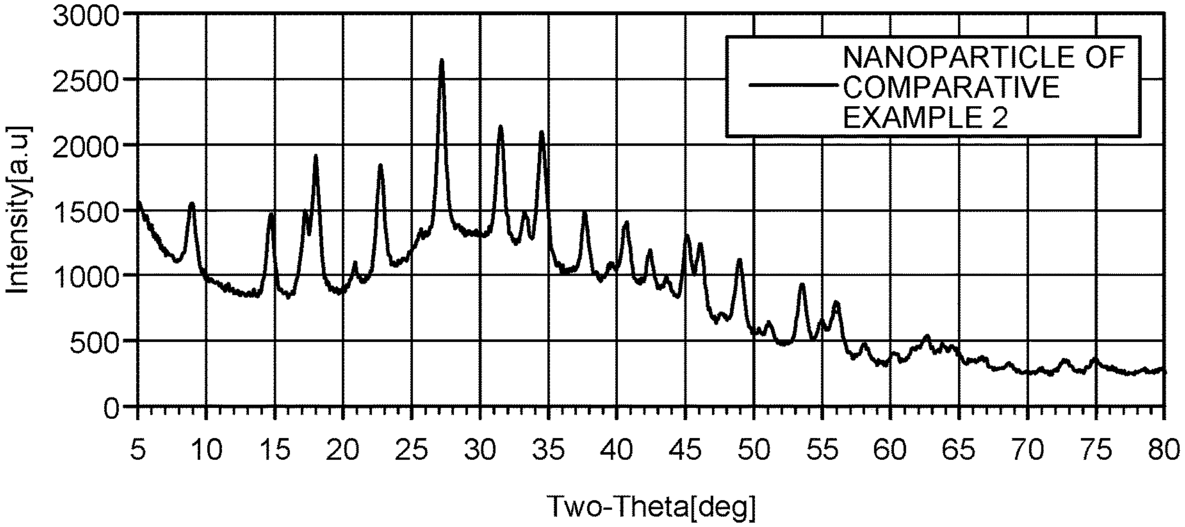
FIG. 14 is a view illustrating an XRD spectrum of the cerium oxide nanoparticle produced in Comparative Example 2, measured in Comparative Example 12.
Figure 15:
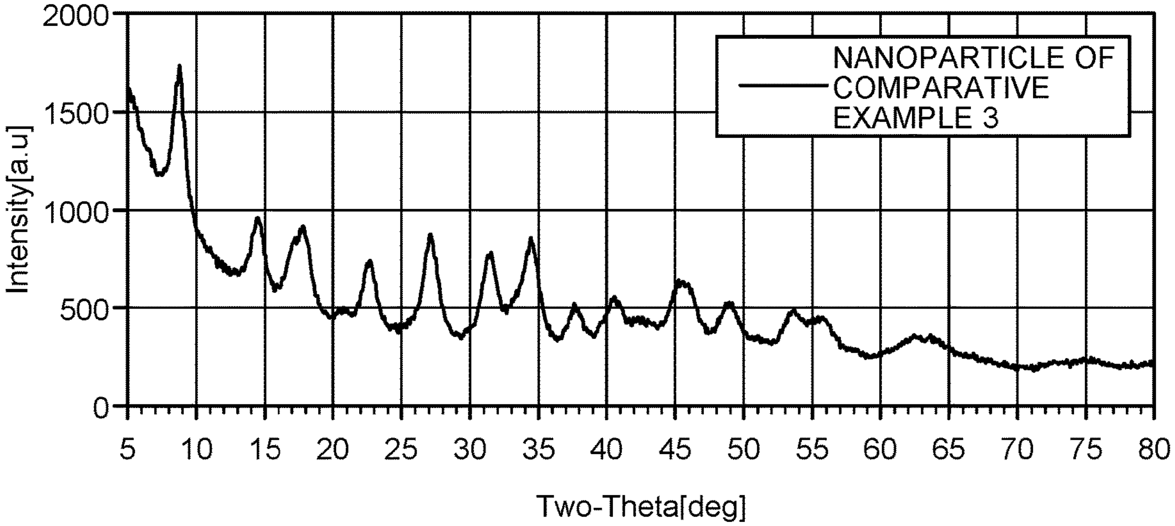
FIG. 15 is a view illustrating an XRD spectrum of the cerium oxide nanoparticle produced in Comparative Example 3, measured in Comparative Example 12.
Figure 16:
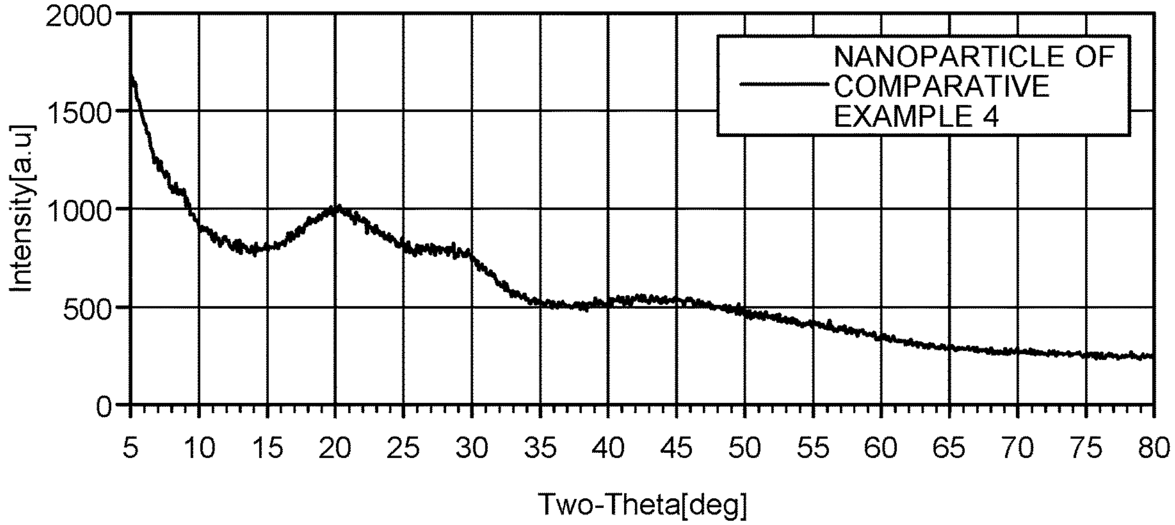
FIG. 16 is a view illustrating an XRD spectrum of the cerium oxide nanoparticle produced in Comparative Example 4, measured in Comparative Example 12.
Figure 17:
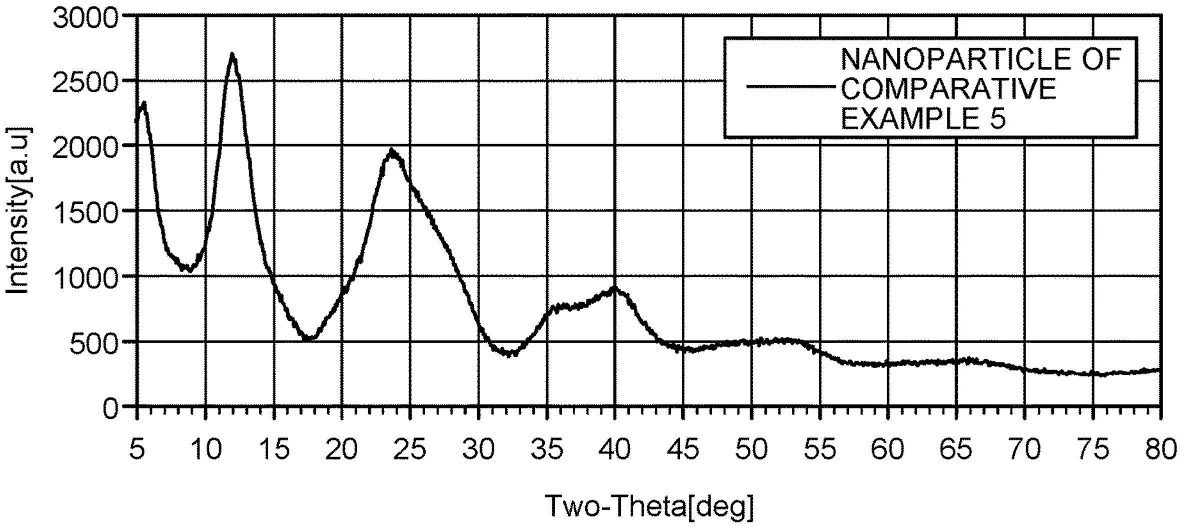
FIG. 17 is a view illustrating an XRD spectrum of the cerium oxide nanoparticle produced in Comparative Example 5, measured in Comparative Example 12.
Figure 18:
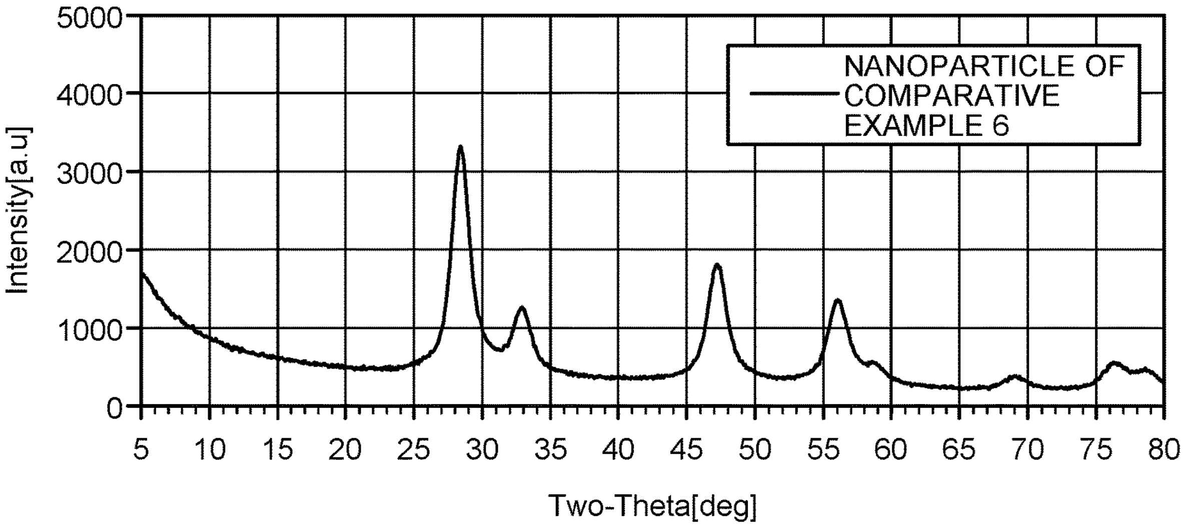
FIG. 18 is a view illustrating an XRD spectrum of the cerium oxide nanoparticle produced in Comparative Example 6, measured in Comparative Example 12.
Figure 19:
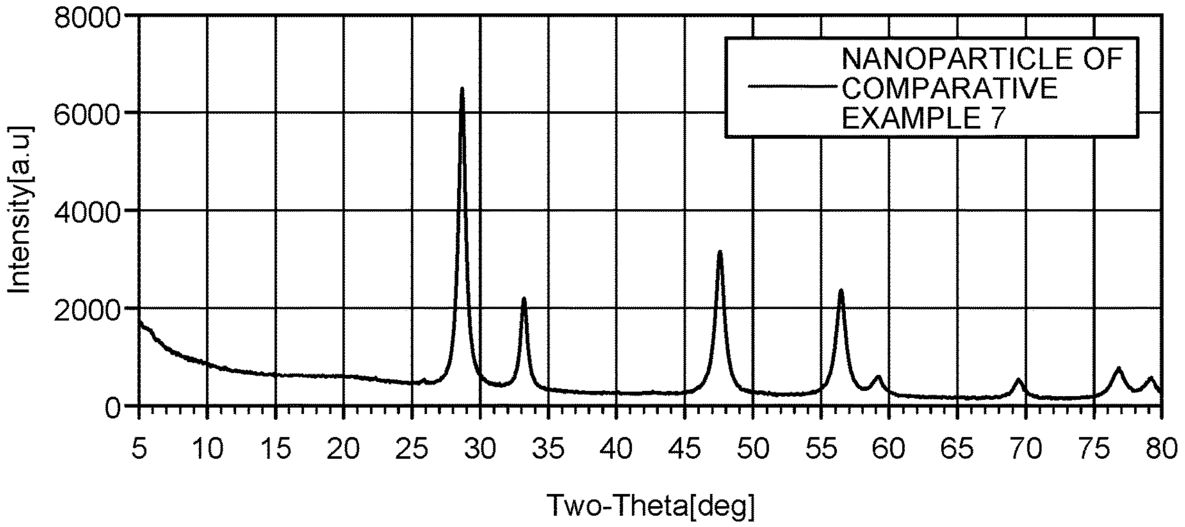
FIG. 19 is a view illustrating an XRD spectrum of the cerium oxide nanoparticle produced in Comparative Example 7, measured in Comparative Example 12.
Figure 20:
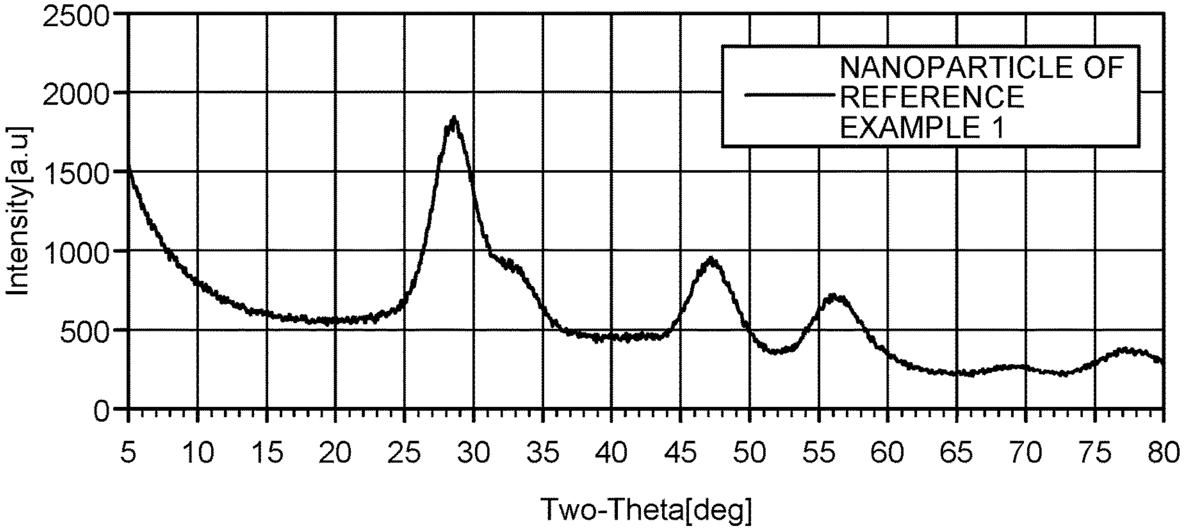
FIG. 20 is a view illustrating an XRD spectrum of the cerium oxide nanoparticle produced in Reference Example 1, measured in Comparative Example 12.

As a more preferred example of the polymer (D) having a heterocyclic amine skeleton used as the stabilizer, the polymer (D) has a heterocyclic amine skeleton R such as piperazine, pyridine, imidazole, or carbazole in the main chain (FIG. 1(*a*)) or the side chain (FIGS. 1(*b*) and 1(*c*)), as illustrated in FIGS. 1(*a*) to 1(*c*). The vinyl-based polymer or polyamide may have a substituent at any position of the main chain or the side chain, or may have a substituent at any position of the heterocyclic amine skeleton such as piperazine, pyridine, imidazole, or carbazole. The polymer illustrated in FIG. 1(*a*) has a heterocyclic amine skeleton in the main chain and substituents $R^3$ and $R^4$ in the side chain. The polymer illustrated in FIG. 1(*b*) has a heterocyclic amine skeleton in the side chain, and has a substituent $R^4$ as a substituent of the heterocyclic amine skeleton. The polymer illustrated in FIG. 1(*c*) has a heterocyclic amine skeleton in the side chain, and the heterocyclic amine skeleton is a substituent of a substituent $R^3$ in the side chain and has a substituent $R^5$ as a substituent of the heterocyclic amine skeleton. The structures illustrated in FIGS. 1(*a*) to 1(*c*) are examples of the vinyl-based polymer or polyamide used as the stabilizer, but the vinyl-based polymer or polyamide are not limited to these structures. Unless otherwise specified, the substituent is an alkyl group, an acetyl group, a hydroxyl group, an amino group, a cyano group, a carboxyl group, an ester group, an aldehyde group, an amide group, an ether group, a ketone group, a halogen group, a sulfonate group, or a phosphate group. The number of substituents may be singular or plural.

The vinyl-based polymer used as the stabilizer is a polymer having a methylene group in the main chain. As an example, the structure of a vinyl-based polymer having a piperazine skeleton in the main chain or the side chain is illustrated in FIGS. 2(*a*) and 2(*b*). As illustrated in FIG. 2(*a*), when the vinyl-based polymer has a piperazine skeleton in the main chain, the vinyl-based polymer has the piperazine skeleton between a methylene group and a methylene group. When the vinyl-based polymer has another heterocyclic amine skeleton such as a pyridine, imidazole, or carbazole skeleton in the main chain, the vinyl-based polymer has a heterocyclic amine skeleton between a methylene group and a methylene group as in FIG. 2(*a*).

When the vinyl-based polymer has a piperazine skeleton in the side chain, the piperazine skeleton may be directly bonded to the carbon of the methylene group as illustrated in FIG. 2(*b*), or the piperazine skeleton may be bonded via an alkyl group or an amino group. When the vinyl-based polymer has another heterocyclic amine skeleton such as a pyridine, imidazole, or carbazole skeleton, the heterocyclic amine skeleton such as a pyridine, imidazole, or carbazole skeleton may be directly bonded to the carbon of the methylene group, or may be bonded via an alkyl group or an amino group as in FIG. 2(*b*).

The vinyl-based polymer is preferably a vinyl-based polymer having a piperazine, pyridine, imidazole, or carbazole skeleton in the side chain. The vinyl-based polymer having a piperazine, pyridine, imidazole, or a carbazole skeleton in the side chain is obtained by a polymerization reaction of a vinyl-based monomer having a vinyl group.

Specific examples of the vinyl-based monomer include 1-vinylpiperazine, (4-vinylpiperazin-1-yl)methanamine, 2-(4-vinylpiperazin-1-yl)ethane-1-amine, 2-vinylpiperazine, (3-vinylpiperazin-1-yl)methanamine, 2-(3-vinylpiperazin-1-yl)ethane-1-amine, (2-vinylpiperazin-1-yl)methanamine, 2-(2-vinylpiperazin-1-yl)ethane-1-amine, 2-vinylpyridine, 3-vinylpyridine, 4-vinylpyridine, 1-vinylimidazole, 2-vinylimidazole, 4-vinylimidazole, and 9-vinylcarbazole. The vinyl-based monomer may have a substituent at any position other than the vinyl group, and the vinyl group may have a methyl group or a cyano group as a substituent.

The vinyl-based polymer may be a homopolymer or a copolymer produced using two or more vinyl-based monomers as raw materials.

Preferred specific examples of the vinyl-based polymer include poly(1-vinylpiperazine), poly((4-vinylpiperazin-1-yl)methanamine), poly(2-(4-vinylpiperazin-1-yl)ethane-1-amine), poly(2-vinylpyridine), poly(3-vinylpyridine), poly(4-vinylpyridine), poly(1-vinylimidazole), poly(2-vinylimidazole), poly(4-vinylimidazole), and poly(9-vinylcarbazole).

Polyamide is a polymer having an amide bond in the main chain. As illustrated in FIG. 2(*c*), when the polyamide has a piperazine skeleton in the main chain, the polyamide has a piperazine skeleton between a carbonyl group and a carbonyl group in the main chain, and the nitrogen in the heterocyclic ring of the piperazine skeleton and the carbonyl group form an amide bond. When the polyamide has another heterocyclic amine skeleton having two or more primary or secondary amino groups such as a pyridine, imidazole, or carbazole skeleton in the main chain, the polyamide has a heterocyclic amine skeleton between a carbonyl group and a carbonyl group as in FIG. 2(*c*).

When the polyamide has a piperazine skeleton, the piperazine skeleton may be directly bonded to the carbon linking the amide group as illustrated in FIG. 2(*d*), or the piperazine skeleton may be bonded via an alkyl group or an amino group. When the polyamide has another heterocyclic amine skeleton such as a pyridine, imidazole, or carbazole skeleton, the heterocyclic amine skeleton such as a pyridine, imidazole, or carbazole skeleton may be bonded directly to the carbon linking the amide group as in FIG. 2(*d*), or may be bonded via an alkyl group or an amino group.

The polyamide is preferably a polymer having a piperazine skeleton in the main chain or the side chain, and more preferably a polymer having a piperazine skeleton in the main chain illustrated in FIG. 2(*c*).

The polyamide having a piperazine skeleton in the main chain is obtained by a polycondensation reaction between an amine having a piperazine skeleton and a dicarboxylic acid.

Preferred examples of the amine having a piperazine skeleton include piperazine, (aminomethyl)piperazine, (aminoethyl)piperazine, (aminopropyl)piperazine, (aminobutyl)piperazine, 1,4-bis(aminomethyl)piperazine, 1,4-bis(2-aminoethyl)piperazine, 1,4-bis(3-aminopropyl)piperazine, and 1,4-bis(4-aminobutyl)piperazine. Among them, (aminoethyl)piperazine and 1,4-bis(3-aminopropyl)piperazine are more preferable. In addition, these amines may have a substituent at any position other than the nitrogen capable of forming an amide bond.

Preferred examples of the dicarboxylic acid include 1H-imidazole-2,4-dicarboxylic acid, 1H-imidazole-2,5-dicarboxylic acid, 1H-imidazole-4,5-dicarboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, adipic acid, sebacic acid, dodecadicarboxylic acid, terephthalic acid, and isophthalic acid. In addition, these dicarboxylic acids may have a substituent at any position other than the carboxyl group capable of forming an amide bond. As the polyamide, any polyamide obtained by a combination of the amine and the dicarboxylic acid can be preferably used, and a polyamide obtained by a combination of (aminoethyl)piperazine and adipic acid is particularly preferable.

The polyamide may have a polyalkylene glycol structure in the main chain. Specific examples of such a polyamide include a polyamide having a skeleton of (aminoethyl) piperazine, adipic acid, and bis(aminopropyl)polyethylene glycol.

The polyamide may be a mixture or a copolymer of a polyamide having a heterocyclic amine skeleton such as piperazine, pyridine, imidazole, or carbazole with another polymer. In this example, specific examples of the other polymer include polycaproamide (nylon 6), polyhexamethylene adipamide (nylon 66), polytetramethylene adipamide (nylon 46), polypentamethylene adipamide (nylon 56), polypentamethylene sebacamide (nylon 510), polyhexamethylene sebacamide (nylon 610), polyhexamethylene dodecamide (nylon 612), polyhexamethylene adipamide/polyhexamethylene terephthalamide copolymer (nylon 66/6T), polyhexamethylene adipamide/polyhexamethylene terephthalamide/polyhexamethylene isophthalamide copolymer (nylon 66/6T/6I), polyhexamethylene terephthalamide/polyhexamethylene isophthalamide copolymer (nylon 6T/6I), and polyxylylene adipamide (nylon XD6).

The molecular weight of the vinyl-based polymer or polyamide may be 3,000 or more and 1,000,000 or less, and is preferably 10,000 or more and 50,000 or less.

(E) Boron Compound

Examples of the boron compound used as the stabilizer include a boron compound represented by chemical formula (II).

$$Br_n(OR')_{3-n} \quad (II)$$

In formula (II), n is an integer of 0 to 2, R represents any of an alkyl group having 1 to 4 carbon atoms, a phenyl group, or a tolyl group, and R' represents any of hydrogen, an alkyl group having 1 to 4 carbon atoms, a phenyl group, or a tolyl group. A plurality of Rs or R's are optionally the same or different. The tolyl group may be any of an o-tolyl group, an m-tolyl group, and a p-tolyl group. When a plurality of tolyl groups are present, the plurality of tolyl groups are optionally the same or different.

More preferred examples of the boron compound include a boric acid (in general formula (II), n=0, R=H, R'=H), a boric acid ester (in general formula (II), n=0, R=H, R'=alkyl or the like), a boronic acid (in general formula (II), n=1, R=alkyl or the like, R'=H), a boronic acid ester (in general formula (II), n=1, R=alkyl or the like, R'=alkyl or the like), a borinic acid (in general formula (II), n=2, R=alkyl or the like, R'=H), a borinic acid ester (in general formula (II), n=2, R=alkyl or the like, R'=alkyl or the like), and a borate. The borate refers to a generic term including a salt of boric acid or a salt of metaboric acid or polyboric acid formed by dehydration condensation of boric acid. These borates are in an equilibrium state between boric acid and tetrahydroxyboric acid in an aqueous solution, and thus have a structure of the boric acid represented by general formula (II) in the solution. The counter ion of boric acid in the borate can be any ion such as a lithium ion, a sodium ion, a potassium ion, or an ammonium ion.

Examples of such a boron compound include boric acid; boric acid esters such as trimethyl borate, triethyl borate, tripropyl borate, triisopropyl borate, tributyl borate, and triisobutyl borate; and boronic acids such as methylboronic acid, ethylboronic acid, propylboronic acid, isopropylboronic acid, butylboronic acid, isobutylboronic acid, and phenylboronic acid. Examples of the borate include lithium salts, sodium salts, potassium salts, and ammonium salts of boric acid, metaboric acid, diboric acid, metaboric acid, tetraboric acid, pentaboric acid, hexaboric acid, and octaboric acid.

The cerium oxide nanoparticle preferably contains 0.001 mol or more to 10 mol of boron with respect to 1 mol of the cerium element. The cerium oxide nanoparticle more preferably contains boron from 0.001 mol to 1 mol.

The cerium oxide nanoparticle is composed of a mixture of $Ce_2O_3$ and $CeO_2$. Cerium oxide may also be in the form of a hydroxide or an oxyhydroxide in addition to the form of the above-described oxide. The ratio between $Ce_2O_3$ and $CeO_2$ can be calculated as the ratio between cerium (III) and cerium (IV) by X-ray photoelectron spectroscopy (XPS) described later or the like.

The cerium oxide nanoparticle can further contain a transition metal of Group 3 to 12 in the periodic table. These metals can be expected to improve the performance by forming lattice defects when being doped into the cerium oxide nanoparticle by taking a valence of 2+ to 3+, or improve the performance by causing a valence change of cerium oxide by valence changes such as 0 and 1+, 1+ and 2+, and 2+ and 3+ associated with the oxidation-reduction potential.

These transition metals are preferably transition metals belonging to the 4 to 6th period, and more preferably Ti, Mn, Fe, Co, Ni, Cu, Zn, Zr, and Ag from the viewpoint of being easily doped into the cerium oxide nanoparticle and further improving the antibacterial activity and the antiviral activity.

These transition metals can be added at the time of production as a salt such as a halide and a hydroxide in addition to an organic acid salt such as a carboxylate and a sulfonate, an oxoacid salt of phosphorus such as a phosphate and a phosphonate, and an inorganic acid salt such as a nitrate, a sulfate, and a carbonate. These are only required to be dissolved in a solvent used at the time of production.

Method of Producing Cerium Oxide Nanoparticle

The dispersion solution containing the cerium oxide nanoparticle is produced by adding an oxidizing agent to a solution containing a stabilizer and a cerium (III) ion, and subjecting the mixed solution to a hydrothermal treatment. Hereinafter, a method of producing a dispersion solution of the cerium oxide nanoparticle will be described.

(1) First Step

The first step is a step of obtaining a solution containing a stabilizer and a cerium (III) ion. The solution containing the stabilizer used in this step can be produced by dissolving the stabilizer in any solvent. The solvent is preferably water or a solvent compatible with water. Specific examples of the solvent compatible with water include methanol, ethanol, propanol, isopropanol, butanol, tert-butanol, tetrahydrofuran, acetone, dimethylformamide (DMF), dimethyl sulfoxide (DMSO), glycerol, ethylene glycol, and oligoethylene glycol. In mixing of the solvent and water, any concentration at which the proportion of the solvent is 10 to 90 mass % can be set. When the stabilizer is difficult to dissolve in the solvent, the stabilizer may be dissolved by heating or ultrasonic treatment.

When the polymer (D) having a heterocyclic amine skeleton is used as the stabilizer, the concentration of the solution of the polymer (D) may be 0.001% or more and 50% or less, preferably 0.01% or more and 5% or less, and more preferably 0.1% or more and 2% or less in terms of mass concentration.

When the basic amino acid (A) is used as the stabilizer, the amount of the basic amino acid (A) may be 0.01 to 10 molar equivalents with respect to the cerium (III) ion.

The amount of the alicyclic amine (B) used as the stabilizer may be 0.1 to 100 molar equivalents with respect to the cerium (III) ion.

When the aromatic heterocyclic compound (C) containing a nitrogen atom in the ring structure thereof is used as the stabilizer, the amount of the aromatic heterocyclic compound (C) containing a nitrogen atom in the ring structure thereof may be 0.1 to 100 molar equivalents with respect to the cerium (III) ion.

When the polymer (D) having a heterocyclic amine skeleton is used as the stabilizer and cerium (III) nitrate hexahydrate is used as the cerium (III) salt, mixing may be performed so that the mass ratio of cerium (III) nitrate hexahydrate to the polymer (D) is 0.1 or more and 5.0 or less.

When the boron compound (E) is used as the stabilizer, the amount of the boron compound (E) may be 0.1 to 1,000 molar equivalents with respect to the cerium (III) ion, and is preferably 1 to 200 molar equivalents, more preferably 5 to 200 molar equivalents, and most preferably 10 to 100 molar equivalents.

To obtain a solution containing a stabilizer and a cerium (III) ion, a solution containing a stabilizer and a solution containing a cerium (III) ion may be separately prepared and then mixed. Alternatively, when the solvent of the solution containing a stabilizer is water or a solvent compatible with water, a cerium (III) salt may be added to the solution containing a stabilizer and mixed.

The solution containing a cerium (III) ion may be prepared by dissolving a cerium (III) salt in any solvent. As the cerium (III) salt, for example, cerium (III) nitrate hexahydrate may be used.

The amount of the cerium (III) salt mixed with the solution of the stabilizer may be such that the final concentration of the reaction solution is 0.01 mass % to 10 mass %. The mixed solution is preferably mixed for 5 minutes or more until the solution becomes homogeneous.

When the cerium oxide nanoparticle using the boron compound (E) as the stabilizer is doped with metal, a transition metal may be further added in the first step. The transition metal may be directly added, as a solid metal salt, to a solution containing the boron compound (E) and the cerium (III) ion or the cerium (III) salt. Alternatively, a solution prepared by dissolving the metal salt in any solvent may be added to a solution containing the boron compound (E) and the cerium (III) ion or the cerium (III) salt.

The amount of the transition metal is preferably 0.0001 mol to 0.3 mol with respect to 1 mol of the cerium (III) ion. The amount of the transition metal is more preferably 0.001 mol to 0.2 mol. The amount of the transition metal does not include the amount of elements other than the transition metal contained in the salt of the transition metal.

(2) Second Step

The second step is a step of adding an oxidizing agent to the mixed solution obtained in the first step. Examples of the oxidizing agent used in the second step include nitric acid, potassium nitrate, hypochlorous acid, chlorous acid, chloric acid, perchloric acid, halogen, permanganate, chromic acid, dichromic acid, oxalic acid, sulfur dioxide, sodium thiosulfate, sulfuric acid, and hydrogen peroxide. Among them, hydrogen peroxide is particularly preferable. The addition amount of the oxidizing agent may be 0.1 equivalents or more and 10 equivalents or less, and is preferably 0.5 equivalents or more and 2 equivalents or less as a molar equivalent with respect to the cerium (III) ion.

When the oxidizing agent is added to the solution containing the stabilizer and the cerium (III) ion, the cerium (III) ion is oxidized to cerium (IV), and the formation reaction of the cerium oxide particle composed of a mixture of $Ce_2O_3$ and $CeO_2$ starts. At the time of the reaction, the solution is colored in yellow, orange, red, brown or the like. The completion of the reaction can be determined at the time at which the color does not change any more.

The formation reaction of the cerium oxide nanoparticle can be carried out at any pH, but the pH of the solution at the time of adding the oxidizing agent is preferably set to 5 or more, more preferably adjusted to pH 6 or more, and still more preferably adjusted to pH 7 or more because the reaction easily proceeds in a weak acidic to basic solution. A sodium hydroxide aqueous solution, an ammonia aqueous solution or the like can be used to adjust the pH. The reaction is usually completed in about 5 minutes to 1 hour, and a dispersion solution containing the cerium oxide nanoparticle is thus obtained. For example, when 1 ml of a 10 mass % cerium (III) nitrate hexahydrate aqueous solution is added to 284 mg/50 ml of a boric acid aqueous solution adjusted to pH 8, and then 1 ml of a 1.2 mass % hydrogen peroxide aqueous solution is added and stirred at room temperature, the color of the solution turns to orange and the particle formation reaction is completed in about 10 minutes, and the dispersion solution is obtained.

The formation reaction of the cerium oxide nanoparticle can be performed at any temperature of 4° C. to 100° C. When performing cooling, for example, a cool bath such as BBL101 manufactured by Yamato Scientific Co., Ltd. can be used, and when performing heating, for example, a hot bath such as OHB-1100S manufactured by Tokyo Rikakikai Co., Ltd. can be used. The reaction solution may be placed in a glass vessel and cooled, heated, or heated under reflux while being stirred.

The pH of the mixed solution after adding the oxidizing agent may be adjusted. By adjusting the pH, the particle dispersibility can be improved. The pH of the mixed solution may be pH 1 to 10, and is preferably pH 2 to 8. The pH may be adjusted by adding a buffer, or may be adjusted by adding an acid such as nitric acid, sulfuric acid, or hydrochloric acid, or a base such as sodium hydroxide or potassium hydroxide. The pH of the dispersion solution may be adjusted after purification of the dispersion solution such as filtration with an ultrafiltration membrane or dialysis with a semi-permeable membrane described later.

The dispersion solution obtained in the second step may be used as it is in the third step, or may be formed into a powder through a drying step and used as a redissolved dispersion solution in the third step.

In addition, the third step described later may be performed using a dispersion solution obtained by adding the stabilizer to a reaction solution obtained by mixing the oxidizing agent with a solution containing the cerium (III) ion, or a reaction solution obtained by membrane purification of the reaction solution. The concentration of the stabilizer added at this time can be optionally set to a concentration of 0.1 to 1 M. As the stabilizer, a basic amino acid (A), an alicyclic amine (B), an aromatic heterocyclic compound (C) containing a nitrogen atom in the ring structure thereof, a polymer (D) having a heterocyclic amine skeleton, or a boron compound (E) can be used. (3) Third step The third step is a step of performing a hydrothermal treatment on the mixed solution obtained in the second step after adding the oxidizing agent.

The hydrothermal treatment is a step of treating with water at a temperature higher than 100° C. and a pressure higher than 101 kPa (1 atm). The hydrothermal treatment has an effect of improving the coloring property of the cerium oxide nanoparticle. When the dispersion solution containing the cerium oxide nanoparticle is colored in yellow, orange, red, brown or the like, the color of the dispersion solution turns to transparent or extremely pale yellow by the hydrothermal treatment. The effect of the hydrothermal treatment depends on the temperature and time of the hydrothermal treatment. As the temperature of the hydrothermal treatment is higher, and the reaction time is longer, the coloring property is greatly improved. The pressure in the hydrothermal treatment can be determined from the saturated water vapor pressure table and the temperature. The hydrothermal treatment can be performed at a temperature higher than 100° C. (101 kPa) and 230° C. or lower (2.80 MPa), and is preferably 105° C. (121 kPa) to 200° C. (1.55 MPa), and more preferably 110° C. (143 kPa) to 180° C. (1.00 MPa). Further, the time for the hydrothermal treatment can be optionally set to 1 to 180 minutes. Even in the same heat treatment, the coloring property is not improved by heating at a temperature lower than 100° C. and a pressure lower than 101 kPa.

The hydrothermal treatment may be performed by placing a reaction solution to which the oxidizing agent is added in a pressure-resistant vessel, and performing heating. For example, the hydrothermal treatment may be performed by placing a reaction solution in a pressure-resistant vessel including an inner cylinder vessel made of PTFE and an outer cylinder made of pressure-resistant stainless steel, and then performing heating in an oil bath. Alternatively, the hydrothermal treatment may also be performed by placing a purified dispersion solution in a medium bottle using a sterilizer such as LSX-500 manufactured by Tomy Seiko Co., Ltd.

In the hydrothermal treatment, the pH of the reaction solution after adding the oxidizing agent may be 7 or less, and more preferably 5 or less. Hydrochloric acid, nitric acid or the like can be used for the pH adjustment.

In the hydrothermal treatment, the reaction solution after adding the oxidizing agent can be subjected to membrane purification. Specifically, an unreacted cerium (III) ion remaining in the dispersion solution after completion of the reaction can be removed by filtration with an ultrafiltration membrane or dialysis with a semi-permeable membrane. By removing the unreacted cerium (III) ion, the performance of the cerium oxide nanoparticle obtained after the hydrothermal treatment is made uniform, thus making it possible to obtain a monodisperse nanoparticle. The unreacted cerium (III) may be removed such that the cerium (III) concentration is 10 mM or less, and preferably 5 mM or less. The nanoparticle concentration can also be increased by filtration with an ultrafiltration membrane and dialysis with a semi-permeable membrane. Thereafter, the cerium oxide nanoparticle can also be isolated from the dispersion solution by the method described later.

When the particle size of cerium oxide after the hydrothermal treatment exceeds 300 nm, the particle may be pulverized so that the particle size is 1 to 300 nm. Examples of the method of pulverization include methods using a pulverizer such as a roller mill, a jet mill, a hammer mill, a pin mill, a rotary mill, a vibration mill, a planetary mill, an attritor, a bead mill, or an ultrasonic pulverizer. Both dry pulverization and wet pulverization can be employed. In wet pulverization, a dispersion solution of cerium oxide after the hydrothermal treatment or a dispersion solution after the purification treatment can be used. In dry pulverization, cerium oxide dried by the method described later can be used.

The presence of cerium oxide contained in the obtained dispersion solution can be confirmed by acquiring an XANES spectrum described later and confirming the presence of the maximum absorption of more than 5,726 eV and 5,731 eV or less and 5,735 eV or more and 5,739 eV or less.

The cerium oxide nanoparticle can be isolated by drying the dispersion solution using an evaporator, a freeze dryer or the like. The cerium oxide nanoparticle can also be isolated by dropping the dispersion solution onto a substrate made of glass, plastic, ceramics or the like and air-drying the dispersion solution, drying the dispersion solution in a desiccator, or drying the dispersion solution with a dryer or a drying machine. The cerium oxide nanoparticle can also be isolated by dropping the dispersion solution onto a heat block and heating the dispersion solution to thereby volatilize the solvent. The cerium oxide nanoparticle can also be isolated by drying the dispersion solution with a spray dryer or the like to thereby volatilize the solvent. The cerium oxide nanoparticle can also be isolated by subjecting the dispersion solution to a centrifuge to precipitate the cerium oxide nanoparticle, and removing the supernatant. The cerium oxide nanoparticle can be isolated on a filtration membrane by filtering the dispersion solution through ultrafiltration or suction filtration and completely removing water. To improve the efficiency of the drying step in the above operation, an azeotropic solvent may be added to the dispersion solution, or the solvent of the dispersion solution may be replaced with a solvent having a lower boiling point. To improve the efficiency of the centrifugal operation, a coprecipitation agent may be added to the dispersion solution, or a solvent may be added to improve ionic strength and reduce the dispersibility of the nanoparticle. Prior to the above operations, the dispersion solution may be fractionated in the size of the nanoparticle by an ultrafiltration membrane, centrifugation or the like.

The dispersion solution may contain an ionic component. Examples of the ionic component include, as a component that imparts buffering performance, acetic acid, phthalic acid, succinic acid, carbonic acid, tris(hydroxymethyl)aminomethane (Tris), 2-morpholinoethanesulfonic acid, monohydrate (MES), bis(2-hydroxyethyl)iminotris(hydroxymethyl)methane (Bis-Tris), N-(2-acetamido)iminodiacetic acid (ADA), piperazine-1,4-bis(2-ethanesulfonic acid) (PIPES), N-(2-acetamido)-2-aminoethanesulfonic acid (ACES), 2-hydroxy-3-morpholinopropanesulfonic acid (MOPSO), N,N-bis(2-hydroxyethyl)-2-aminoethanesulfonic acid (BES), 3-morpholinopropanesulfonic acid (MOPS), N-tris(hydroxymethyl)methyl-2-aminoethanesulfonic acid (TES), 2-[4-(2-hydroxyethyl)-1-piperazinyl]ethanesulfonic acid (HEPES), 2-hydroxy-N-tris (hydroxymethyl)methyl-3-aminopropanesulfonic (TAPSO), piperazine-1,4-bis(2-hydroxy-3-propanesulfonic acid) (POPSO), 2-hydroxy-3-[4-(2-hydroxyethyl)-1-piperazinyl]propanesulfonic acid (HEPSO), 3-[4-(2-hydroxyethyl)-1-piperazinyl]propanesulfonic acid (HEPPS), (Tricine), N,N-bis(2-hydroxyethyl) glycine (Bicine), and N-tris(hydroxymethyl)methyl-3-aminopropanesulfonic acid (TAPS); and as a component that does not impart buffering performance, sodium chloride and potassium chloride. These ionic components can be added to have a final concentration of 0.1 mM to 1 M. These ionic components may be added to the dispersion solution after completion of the reaction, may be added after filtration with an ultrafiltration membrane, may be used as a dialysate, or may be added to the dispersion solution after dialysis. These ionic components may be added to the dried cerium oxide nanoparticle to form a dispersion solution.

The dispersion solution may be stored as a dispersion solution after completion of the reaction, may be stored as a purified product obtained by filtering the dispersion solution after completion of the reaction with an ultrafiltration membrane or a purified product obtained by dialyzing the dispersion solution after completion of the reaction with a semi-permeable membrane, or may be stored as a cerium oxide nanoparticle isolated by drying the dispersion solution using an evaporator, a spray dryer, a freeze dryer or the like.

In a dry powder, a dispersant may be added before or after drying to suppress aggregation of the cerium oxide nanoparticles. As the dispersant, hydrophilic polymers such as starch, polyvinyl alcohol, polyvinylpyrrolidone, polyacrylic acid, polyethylene oxide, and polyacrylamide, cationic surfactants such as quaternary ammonium salts, anionic surfactants such as higher fatty acid salts and alkyl sulfate ester salts, amphoteric surfactants such as alkyl betaines, and nonionic surfactants such as polyoxyethylene sorbitan fatty acid salts and polyoxyethylene alkyl ethers are preferable, and polyvinyl alcohol, polyvinylpyrrolidone, cationic surfactants, and nonionic surfactants are more preferable.

The dispersion solution may also be stored as a dispersion solution containing a solvent component such as the azeotropic solvent or the ionic component that has been added, or may be stored as a dispersant whose pH has been adjusted. When the dispersion solution is stored, the dispersion solution is preferably stored under a refrigerated state.

Characteristics of Cerium Oxide Nanoparticle

When the cerium oxide nanoparticle forms a dispersion solution, the particle size thereof can be measured as a hydrodynamic diameter.

The hydrodynamic diameter of the cerium oxide nanoparticle is calculated as the average particle size from the number conversion histogram obtained by measuring dynamic light scattering to obtain an autocorrelation function, and analyzing the autocorrelation function by the non-negative least squares method (NNLS method). The dynamic light scattering is measured using ELSZ-2000ZS manufactured by Otsuka Electronics Co., Ltd. The hydrodynamic diameter of the cerium oxide nanoparticle may be 1 to 1,000 nm, preferably 1 to 300 nm, more preferably 1 to 200 nm, still more preferably 1 to 150 nm, and most preferably 1 to 100 nm.

The hydrodynamic diameter is measured using a dispersion solution containing nanoparticles. The measurement is performed at 25° C. with the particle concentration adjusted to 0.001 to 1 mass %, the salt concentration adjusted to 100 mM or less, and the pH adjusted to 2 to 12. When the particle concentration is low, the concentration is adjusted by membrane concentration or evaporation, and when the particle concentration is high, the concentration is adjusted by dilution with a solvent. In the measurement, when the particle concentration of the dispersion solution is known, the concentration may be adjusted by the above methods. When the concentration of cerium oxide is unknown, for example, the cerium ion concentration is determined by ICP emission spectrometry (ICP-OES) or ICP mass spectrometry (ICP-MS), and the cerium oxide concentration is determined on the assumption that all the cerium ions are $CeO_2$, and the concentration is adjusted. When the nanoparticle is in the form of a dispersion solution and does not contain impurities that affect the value of the hydrodynamic diameter, the hydrodynamic diameter may be measured as is. When the dispersion solution contains a compound that affects the value of the hydrodynamic diameter other than the nanoparticle containing cerium oxide, the measurement is performed after removing the compound by membrane purification or the like. When debris is contained other than cerium oxide, a supernatant obtained by removing the debris by centrifugation is measured. It is also possible to perform the measurement after ultrasonic treatment of the dispersion solution.

The cerium oxide nanoparticle is characterized by the molar ratio of cerium (III) to cerium (IV) measured by XPS and the energy states of cerium (III) and cerium (IV) measured from an XANES spectrum.

In the cerium oxide nanoparticle, the energy states of cerium (III) and cerium (IV) in $Ce_2O_3$ and $CeO_2$ can be observed by measurement of the X-ray absorption fine structure (XAFS) spectrum. In the XAFS spectrum, a structure at about 20 eV from the absorption edge is called the X-ray absorption near edge structure (XANES). Information relating to the valence and structure of the atom of interest can be obtained from the XANES, and the energy states of cerium (III) and cerium (IV) relating to the oxidation-reduction reaction of cerium oxide are reflected on the peak position and peak intensity ratio of the maximum absorption of the XANES spectrum.

The XANES spectrum is measured using a Si(111) double crystal spectrometer as a spectrometer, a Ce L3 absorption edge as an absorption edge, a transmission method as a detection method, and an ion chamber as a detector. The XANES spectrum can be measured in any form including nanoparticles. When the nanoparticle is in the form of a dispersion solution, the particle concentration is adjusted to 1 to 10 mass %, and when the nanoparticle is in the form of a powder or a composite of a powdery nanoparticle and a film, a resin, a fiber or the like, the measurement is performed in the form as it is. In a thin sample of a composite of a film, a resin, or a fiber, the thin samples may be stacked in 2 to 100 layers, and this may be measured.

The cerium oxide nanoparticle has a maximum absorption of more than 5,729 eV and 5,731 eV or less and 5,735 eV or more and 5,739 eV or less in the Ce L3 edge XANES spectrum obtained by measurement of the X-ray absorption fine structure spectrum. That is, the cerium oxide nanoparticle contains the basic amino acid, the alicyclic amine, the aromatic heterocyclic compound, the polymer having a heterocyclic amine skeleton, or the boron compound as the stabilizer, and has a maximum absorption of more than 5,729 eV and 5,731 eV or less and 5,735 or more and 5,739 eV or less in the XANES spectrum.

In the cerium oxide nanoparticle, the molar ratio of cerium (III) to cerium (IV) may be measured by X-ray photoelectron spectroscopy (XPS). Information relating to elements and the valence can be obtained by XPS, and the molar ratio of cerium (III) to cerium (IV) can be quantified using the peak area ratio of the obtained spectrum. When the molar ratio of each Ce ion is calculated, in the obtained spectrum, the horizontal axis correction is performed so that the main peak of $Ce^{4+}$ in $Ce3d_{5/2}$ is set to 881.8 eV, and thereafter, peak division of Ce3d is performed to calculate the molar ratio of each Ce ion. In all of the cerium oxide nanoparticles, the molar ratio of $Ce^{4+}$ to $Ce^{3+}$ obtained by XPS measurement is 40:60 to 100:0. In the cerium oxide nanoparticle, the molar ratio of $Ce^{4+}$ to $Ce^{3+}$ obtained by XPS measurement may be 40:60 to 100:0, preferably 50:50 to 100:0, and more preferably 60:40 to 100:0. When the molar ratio of $Ce^{4+}$ to $Ce^{3+}$ is measured by XPS, powder obtained by drying the nanoparticle is used. For example, a sample obtained by freeze-drying a dispersion solution containing the cerium oxide nanoparticle, which has been subjected to membrane purification, is used. When the nanoparticle is in the form of a composite with a film, a resin, or a fiber, the surface on which the nanoparticle is processed is measured.

That is, the cerium oxide nanoparticle contains the basic amino acid, the alicyclic amine, the aromatic heterocyclic compound, the polymer having a heterocyclic amine skeleton, or the boron compound as the stabilizer, has a maximum absorption of more than 5,729 eV and 5,731 eV or less and 5,735 eV or more and 5,739 eV or less in the XANES spectrum, and has a molar ratio of $Ce^{4+}$ to $Ce^{3+}$ of 40:60 to 100:0. In another example, the cerium oxide nanoparticle is produced by adding an oxidizing agent to a solution containing the basic amino acid, the alicyclic amine, the aromatic heterocyclic compound, the polymer having a heterocyclic amine skeleton or the boron compound as the stabilizer, and the cerium (III) ion, and then subjecting the mixed solution to a hydrothermal treatment, has a maximum absorption of more than 5,729 eV and 5,731 eV or less and 5,735 eV or more and 5,739 eV or less in the XANES spectrum, and has a molar ratio of $Ce^{4+}$ to $Ce^{3+}$ of 40:60 to 100:0.

As another feature, the cerium oxide nanoparticle is characterized by its crystallinity.

The Bragg angle (2θ) of the cerium oxide nanoparticle may be measured by X-ray diffraction (XRD). Information relating to crystallinity can be obtained from the position and intensity of the peak in the obtained XRD spectrum.

The cerium oxide nanoparticle has diffraction peaks at Bragg angles 2θ of 27° to 29°, 31° to 33°, 46° to 48°, and 55° to 57°, respectively, in the XRD spectrum. In addition to these peaks, the cerium oxide nanoparticle may have peaks at 58° to 60°, 68° to 70°, 75° to 77°, 78° to 80°, and 87° to 90°. The diffraction peak is a maximum value of intensity in the XRD spectrum. When the intensity of the obtained spectrum is low at the time of obtaining the Bragg angle indicating the diffraction peak, processing such as smoothing may be performed.

Further, in the obtained XRD spectrum of the cerium oxide nanoparticle, the peak intensity ratio of the peak intensity at 27° to 29° to the peak intensity at 46° to 48° may be 1.8 or less, preferably 1.7 or less, and more preferably 1.6 or less. In calculating the peak intensity at 27° to 29°, first, a straight line connecting the peak intensity at 24° and the peak intensity at 36° is defined as a baseline. Next, the Bragg angle of the diffraction peak at 27° to 29° is determined. Then, a difference between the intensity of the XRD spectrum and the intensity of the baseline at the Bragg angle is defined as the peak intensity at 27° to 29°. In calculating the peak intensity at 46° to 48°, a straight line connecting the peak intensity at 44° and the peak intensity at 64° is defined as a baseline. Next, the Bragg angle of the diffraction peak at 46° to 48° is determined. Then, a difference between the intensity of the XRD spectrum and the intensity of the baseline at the Bragg angle is defined as the peak intensity at 46° to 48°.

That is, the cerium oxide nanoparticle contains the basic amino acid, the alicyclic amine, the aromatic heterocyclic compound containing a nitrogen atom in the ring structure thereof, the polymer having a heterocyclic amine skeleton, or the boron compound as the stabilizer, has diffraction peaks at Bragg angles (2θ) of 27° to 29°, 31° to 33°, 46° to 48°, and 55° to 57° in the XRD spectrum, and has a peak intensity ratio of the peak intensity at 27° to 29° to the peak intensity at 46° to 48° of 1.8 or less. In another example, the cerium oxide nanoparticle is produced by adding an oxidizing agent to a solution containing the basic amino acid, the alicyclic amine, the aromatic heterocyclic compound containing a nitrogen atom in the ring structure thereof, the polymer having a heterocyclic amine skeleton or the boron compound as the stabilizer, and the cerium (III) ion, and then subjecting the mixed solution to a hydrothermal treatment, has diffraction peaks at Bragg angles (2θ°) of 27° to 29°, 31° to 33°, 46° to 48°, and 55° to 57° in the XRD spectrum, and has a peak intensity ratio of the peak intensity at 27° to 29° to the peak intensity at 46° to 48° of 1.8 or less. In particular, it is preferable that the cerium oxide nanoparticle has diffraction peaks at Bragg angles (2θ°) of 27° to 29°, 31° to 33°, 46° to 48°, and 55° to 57° in the XRD spectrum, the peak intensity ratio of the peak intensity at 27° to 29° to the peak intensity at 46° to 48° is 1.8 or less, and the number of diffraction peaks at 5° to 80° is 10 or less.

The zeta potential of the cerium oxide nanoparticle is measured by laser Doppler electrophoresis. The zeta potential is measured using ELSZ-2000ZS manufactured by Otsuka Electronics Co., Ltd. The zeta potential is one of values representing the electrical properties of the interface of the colloid in the solution, and changes depending on the pH. A value in a solution having a pH of 7 is used. The zeta potential of the cerium oxide nanoparticle may be +10 mV or more, and is preferably +15 mV or more, more preferably +20 mV or more, and most preferably +25 mV or more.

When the zeta potential of the nanoparticle is measured by the laser Doppler method, for example, membrane concentration or dilution with water is performed so that the particle concentration of the dispersion solution is 0.001 mass % or more and 1 mass % or less. Then, the salt strength is adjusted to 1 to 50 mM, the pH of the dispersion solution is adjusted to 7 with nitric acid or sodium hydroxide, and measurement is performed at room temperature. Use of cerium oxide nanoparticle The cerium oxide nanoparticle or the dispersion solution thereof can be used as an antiviral agent. As a method of evaluating the performance as an antiviral agent, the cerium oxide nanoparticle or the dispersion solution thereof are brought into contact with or mixed with a virus, and then the amount of the virus is quantified. Examples of the method of quantifying the virus include a method of measuring the amount of viral antigen by the ELISA method, a method of quantifying viral nucleic acid by PCR, a method of measuring the infectivity titer by the plaque method, and a method of measuring the infectivity titer by the 50% infectious dose measurement method. As the measurement for the antiviral activity, a method of measuring the infectivity titer by the plaque method or the 50% infectious dose measurement method is preferably used. The unit of the virus infectivity titer in the 50% infectious dose measurement method is denoted by $TCID_{50}$ (tissue culture infectious dose 50) when cultured cells are tested as a subject, $EID_{50}$ (egg infectious dose 50) when hatched eggs are used, and $LD_{50}$ (lethal dose 50) in animals. In addition, in the 50% infectious dose measurement method, there are the Reed-Muench method, the Behrens-Kaeber method, the Spearman-Karber method and the like as a method of calculating the infectivity titer from the obtained data, but the Reed-Muench method is preferably used. As the criterion for the antiviral activity, in general, the antiviral activity is determined to be effective when the logarithmic reduction value of the infectivity titer is 2.0 or more compared to the infectivity titer before the cerium oxide nanoparticle is allowed to act or a control not containing the nanoparticle.

In a preferred example of the dispersion solution containing the cerium oxide nanoparticle, the dispersion solution contains the boron compound and the cerium oxide nanoparticle, and the logarithmic reduction value of the virus infectivity titer $TCID_{50}$ in the 50% infectious dose measurement method in the virus inactivation test for cell culture is 2.0 or more compared to the infectivity titer before the cerium oxide nanoparticle is allowed to act or a control not containing the nanoparticle. When the logarithmic reduction value of the virus infectivity titer $TCID_{50}$ in the virus inactivation test is 2.0 or more, it can be used as an antiviral agent. The logarithmic reduction value of the virus infectivity titer is preferably 2.5 or more, and particularly preferably 3.0 or more.

Examples of the virus that can be inactivated by the cerium oxide nanoparticle or the dispersion solution thereof include rhinovirus, poliovirus, foot-and-mouth disease virus, rotavirus, norovirus, enterovirus, hepatovirus, astrovirus, sapovirus, hepatitis E virus, influenza A virus, influenza B virus, influenza C virus, parainfluenza virus, mumps virus (mumps), measles virus, human metapneumovirus, RS virus, Nipah virus, Hendra virus, yellow fever virus, dengue virus, Japanese encephalitis virus, West Nile virus, hepatitis B virus, hepatitis C virus, Eastern equine encephalitis virus, Western equine encephalitis virus, O'nyong-nyong virus, rubella virus, Lassa virus, Junin virus, Machupo virus, Guanarito virus, Sabia virus, Crimean-Congo hemorrhagic fever virus, sandfly fever, hantavirus, Sin Nombre virus, rabies virus, Ebola virus, Marburg virus, bat lyssavirus, human T-cell leukemia virus, human immunodeficiency virus, human coronavirus, SARS coronavirus, SARS coronavirus 2, human parvovirus, polyomavirus, human papillomavirus, adenovirus, herpesvirus, varicella zonal rash virus, EB virus, cytomegalovirus, smallpox virus, monkeypox virus, cowpox virus, Molluscipoxvirus, and parapoxvirus.

When used as an antiviral agent, the cerium oxide nanoparticle or the dispersion solution thereof can be kneaded as an additive into a material such as a fiber, a tube, a bead, a rubber, a film, or a plastic, or can be applied to the surface of these materials. For example, the cerium oxide nanoparticle or the dispersion solution thereof can be used in various fields as a mask, a cap for medical use, a shoes cover for medical use, an air conditioner filter, a filter for an air cleaner, a filter for a vacuum cleaner, a filter for a ventilation fan, a filter for a vehicle, a filter for an air conditioner, a fin of an air conditioner, plastic parts such as a rover of an air conditioner's blowing outlet and a blowing fan, a fin of a car air conditioner, plastic parts such as a rover of a car air conditioner's blowing outlet and a blowing fan, clothes, bedding clothes, a net in a screen door, a net for a chicken house, nets such as a mosquito net, a wall paper and a window, a blind, an interior material of a building such as a hospital, an interior material of a train and an automobile, a seat for a vehicle, a blind, a chair, a sofa, virus-treating equipment, and a construction material such as a door, a ceiling, a floor, and a window.

The cerium oxide nanoparticle or the dispersion solution thereof can be used as an antibacterial agent.

Examples of a method of evaluating the performance as an antibacterial agent include EN 1040:2005, which is the European Norm (EN) Test Method. In this test method, a bacterial suspension is added to a test solution containing an active ingredient of an antibacterial agent, and the number of bacterial cells is measured after a certain period of time. The bacterial suspension contains 0.85% NaCl and 0.1% tryptone as medium components, and is prepared by mixing so that the volume ratio of the test solution to the bacterial suspension is 9:1. As the criterion for the antibacterial activity, in general, the antibacterial activity is determined to be effective when the logarithmic reduction value of the number of bacterial cells is 2.0 or more compared to the number of bacterial cells before the cerium oxide nanoparticle is allowed to act or a control not containing the nanoparticle. Examples of the method of quantifying the number of bacterial cells include a method of measuring the amount of bacterial cells by turbidity (OD600) measurement, a method of measuring the amount of bacterial cells by colony formation, and a method of quantifying nucleic acid of bacterial cells by PCR. As the measurement for the antibacterial activity, a method of measuring the infectivity titer by turbidity measurement or colony formation is preferably used.

In a preferred example of the dispersion solution containing the cerium oxide nanoparticle, the dispersion solution contains the boron compound and the cerium oxide nanoparticle, and the logarithmic reduction value of the amount of bacterial cells is 2.0 or more compared to the infectivity titer before the cerium oxide nanoparticle is allowed to act or a control not containing the nanoparticle. When the logarithmic reduction value of the number of bacterial cells in the antibacterial test is 2.0 or more, it can be used as an antibacterial agent. The logarithmic reduction value of the number of bacterial cells is preferably 2.5 or more, and particularly preferably 3.0 or more.

Examples of target microorganisms for which the cerium oxide nanoparticle or the dispersion solution thereof exhibits an antibacterial activity include the following. Examples of the bacteria include gram-positive bacteria and gram-negative bacteria. Examples of the gram-negative bacteria include bacteria belonging to the genus *Escherichia* such as *Escherichia coli*, bacteria belonging to the genus *Salmonella* such as *Salmonella enterica*, bacteria belonging to the genus *Pseudomonas* such as *Pseudomonas aeruginosa*, bacteria belonging to the genus *Shigella* such as *Shigella dysenteriae*, bacteria belonging to the genus *Klebsiella* such as *Klebsiella pneumoniae*, and bacteria belonging to the genus *Legionella* such as *Legionella pneumophila*. Examples of the gram-positive bacteria include bacteria belonging to the genus *Staphylococcus* such as *Staphylococcus*, bacteria belonging to the genus *Bacillus* such as *Bacillus subtilis*, and bacteria belonging to the genus *Mycobacterium* such as *Mycobacterium tuberculosis*. Examples of the eumycetes include fungi and yeasts. Examples of the fungi include filamentous fungi belonging to the genus *Aspergillus* such as *Aspergillus niger*, filamentous fungi belonging to the genus *Penicillium* such as blue mold, filamentous fungi belonging to the genus *Cladosporium* such as black mold, filamentous fungi belonging to the genus *Alternaria* such as sooty mold, filamentous fungi belonging to the genus *Trichoderma* such as *Tsuchiaokabi*, and filamentous fungi belonging to the genus *Chaetomium* such as *Ketamakabi*. Examples of the yeasts include yeasts belonging to the genus *Saccharomyces* such as baker's yeast and beer's yeast, and yeasts belonging to the genus *Candida* such as *Candida albicans*.

The cerium oxide nanoparticle can be used for antibacterial processing by being added at the time of molding a fiber, a tube, a bead, a rubber, a film, a plastic or the like, or by being applied to the surface thereof as a dispersion solution. Examples of the product that can be antibacterial-processed by using the cerium oxide nanoparticle or the dispersion solution thereof include a chrysanthemum-shaped cover of the drain hole in a kitchen sink, a drain plug, a fixing packing material of a window, a fixing packing material of a mirror, a water-proof packing material in a bathroom, in a washing stand, and in a kitchen, an inner packing material of a refrigerator door, a bath mat, an anti-sliding rubber of a washing bowl and a chair, a hose, a shower head, a packing material used in a water purifier, a plastic product of a water purifier, a packing material used in a clothes washing machine, a plastic product used in a clothes washing machine, a mask, a cap for medical use, a shoes cover for medical use, an air conditioner filter, a filter for an air cleaner, a filter for a vacuum cleaner, a filter for a ventilation fan, a filter for a vehicle, a filter for an air conditioner, a fin of an air conditioner, plastic parts such as a rover of an air conditioner's blowing outlet and a blowing fan, a fin of a car air conditioner, plastic parts such as a rover of a car air conditioner's blowing outlet and a blowing fan, clothes, bedding clothes, a net in a screen door, a net for a chicken house, a net such as a mosquito net, a wall paper and a window, a blind, an interior material of a building such as a hospital, an interior material of a train and an automobile, a seat for a vehicle, a blind, a chair, a sofa, virus-treating equipment, and a construction material such as a door, a ceiling, a floor, and a window. As described above, the product processed with the dispersion solution of the cerium oxide nanoparticle can be used in various fields as a sanitary material.

By adding the cerium oxide nanoparticle or the dispersion solution thereof to a disinfectant, an antiviral action or an antibacterial action can be imparted to the disinfectant solution. As the disinfectant, the cerium oxide nanoparticle or the dispersion solution thereof can be applied to those containing, as an active ingredient, a disinfectant ingredient such as a chlorine-based disinfectant ingredient, an iodine-based disinfectant ingredient, a peroxide-based disinfectant ingredient, an aldehyde-based disinfectant ingredient, a phenol-based disinfectant ingredient, a biguanide-based disinfectant ingredient, a mercury-based disinfectant ingredient, an alcohol-based disinfectant ingredient, an anionic surfactant-based disinfectant ingredient, a cationic surfactant-based disinfectant ingredient, an amphoteric surfactant-based disinfectant ingredient, a nonionic surfactant-based disinfectant ingredient, or a naturally occurring substance-based disinfectant ingredient. In addition, by adding the cerium oxide nanoparticle or the dispersion solution thereof to a liquid containing ultrafine bubbles, an antiviral action or an antibacterial action can be imparted.

In a liquid disinfectant, the concentration of the cerium oxide nanoparticle can be optionally set between 0.0001 mass % and 10 mass %.

Examples of the chlorine-based disinfectant ingredient include sodium hypochlorite, chlorine, and chlorinated isocyanuric acid.

Examples of the iodine-based disinfectant ingredient include iodine, povidone iodine, nonoxynol iodide, and phenoxy iodide.

Examples of the peroxide-based disinfectant ingredient include hydrogen peroxide, potassium permanganate, peracetic acid, organic peracetic acid, sodium percarbonate, sodium perborate, and ozone.

Examples of the aldehyde-based disinfectant ingredient include glutaraldehyde, phthalal, and formaldehyde.

Examples of the phenol-based disinfectant ingredient include isopropylmethylphenol, thymol, eugenol, triclosan, cresol, phenol, chlorocresol, parachlorometacresol, parachlorometaxylenol, orthophenylphenol, alkyl paraoxybenzoates, resorcin, hexachlorophene, and salicylic acid or salts thereof.

Examples of the biguanide-based disinfectant ingredient include chlorhexidine, chlorhexidine gluconate, and chlorhexidine hydrochloride.

Examples of the mercury-based disinfectant ingredient include mercurochrome, mercuric chloride, and thimerosal.

Examples of the alcohol-based disinfectant ingredient include ethanol and isopropanol. In this example, the concentration of the alcohol-based disinfectant ingredient may be 30 to 80 mass %.

Examples of the anionic surfactant-based disinfectant ingredient include alkylbenzene sulfonates, fatty acid salts, higher alcohol sulfates, polyoxyethylene alkyl ether sulfates, α-sulfo fatty acid esters, α-olefin sulfonates, monoalkyl phosphate salts, and alkane sulfonates.

Examples of the cationic surfactant-based disinfectant ingredient include alkyltrimethylammonium salts, dialkyldimethylammonium salts, alkyldimethylbenzylammonium salts, polyhexamethylene biguanide, and benzethonium chloride.

Examples of the amphoteric surfactant-based disinfectant ingredient include alkylamino fatty acid salts, alkyl betaines, and alkylamine oxides.

Examples of the nonionic surfactant-based disinfectant ingredient include polyoxyethylene alkyl ethers, polyoxyethylene-polyoxypropylene alkyl ethers, polyoxyethylene-polyoxybutylene alkyl ethers, alkylamine ethoxylates, alkylamine alkoxylates, polyoxyethylene-polyoxypropylene block copolymers, polyoxyethylene-polyoxypropylene block copolymers (reverse type), ethylene oxide-propylene oxide adducts of polyhydric alcohols, alkyl glucosides, and fatty acid alkanolamides.

Examples of the naturally occurring substance-based disinfectant ingredient include plant-based agents such as hinokitiol, anethole, anise oil, borneol, camphor, carvone, cassia oil, pigweed oil, cineole, citral, citronellal, eugenol, pinene, geraniol, lemon oil, liolol, menthol, orange oil, safrole, thymol, and polyphenols (flavanols, gallotannins, ellagitannins, phlorotannins), animal-based agents such as chitin and chitosan obtained from crustacean shells as raw materials and calcined seashell powders obtained by calcination of scallop and oyster shells, microorganism-based agents such as polylysine, and enzyme-based agents such as lysozyme. Antibacterial peptides produced by organisms to defend themselves against external microorganisms can also be used, and examples thereof include histatin, defensin, lactoferrin, lactoferricin which is a degradation product of lactoferrin, magainin, cecropin, and melititin.

Plant extracts can also be used as the disinfectant ingredient of the naturally occurring substance. Specific examples thereof include extracts of plants such as grapefruit seed, Chenopodiaceae such as *Bassia scoparia*; Iridaceae such as blackberry lily (*Iris domestica*); Hypericaceae such as *Hypericum perforatum*; Burseraceae such as olibanum tree and Gilead balsam tree; Campanulaceae such as *Adenophora triphylla* var. japonica; Asteraceae such as echinacea (*Echinacea purpurea*), chamomile (*Matricaria chamomilla*), burdock (*Arctum lappa*), Canada goldenrod (*Solidago canadensis*), and *Atractylodes lancea*; Ranunculaceae such as *Coptis japonica*; Caprifoliaceae such as Japanese honeysuckle (*Lonicera japonica*); Lauraceae such as laurel (*Laurus nobilis*); Moraceae such as hop (*Humulus lupulus*); Labiatae such as *Scutellaria baicalensis*, oregano (Origanum vulgare), *Schizonepeta tenuifolia*, sage (*Salvia officinalis*), thyme (Thymus), lemon balm (*Melissa officinalis*), *Mosla japonica*, lavender (*Lavandula*), and rosemary (*Salvia rosmarinus*); Zingiberaceae such as *Amomum xanthioides* wall and ginger (*Zingiber officinale*); Caprifoliaceae such as *Sambucus nigra*; Taxodiaceae such as Japanese cedar (*Cryptomeria japonica*); Apiaceae such as *Angelica dahurica* and *Saposhnikovia divaricata*; Polygonaceae such as *Polygonum aviculare*; Ericaceae such as bearberry leaf (*Arctostaphylos uvaursi*); Sauruaceae such as *Houttuynia*

*cordata*; Zygophyllaceae such as *Tribulus terrestris*; Vitaceae such as *Cayratia japonica*; Myrtaceae such as allspice (*Pimenta dioica*), tea tree (*Melaleuca alternifolia*), eucalyptus, and clove (*Syzygium aromaticum*); Fabaceae such as *Maackia amurensis, Styphnolobium japonicum, Sophora flavescens, Dalbergia cochinchinensis*, and *Millettia pendula*; Hamamelidaceae such as *Liquidambar formosana*; Rutaceae such as *Phellodendron amurense* and *Citrus unshiu*; Boraginaceae such as comfrey (*Symphytum officinale*); Berberidaceae such as barberry (*Berberis*) and *Nandina domestica*; Magnoliaceae such as *Magnolia obovata*; Rosaceae such as great burnet (*Sanguisorba officinalis*) and rose; Viscaceae such as mistletoe (*Viscum album*); Liliaceae such as *Anemarrhena asphodeloides, Aspidistra elatior*, and *Glycyrrhiza*; Gentianaceae such as large leaf gentian (*Gentiana macrophylla*); Poaceae such as moso bamboo (*Phyllostachys edulis*); and Fucaceae such as *Ascophyllum nodosum.*

Examples of the ultrafine bubble include bubbles that have a particle size of 500 nm or less and contain one or two or more gases selected from air, oxygen, hydrogen, nitrogen, carbon dioxide, argon, neon, xenon, fluorinated gases, ozone, and an inert gas therein. Ultrafine bubbles are also called nanobubbles. The concentration may be 100,000 cells/ml or more.

The disinfectant containing the cerium oxide nanoparticle or the dispersion solution thereof may contain, in addition to the above-described disinfectant ingredients, an appropriate optional component according to the dosage form thereof. Specifically, the disinfectant may contain a solvent, a wetting agent, a thickener, an antioxidant, a pH adjuster, an amino acid, an antiseptic, a sweetener, a fragrance, a surfactant, a coloring agent, an auxiliary agent for enhancing a disinfection effect, a chelating agent, an ultraviolet absorber, an antifoaming agent, an enzyme, a formulation stabilizer and the like.

The disinfectant to which the cerium oxide nanoparticle or the dispersion solution thereof is added can be provided in various forms such as liquid, gel, and powder. The liquid disinfectant can be provided as a lotion, a spray or the like, and can be used by being filled in a bottle with a metering cap, a trigger type spray container, a squeeze type or dispenser type pump spray container or the like, and sprayed or atomized. The liquid disinfectant can be provided as a wet sheet by impregnating sheet-like paper, cloth or the like with the liquid disinfectant, and filling the sheet or the like into a container such as a bottle or a bucket.

By adding the cerium oxide nanoparticle or the dispersion solution thereof to a coating material, an antiviral action can be imparted to the coating material. At this time, a resin emulsion composition may be contained in the coating material for the purpose of immobilizing the cerium oxide nanoparticle in the coating film.

Examples of the resin emulsion composition include an ethylene-vinyl acetate resin emulsion, a vinyl chloride resin emulsion, an epoxy resin emulsion, an acrylic resin emulsion, a urethane resin emulsion, an acrylic silicon resin emulsion, a fluororesin emulsion, and a synthetic resin emulsion composed of resin components such as composites of these resins. The mass ratio of the cerium oxide nanoparticle added to the coating material and the solid content in the resin emulsion can be optionally set to between 0.01:99.99 to 99.99:0.01.

The ethylene-vinyl acetate copolymer resin emulsion is obtained by copolymerizing ethylene and a vinyl acetate monomer, and may be obtained by copolymerizing these with a vinyl monomer having a functional group such as an amino group, a secondary amino group, a tertiary amino group, a quaternary amino group, a carboxyl group, an epoxy group, a sulfonate group, a hydroxyl group, a methylol group, or an alkoxy acid group.

The vinyl chloride copolymer resin emulsion is obtained by polymerizing vinyl chloride, and may be obtained by copolymerizing vinyl chloride with a vinyl monomer having a functional group such as an amino group, a secondary amino group, a tertiary amino group, a quaternary amino group, a carboxyl group, an epoxy group, a sulfonate group, a hydroxyl group, a methylol group, or an alkoxy acid group.

Examples of the monomer that can be used for the preparation of the acrylic resin emulsion include (meth)acrylic acid ester monomers such as methyl (meth)acrylate, ethyl (meth)acrylate, propyl (meth)acrylate, butyl (meth)acrylate, hexyl (meth)acrylate, heptyl (meth)acrylate, octyl (meth)acrylate, octadecyl (meth)acrylate, 2-ethylhexyl (meth)acrylate, cyclohexyl (meth)acrylate, nonyl (meth)acrylate, dodecyl (meth)acrylate, stearyl (meth)acrylate, isobornyl (meth)acrylate, dicyclopentanyl (meth)acrylate, phenyl (meth)acrylate, and benzyl (meth)acrylate; unsaturated bond-containing monomers having a carboxyl group such as acrylic acid, methacrylic acid, β-carboxyethyl (meth)acrylate, 2-(meth)acryloylpropionic acid, crotonic acid, itaconic acid, maleic acid, fumaric acid, an itaconic acid half ester, a maleic acid half ester, a maleic anhydride, and an itaconic anhydride; glycidyl group-containing polymerizable monomers such as glycidyl (meth)acrylate and allyl glycidyl ether; hydroxyl group-containing polymerizable monomers such as 2-hydroxyethyl (meth)acrylate, 2-hydroxypropyl (meth)acrylate, polyethylene glycol mono (meth)acrylate, and glycerol mono(meth)acrylate; ethylene glycol di(meth)acrylate, 1,6-hexanediol di(meth)acrylate, neopentyl glycol di(meth)acrylate, trimethylolpropane tri (meth)acrylate, polyethylene glycol di(meth)acrylate, polypropylene glycol di(meth)acrylate, diallyl phthalate, divinylbenzene, and allyl (meth)acrylate.

Examples of the monomer that can be used for preparation of the urethane resin emulsion include, as a polyisocyanate component, 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate, and as a diol component, polyester polyol, polyether polyol, polycarbonate polyol, polyacetal polyol, polyacrylate polyol, polyester amide polyol, polythioether polyol, and polyolefin polyols such as polybutadiene polyol.

Examples of the silicon-containing acrylic monomer that can be used for preparation of the acrylic silicon resin emulsion include γ-(meth)acryloxypropyltrimethoxysilane, γ-(meth)acryloxypropyltriethoxysilane, γ-(meth)acryloxypropylmethyldimethoxysilane, and γ-(meth)acryloxypropylmethyldiethoxysilane.

Examples of the monomer that can be used for preparation of the fluororesin emulsion include fluoroolefins (vinylidene fluoride, trifluoroethylene, chlorotrifluoroethylene, tetrafluoroethylene, pentafluoroethylene, hexafluoropropylene and the like) and fluorine-containing (meth)acrylates (trifluoroethyl (meth)acrylate, pentafluoropropyl (meth) acrylate, perfluorocyclohexyl (meth)acrylate and the like).

The coating material containing the cerium oxide nanoparticle or the dispersion solution thereof can contain a pigment, a matting material, an aggregate, a fiber, a cross-linking agent, a plasticizer, an antiseptic, an anti-mold agent, an antibacterial agent, an antifoaming agent, a viscosity modifier, a leveling agent, a pigment dispersant, an anti-settling agent, an anti-sagging agent, an ultraviolet absorber, a light stabilizer, an antioxidant, an adsorbent and the like as necessary. These components can be blended in the coating composition alone or in combination.

The coating material to which the cerium oxide nanoparticle or the dispersion solution thereof is added can be used, for example, for coating the interior surface of buildings. Examples of the interior surface include base materials such as a mortar, a concrete, a gypsum board, a siding board, an extrusion molded board, a slate board, an asbestos cement board, a fiber-mixed cement board, a calcium silicate board, an ALC board, a metal, a wood, a glass, a rubber, a ceramic, a fired tile, a ceramic tile, a plastic, and a synthetic resin, a cloth, a wall paper, and a coating film formed on these base materials. The coating material can also be applied to the exterior surface of buildings and structures other than buildings.

The resin composition containing the cerium oxide nanoparticle can be prepared by adding the cerium oxide nanoparticle or the dispersion solution containing the cerium oxide nanoparticle to a resin serving as a base (base resin), and exhibits excellent color tone and oxidative degradation performance against harmful substances such as viruses and bacteria.

The type of the base resin is not limited, and the base resin may be either a thermoplastic resin or a thermosetting resin, and may be a homopolymer, a copolymer, or a blend of two or more polymers. A thermoplastic resin is preferable from the viewpoint of good moldability.

Examples of the thermoplastic resin include polyolefins such as polyethylene, polypropylene, polystyrene, and polymethylpentene, alicyclic polyolefins, styrene-based resins such as acrylonitrile styrene resin (AS resin) and acrylonitrile butadiene styrene resin (ABS resin), polyamides such as nylon 6 and nylon 66, polyesters such as polyethylene terephthalate, polytrimethylene terephthalate, polybutylene terephthalate, and polybutylene succinate, polycarbonate, polyarylate, polyacetal, polyphenylene sulfide, vinyl chloride, fluorine-based resins such as tetrafluoroethylene, trifluoroethylene, chlorotrifluoroethylene, tetrafluoroethylene-hexafluoropropylene copolymers, and vinylidene fluoride, aramid, polyimide, acryl, methacryl, polyacetal, polyglycolic acid, and polylactic acid. Examples of the thermosetting resin include phenol resin, epoxy resin, urea resin, melamine resin, unsaturated polyester, polyurethane, polyimide, and silicone resin.

The resin composition is obtained by adding the cerium oxide nanoparticle to a base resin. The method of adding the cerium oxide nanoparticle is not particularly limited and, for example, the cerium oxide nanoparticle may be added to and kneaded with a base resin that has been brought into a molten state by heat or the like, or may be mixed with a base resin at a predetermined ratio and then melt-kneaded. In addition, the cerium oxide nanoparticle may be added to the base resin together with additives such as a flame retardant, a plasticizer, an antistatic agent, an antioxidant, a light resistance agent, a hydrolysis inhibitor, a pigment, and a lubricant. When the cerium oxide nanoparticle is exposed on the resin surface and localized, the contact efficiency with harmful substances such as viruses and bacteria is improved, and thus a sufficient effect is exhibited. The method of localizing the nanoparticle is not particularly limited, but when an additive is used in combination, the localization efficiency can be increased by selecting an additive having a relatively higher affinity with the cerium oxide nanoparticle than the base resin. Examples of such an additive include low molecular polymers and high molecular polymers of higher fatty acids, acid esters, acid amides, higher alcohols, and surfactants, but any additive can be preferably applied without any particular limitation as long as the additive has affinity with the cerium oxide nanoparticle. In addition, these additives may be added alone or in combination of two or more types thereof.

The cerium oxide nanoparticle to be added to the base resin can be melt-kneaded by a known method in any form of a powder, a pellet, a slurry, an aqueous dispersion, and an organic solvent dispersion solution without any particular limitation. The cerium oxide nanoparticle may also be added to the base resin together with a dispersant or as a mixture with a dispersant. The dispersant for the cerium oxide nanoparticle is not particularly limited, but a surfactant is preferable. Any of a cationic surfactant such as a quaternary ammonium salt, an anionic surfactant such as a higher fatty acid salt or an alkyl sulfate ester salt, an amphoteric surfactant such as an alkyl betaine, and a nonionic surfactant such as a polyoxyethylene sorbitan fatty acid salt or a polyoxyethylene alkyl ether can be applied, but a cationic surfactant and a nonionic surfactant are more preferable. The mixing ratio of the dispersant to the cerium oxide nanoparticle can be optionally adjusted without any particular limitation as long as the compatibility with the base resin to be added and the oxidation activity are not significantly impaired.

The content of the cerium oxide nanoparticle in the entire resin composition is not particularly limited as long as harmful substances such as viruses and bacteria can be decomposed, but is preferably 0.01 mass % or more and 60 mass % or less. When the content is less than 0.01 mass %, a sufficient effect is not exhibited, and when the content is more than 60 mass %, mechanical properties such as strength and durability of the resin may be impaired. The content is preferably 0.05 mass % or more and 50 mass % or less. The content is more preferably 0.1 mass % or more and 30 mass % or less. The content is still more preferably 3 mass % or more and 10 mass % or less. In addition, the resin composition may be made into a master batch, and the masterbatch may be kneaded into the same resin as the base resin or a resin different from the base resin at a predetermined ratio. In forming a masterbatch, the content of the cerium oxide nanoparticle is preferably 10 mass % or more.

The method of producing the resin composition is not particularly limited, and examples thereof include a method of mixing components constituting the resin composition using a mixer, and a method of melt-kneading these components uniformly. Examples of the mixer include a V-type blender, a super mixer, a super floater, and a Henschel mixer. The melt-kneading temperature is preferably 200° C. to 320° C., and more preferably 200° C. to 300° C. The obtained resin composition can be pelletized by a pelletizer and used.

The resin composition can be molded by any molding method. Examples of the molding method include injection molding, extrusion molding, inflation molding, blow molding, vacuum molding, compression molding, and gas assist molding.

The resin composition is characterized by being superior in color tone to a resin to which conventional cerium oxide nanoparticles are added. The value of yellowness index of the resin composition is preferably 15 or less, more preferably 10 or less, and still more preferably 5 or less. The yellowness index referred to herein is a value measured using a color computer (manufactured by Suga Test Instruments Co., Ltd.) according to JIS-K7373.

The resin composition can be widely used as a molded article having any shape. Examples of the molded article include injection molded articles, extrusion molded articles, vacuum-pressure molded articles, blow molded articles, sheets, fibers, fabrics, nonwoven fabrics, and composites with other materials.

Using the resin composition as a raw material, for example, a resin product such as an automobile interior material, an electrical appliance housing, a strap, a handrail, a door knob, or a partition plate can be obtained.

The resin composition containing the cerium oxide nanoparticle and the molded article thereof can be used as an antiviral resin. As a method of evaluating the performance as an antiviral resin, the molded article of the resin composition is brought into contact with a virus, and then the amount of the virus is quantified. Examples of the method of quantifying the virus include a method of measuring the amount of viral antigen by the ELISA method, a method of quantifying viral nucleic acid by PCR, a method of measuring the infectivity titer by the plaque method, and a method of measuring the infectivity titer by the 50% infectious dose measurement method. As the measurement for the antiviral performance, a method of measuring the infectivity titer by the plaque method or the 50% infectious dose measurement method is preferably used. The unit of the virus infectivity titer in the 50% infectious dose measurement method is denoted by $TCID_{50}$ (tissue culture infectious dose 50) when cultured cells are tested as a subject, $EID_{50}$ (egg infectious dose 50) when hatched eggs are used, and $LD_{50}$ (lethal dose 50) in animals. In addition, in the 50% infectious dose measurement method, there are the Reed-Muench method, the Behrens-Kaeber method, the Spearman-Karber method and the like as a method of calculating the infectivity titer from the obtained data, but the Reed-Muench method is used in this disclosure. As the criterion for the antiviral performance, in general, the antiviral performance is determined to be effective when the logarithmic reduction value of the infectivity titer is 2.0 or more compared to the infectivity titer before the resin composition is allowed to act or a control not containing the cerium oxide nanoparticle.

A fiber material containing the cerium oxide nanoparticle can be obtained by a method of immobilizing the cerium oxide nanoparticle on a fiber base material, or a method of spinning using a resin composition in which the cerium oxide nanoparticle is mixed. The method of immobilizing the cerium oxide nanoparticle on a fiber base material is preferable because the cerium oxide nanoparticle is exposed on the surface of the obtained fiber material, and the antiviral performance and the antibacterial performance are easily exhibited.

Preferred examples of the method of immobilizing the cerium oxide nanoparticle on a fiber base material include a method in which a dispersion solution containing the cerium oxide nanoparticle is immobilized on a fiber base material serving as a base by a dipping method, a spraying method, a coating method or the like using a coating apparatus on-line or off-line. Examples of the coating apparatus include a mangle, a spray, a size press coater, a kiss roll coater, a blade coater, a bar coater, an air knife coater, a kiss die coater, a slit die coater, and a gravure coater.

When the cerium oxide nanoparticle is immobilized on the fiber base material described above, it is preferable to add, to the dispersion solution, a binder component serving as an adhesive to the fiber base material because falling off of the cerium oxide nanoparticle from the fiber base material can be suppressed.

Examples of the binder component include acrylic resin, epoxy resin, melamine resin, urethane resin, polyamide resin, polyimide resin, polyester resin, urea resin, phenol resin, silicone resin, vinyl chloride resin, fluororesin, and non-fluorine-based water-repellent resin, but are not limited thereto and any binder component can be preferably applied. Examples of the non-fluorine-based water-repellent resin include hydrocarbon-based urethane resin and hydrocarbon-based acrylic resin.

Among them, in particular, when the fiber base material containing the cerium oxide nanoparticle is used as a protective clothing fabric, the binder component is preferably polyamide resin or non-fluorine-based water-repellent resin. When the polyamide resin is used as the binder component, the antistatic properties of the fiber base material containing the cerium oxide nanoparticle are improved. When the hydrocarbon-based water-repellent resin is used, a decrease in the water pressure resistance of the fiber base material containing the cerium oxide nanoparticle due to resin processing on the fiber base material can be suppressed.

The ionicity of the binder component is preferably cationic or nonionic, and more preferably cationic. When the binder component is cationic or nonionic, the stability of the dispersion solution is improved at the time of mixing the binder component with the cerium oxide nanoparticle.

In particular, when the fiber base material containing the cerium oxide nanoparticle is used as a protective clothing fabric, the mass mixing ratio of the binder component to the cerium oxide nanoparticle (binder component/cerium oxide nanoparticle) is preferably 0.35 or more and 1.45 or less. When the mixing ratio of the binder component to the cerium oxide nanoparticle (binder component/cerium oxide nanoparticle) is 0.35 or more, falling off of the cerium oxide nanoparticle from the fiber base material can be suppressed. On the other hand, when the mixing ratio of the binder component to the cerium oxide nanoparticle (binder component/cerium oxide nanoparticle) is 1.45 or less, the cerium oxide nanoparticle is exposed on the surface of the obtained fiber material so that the antiviral performance and the antibacterial performance are easily exhibited.

When the binder component is added to immobilize the cerium oxide nanoparticle on the above-described fiber base material, it is preferable to add a crosslinking agent because falling off of the cerium oxide nanoparticle from the protective clothing using the fiber base material containing the cerium oxide nanoparticle can be suppressed. Since falling off of the cerium oxide nanoparticle is suppressed from the protective clothing, the antiviral performance of the protective clothing is excellent. Examples of the type of the crosslinking agent include melamine resin, oxazoline resin, urea resin, phenol resin, epoxy resin, and blocked isocyanate, but are not limited thereto and any crosslinking agent can be preferably applied.

When the cerium oxide nanoparticle is immobilized on the fiber base material described above, an additive for controlling the dispersibility and viscosity of the cerium oxide nanoparticle may be added to the dispersion solution.

As the additive, a surfactant is preferable, and any of a cationic surfactant such as a quaternary ammonium salt, an anionic surfactant such as a higher fatty acid salt or an alkyl sulfate ester salt, an amphoteric surfactant such as an alkyl betaine, and a nonionic surfactant such as a polyoxyethylene sorbitan fatty acid salt or a polyoxyethylene alkyl ether can be applied, but a cationic surfactant and a nonionic surfactant are more preferable.

The mixing ratio of the additive to the cerium oxide nanoparticle can be optionally adjusted without any particular limitation as long as the antiviral performance and the antibacterial performance are not significantly impaired. On the other hand, when the water pressure resistance is required for the fiber base material containing the cerium oxide nanoparticle such as a fabric used for protective clothing, the mixing ratio of the surfactant to the cerium oxide nanoparticle (surfactant/cerium oxide nanoparticle) is preferably 0.02 or less, more preferably 0.01or less, and still more preferably 0.002 or less. It is particularly more preferable not to add a surfactant or the like because addition of the surfactant causes a decrease in water pressure resistance.

When the resin composition is used for spinning, the base resin is preferably a thermoplastic resin. As a spinning method, for example, the resin composition is made into a molten polymer, and the molten polymer is guided to a spinning pack via a pipe. The polymer introduced from a polymer inlet of the spinning pack passes through a filter layer including a filter medium and a filter, and is discharged from a discharge hole of a spinneret to thereby obtain fibers.

The type of the fiber base material is not limited, and may be any of a natural fiber, a synthetic fiber, and an inorganic fiber, and may be a mixed fiber or a composite fiber of two or more thereof. Examples of the natural fiber include cellulose-based fibers such as cotton, hemp, and rayon, and animal fibers such as wool, silk, and down feather, but are not limited thereto and any natural fiber can be preferably applied. Examples of the synthetic fiber include polyolefin-based fibers, polyester-based fibers, polyamide-based fibers, acrylic fibers, polyurethane-based fibers, and polyvinyl alcohol-based fibers, but are not limited thereto and any synthetic fiber can be preferably applied. Examples of the inorganic fiber include glass fibers, carbon fibers, and ceramic fibers, but are not limited thereto and any inorganic fiber can be preferably applied. In addition, the resin composition can also be preferably applied to fibers which have been processed to have a deformed cross section or a hollow structure. Examples of the fiber form include yarns, woven fabrics, and nonwoven fabrics, but are not limited thereto and any fiber form can be preferably applied.

Among them, in particular, when the fiber base material containing the cerium oxide nanoparticle is used as a protective clothing fabric, the fiber base material is preferably in the form of a nonwoven fabric from the viewpoint of excellent productivity and strength. Specific examples of the nonwoven fabric include a resin bonded dry-laid nonwoven fabric, a thermal bonded dry-laid nonwoven fabric, a spunbonded dry-laid nonwoven fabric, a melt blown dry-laid nonwoven fabric, a needle punched dry-laid nonwoven fabric, a water jet dry-laid nonwoven fabric, a flash spun dry-laid nonwoven fabric, and laminated nonwoven fabrics thereof. The nonwoven fabrics constituting the laminated nonwoven fabric is not particularly limited, and the same type of nonwoven fabrics may be laminated or different types of nonwoven fabrics may be laminated. In addition, a nonwoven fabric produced by a papermaking method capable of making the basis weight and thickness uniform can also be used as the protective clothing fabric. Among them, a laminated nonwoven fabric of a spunbonded dry-laid nonwoven fabric and a melt blown dry-laid nonwoven fabric is suitably used from the viewpoint of excellent productivity, tensile strength, tear strength, dustproofness, and flexibility. Specifically, a laminated nonwoven fabric ("SMS nonwoven fabric") obtained by laminating a spunbonded dry-laid nonwoven fabric, a melt blown dry-laid nonwoven fabric, and a spunbonded dry-laid nonwoven fabric in this order is preferable.

The fiber base material containing the cerium oxide nanoparticle may be a laminate including a film or a metal foil, and a nonwoven fabric. In the protective clothing using the laminate, the outer surface (the surface opposite to the wearer side) and the inner surface (the surface on the wearer side) are preferably constituted of a nonwoven fabric. Since the surface of the protective clothing is the nonwoven fabric, the film or the metal foil can be protected by the nonwoven fabric, and since the inner surface is the nonwoven fabric, the protective clothing has a good texture feel for the wearer. The laminated structure of the laminate may be a laminated structure consisting of two layers of a nonwoven fabric and a film or a metal foil, or may be a laminated structure consisting of four or more layers. Specific examples thereof include a laminated structure including a spunbonded dry-laid nonwoven fabric, a first film, a second film, and a spunbonded dry-laid nonwoven fabric in this order. The first film and the second film may be different from or the same as each other. Of course, the fiber base material containing the cerium oxide nanoparticle may be applied to other applications as long as the required performances are satisfied.

Specific examples of the material of the nonwoven fabric are not limited to the types of fibers exemplified above and any material can be preferably applied. Among these, a polyolefin-based resin is preferably contained as a main component, and polypropylene is preferably contained as a main component from the viewpoint of achieving excellent productivity and texture of the fabric. The main component refers to a component having the largest content among all the fiber materials constituting the nonwoven fabric. The fiber material obtained as described above and a fiber product obtained using the fiber material as a raw material are characterized by having a low coloring property.

The fiber material containing the cerium oxide nanoparticle has a water pressure resistance of preferably 500 $mmH_2O$ or more, more preferably 700 $mmH_2O$ or more, still more preferably 800 $mmH_2O$ or more, and still more preferably 1,000 $mmH_2O$ or more, particularly when used as a protective clothing fabric. When the water pressure resistance of the fiber material is within the above range, the barrier property of the protective clothing is further improved and, for example, to prevent infection by a pathogen such as viruses or bacteria, it is possible to suppress intrusion of a hazard into the inside of the protective clothing. Examples of the hazard include a liquid containing a pathogen (for example, blood or body fluid), and floating particles in the air (for example, aerosol). Of course, the fiber material containing the cerium oxide nanoparticle may be applied to other applications as long as the required performances are satisfied. To set the water pressure resistance within the above range, it is preferable to use, as the fiber base material, an SMS nonwoven fabric made of polypropylene, a laminated structure including a spunbonded dry-laid nonwoven fabric, a film, and a spunbonded dry-laid nonwoven fabric in this order, a spunbonded dry-laid nonwoven fabric, a first film, a second film, and a spunbonded dry-laid nonwoven fabric and the like. The first film and the second film may be different from or the same as each other. Since these fiber base materials have high water pressure resistance by themselves, even when the cerium oxide nanoparticle is immobilized by the above methods, the water pressure resistance within the above range can be maintained.

When the binder component is added at the time of immobilizing the cerium oxide nanoparticle on the above-described fiber base material, the content of the binder component is preferably 3 mass % or less, more preferably 2 mass % or less, and still more preferably 1 mass % or less with respect to the entire fiber base material on which the cerium oxide nanoparticle is immobilized. When the content of the binder component is within the above range, it is possible to suppress a decrease in water pressure resistance of the fiber base material on which the cerium oxide nanoparticle is immobilized.

The content of the cerium oxide nanoparticle in the entire fiber material is not particularly limited as long as harmful substances such as viruses and bacteria can be decomposed, but is preferably 0.01 mass % or more and 60 mass % or less. When the content is less than 0.01mass %, a sufficient effect is not exhibited, and when the content is more than 60 mass %, mechanical properties such as strength and durability of the fiber may be impaired, or air permeability when the fiber material is formed into a cloth may be impaired. The content is preferably 0.05 mass % or more and 50 mass % or less. The content is more preferably 0.1 mass % or more and 30 mass % or less. The content is still more preferably 3 mass % or more and 10mass % or less.

The fiber material thus obtained is characterized by exhibiting oxidative degradation performance against harmful substances such as viruses and bacteria.

For example, a fiber product such as a mask, a protective clothing, a filter, a mat, a chair, a gown, a white coat, a curtain, a sheet, an automobile interior material, or a wipe can be obtained using the fiber material as a raw material.

The fiber material containing the cerium oxide nanoparticle and the product thereof can be used as an antiviral fiber. The method and criterion for evaluating the performance as an antiviral fiber are the same as those for evaluating the antiviral performance of the resin composition and the molded article thereof.

EXAMPLES

Our nanoparticles, dispersion solutions, agents, compositions, products, materials and methods will be described more specifically by the following Examples.

Materials and Methods

Cerium (III) nitrate hexahydrate, boric acid, and a 30 mass % hydrogen peroxide aqueous solution were obtained from FUJIFILM Wako Pure Chemical Corporation, HEPES (4-(2-hydroxyethyl)-1-piperazineethanesulfonic acid) and imidazole were obtained from Tokyo Chemical Industry Co., Ltd., and poly(1-vinylimidazole) was obtained from Maruzen Petrochemical Co., Ltd. Lysine and a commercially available cerium oxide dispersion solution (796077) used in comparative example were obtained from Merck KGaA. Amicon Ultra 15 (3 kD, 10 kD, 30 kD) used for purification were purchased from Merck Millipore Corporation.

Other reagents were purchased from FUJIFILM Wako Pure Chemical Corporation, Tokyo Chemical Industry Co., Ltd., and Sigma-Aldrich Japan, and used as they were without any purification.

A zeta-potential and particle size analyzer ELSZ-2000ZS manufactured by Otsuka Electronics Co., Ltd. was used for measurement of the hydrodynamic diameter and zeta potential of the cerium oxide nanoparticle, and an ultraviolet-visible near-infrared spectrophotometer V-750 manufactured by JASCO Corporation was used for measurement of the absorbance.

The pressure during the hydrothermal treatment was derived from the saturated water vapor pressure table and the temperature.

Example 1 Production of Dispersion Solution Containing Cerium Oxide Nanoparticles Using Lysine as Stabilizer Production was performed with reference to Example 4c of US 2013/0273659 A1 except for the hydrothermal treatment. In 500 ml of water, 4.04 g of L-lysine was dissolved, and 10 g of cerium (III) nitrate hexahydrate was added thereto. The pH of the mixed solution was 6.1. Further, 10 ml of a 6% hydrogen peroxide aqueous solution was added dropwise to the mixed solution. To the resulting solution, 1 M nitric acid was added to thereby adjust the pH to 2.4, and this was reacted at 40° C. for 1 hour. The reaction solution was purified with an ultrafiltration membrane having a molecular weight cut-off of 10 kD to obtain a dispersion solution (yellow) of cerium oxide nanoparticles using lysine as a stabilizer. This dispersion solution was transferred to a pressure-resistant vessel, and subjected to a hydrothermal treatment at 120° C. (199 kPa) for 20 minutes to obtain a dispersion solution of cerium oxide nanoparticles using lysine as a stabilizer. The resulting dispersion solution was clear.

Example 2 Production of Dispersion Solution Containing Cerium Oxide Nanoparticles Using HEPES as Stabilizer Production was performed with reference to WO 2021/132643 A1 except for the hydrothermal treatment. In 200 ml of water, 0.74 g of HEPES was dissolved, and 0.40 g of cerium (III) nitrate hexahydrate was added thereto. After the pH of the mixed solution was adjusted to 7.0, 4 ml of a 1.2% hydrogen peroxide aqueous solution was added dropwise thereto, and this was reacted at room temperature for 1 hour to obtain an orange aqueous solution. To the resulting solution, 1 M nitric acid was added to thereby adjust the pH to 2.3, and the reaction solution was purified with an ultrafiltration membrane having a molecular weight cut-off of 10 kD to obtain a dispersion solution (orange) of cerium oxide nanoparticles using HEPES as a stabilizer. This dispersion solution was transferred to a pressure-resistant vessel and subjected to a hydrothermal treatment at 120°° C. (199 kPa) for 20 minutes to obtain a dispersion solution of cerium oxide nanoparticles using HEPES as a stabilizer. The resulting dispersion solution was clear.

Example 3 Production of Dispersion Solution Containing Cerium Oxide Nanoparticles Using Imidazole as Stabilizer Production was performed with reference to WO 2021/132628 A1 except for the hydrothermal treatment. A reaction was performed under the same conditions as in Example 2 except that the stabilizer was changed to 0.20 g of imidazole in Example 2, to thereby obtain a dispersion solution of cerium oxide nanoparticles using imidazole as a stabilizer. The resulting dispersion solution was clear.

Example 4 Production of Dispersion Solution Containing Cerium Oxide Nanoparticles Using poly(1-vinylimidazole) as Stabilizer Production was performed with reference to WO 2020/129963 A1 except for the hydrothermal treatment. As an aqueous solution of a polymer having an imidazole skeleton which is a heterocyclic amine skeleton, a 0.1 mass % poly(1-vinylimidazole) aqueous solution was used. To 500 ml of the 0.1 mass % poly(1-vinylimidazole) aqueous solution, 10 ml of a 10 mass % cerium (III) nitrate hexahydrate aqueous solution was added, and the mixed solution was stirred at room temperature for 5 minutes. Thereafter, 10 ml of a 1.2 mass % hydrogen peroxide aqueous solution was added, and this was heated to 60° C. to perform reaction for 1 hour, thereby obtaining an orange aqueous solution. The reaction solution was purified with a 30 kD ultrafiltration membrane to obtain a dispersion solution (orange) of cerium oxide nanoparticles using poly(1-vinylimidazole) as a stabilizer. This dispersion solution was transferred to a pressure-resistant vessel and subjected to a hydrothermal treatment at 120° C. (199 kPa) for 20 minutes to obtain a dispersion solution of cerium oxide nanoparticles using imidazole as a stabilizer. The resulting dispersion solution was clear.

Example 5 Production of Dispersion Solution Containing Cerium Oxide Nanoparticles Using Boric Acid as Stabilizer In 500 ml of water, 2.8 g of boric acid was dissolved, and the pH of the mixed solution was adjusted to 8.0 with sodium hydroxide. To the resulting solution, 1 g of cerium (III) nitrate hexahydrate was added. Then, 10 ml of a 1.2% hydrogen peroxide aqueous solution was added dropwise to the solution to obtain an orange aqueous solution. To the resulting solution, 1 M nitric acid was added to thereby adjust the pH to 2.0, and the reaction solution was purified with an ultrafiltration membrane having a molecular weight cut-off of 10 kD to obtain a dispersion solution (orange) of cerium oxide nanoparticles using boric acid as a stabilizer. This dispersion solution was transferred to a pressure-resistant vessel, and subjected to a hydrothermal treatment at 120° C. (199 kPa) for 20 minutes to obtain a dispersion solution of cerium oxide nanoparticles using boric acid as a stabilizer. The resulting dispersion solution was clear.

Example 6 Hydrothermal Treatment at 105° C.

A reaction was performed under the same conditions as in Example 5 except that the hydrothermal treatment was performed at 105° C. (121 kPa) for 20 minutes in Example 5, to thereby obtain a dispersion solution of cerium oxide nanoparticles using boric acid as a stabilizer. The resulting dispersion solution was clear.

Example 7 Hydrothermal Treatment at 135° C.

A reaction was performed under the same conditions as in Example 5 except that the hydrothermal treatment was performed at 135° C. (313 kPa) for 20 minutes in Example 5, to thereby obtain a dispersion solution of cerium oxide nanoparticles using boric acid as a stabilizer. The resulting dispersion solution was clear.

Comparative Example 1 Production of Dispersion Solution Containing Cerium Oxide Nanoparticles Using Lysine as Stabilizer A reaction was performed under the same conditions as in Example 1 except that the hydrothermal treatment was not performed in Example 1, to thereby obtain a dispersion solution of cerium oxide nanoparticles using lysine as a stabilizer. The color of the obtained dispersion solution was yellow.

Comparative Example 2 Production of Dispersion Solution Containing Cerium Oxide Nanoparticles Using HEPES as Stabilizer A reaction was performed under the same conditions as in Example 2 except that the hydrothermal treatment was not performed in Example 2, to thereby obtain a dispersion solution of cerium oxide nanoparticles using HEPES as a stabilizer. The color of the obtained dispersion solution was orange.

Comparative Example 3 Production of Dispersion Solution Containing Cerium Oxide Nanoparticles Using Imidazole as Stabilizer A reaction was performed under the same conditions as in Example 3 except that the hydrothermal treatment was not performed in Example 3, to thereby obtain a dispersion solution of cerium oxide nanoparticles using imidazole as a stabilizer. The color of the obtained dispersion solution was orange.

Comparative Example 4 Production of Dispersion Solution Containing Cerium Oxide Nanoparticles Using poly(1-vinylimidazole) as Stabilizer A reaction was performed under the same conditions as in Example 4 except that the hydrothermal treatment was not performed in Example 4, to thereby obtain a dispersion solution of cerium oxide nanoparticles using poly(1-vinylimidazole) as a stabilizer. The color of the obtained dispersion solution was orange.

Comparative Example 5 Production of Dispersion Solution Containing Cerium Oxide Nanoparticles Using Boric Acid as Stabilizer A reaction was performed under the same conditions as in Example 5 except that heating at 100° C. (101 kPa) was performed for 2 hours by heating under reflux instead of the hydrothermal treatment in Example 5, to thereby obtain a dispersion solution of cerium oxide nanoparticles using boric acid as a stabilizer. The color of the obtained dispersion solution was orange.

Comparative Example 6 Production of Dispersion Solution Containing Cerium Oxide Nanoparticle Using Citric Acid as Stabilizer Production was performed with reference to T. Masui et. al., *Journal of Materials Science Letters* 2002, 21, 489. Five ml of a 1 M cerium (III) chloride aqueous solution and 5 ml of a 1 M citric acid aqueous solution were mixed, and the mixed solution was added dropwise to 50 ml of a 3 M ammonia aqueous solution. The resulting solution was reacted at 50° C. for 24 hours to obtain a brown aqueous solution. The reaction solution was purified with a 3 kD ultrafiltration membrane to obtain a dispersion solution of cerium oxide nanoparticles using citric acid as a stabilizer. The color of the obtained dispersion solution was brown. This dispersion solution was transferred to a pressure-resistant vessel, and subjected to a hydrothermal treatment at 120° C. (199 kPa) for 20 minutes. The color of the obtained dispersion solution was brown. Comparative Example 7 Production of dispersion solution containing cerium oxide nanoparticles using dextran as stabilizer Production was performed with reference to E. Alpaslan et. al., *Scientific Reports* 2017, 7:45859. One ml of 1 M cerium nitrate (III) and 2 ml of 0.1 M dextran (10 kD) were mixed, and the mixture was added dropwise to 6 ml of a 30% ammonia aqueous solution. The resulting solution was reacted at room temperature for 24 hours to obtain a brown aqueous solution. The reaction solution was purified with a 10 kD ultrafiltration membrane to obtain a dispersion solution of cerium oxide nanoparticles using dextran as a stabilizer. The color of the obtained dispersion solution was brown. This dispersion solution was transferred to a pressure-resistant vessel, and subjected to a hydrothermal treatment at 120° C. (199 kPa) for 20 minutes. The color of the obtained dispersion solution was brown.

Example 8 Measurement of Hydrodynamic Diameter of Dispersion Solution Containing Cerium Oxide Nanoparticles The hydrodynamic diameter of each of the cerium oxide nanoparticles produced in Examples 1 to 7 was measured by dynamic light scattering (DLS). Water was used as a solvent for the measurement, and the average particle size of the hydrodynamic diameter was obtained in terms of number conversion. The obtained values are shown in Table 1.

The average particle size was 8.0 to 40.3 nm, and we confirmed that all the particles are nanoparticles.

TABLE 1

| Dispersion solution | | Hydrothermal | Example 8 Particle |
|---|---|---|---|
| Synthesis | Stabilizer | temperature | size [nm] |
| Example 1 | Lysine | 120° C. | 8.0 ± 2.0 |
| Example 2 | HEPES | 120° C. | 18.1 ± 4.7 |
| Example 3 | Imidazole | 120° C. | 40.3 ± 15.6 |
| Example 4 | Poly(1-vinylimidazole) | 120° C. | 13.5 ± 3.1 |
| Example 5 | Boric acid | 120° C. | 12.0 ± 2.7 |
| Example 6 | Boric acid | 105° C. | 11.7 ± 2.7 |
| Example 7 | Boric acid | 135° C. | 11.7 ± 2.7 |

Example 9 Measurement of APHA of Dispersion Solution Containing Cerium Oxide Nanoparticles The cerium oxide nanoparticles produced in Examples 1 to 7 were prepared to a 1 mass % dispersion solution, and the APHA thereof was measured. The results are shown in Table 2.

The APHA was 131 to 192, and we confirmed that all the nanoparticles have a low coloring property.

TABLE 2

| Dispersion solution | | Hydrothermal | Example 9 APHA of 1% dispersion |
|---|---|---|---|
| Synthesis | Stabilizer | temperature | solution |
| Example 1 | Lysine | 120° C. | 184 |
| Example 2 | HEPES | 120° C. | 192 |
| Example 3 | Imidazole | 120° C. | 191 |
| Example 4 | Poly(1-vinylimidazole) | 120° C. | 181 |
| Example 5 | Boric acid | 120° C. | 180 |
| Example 6 | Boric acid | 105° C. | 182 |
| Example 7 | Boric acid | 135° C. | 131 |

Comparative Example 8 Measurement of APHA of Dispersion Solution Containing Cerium Oxide Nanoparticles The APHA of each of the aqueous dispersions of the cerium oxide nanoparticles produced in Comparative Examples 1 to 7 and the aqueous dispersion of commercially available cerium oxide (Merck KGaA, 796077) as Reference Example 1 was measured. The results are shown in Table 3.

The APHA was 402 or more, and we confirmed that all the nanoparticles have a high coloring property.

TABLE 3

| Dispersion solution | | Hydro-thermal temper- | Comparative Example 8 APHA of 1% dispersion |
|---|---|---|---|
| Synthesis | Stabilizer | ature | solution |
| Comparative Example 1 | Lysine | — | 500 or more |
| Comparative Example 2 | HEPES | — | 500 or more |
| Comparative Example 3 | Imidazole | — | 500 or more |
| Comparative Example 4 | Poly (1-vinylimidazole) | — | 500 or more |
| Comparative Example 5 | Boric acid | — | 500 or more |
| Comparative Example 6 | Citric acid | 120° C. | 490 |
| Comparative Example 7 | Dextran | 120° C. | 500 or more |
| Reference Example 1 | Commercial product (5 nm or less) | — | 402 |

Example 10 Measurement of Zeta Potential of Dispersion Solution Containing Cerium Oxide Nanoparticles The zeta potential of each of the cerium oxide nanoparticles produced in Examples 1 to 7 was measured. Water was used as a solvent for measurement, and the pH of each sample was adjusted to 7 with nitric acid or sodium hydroxide. The obtained values are shown in Table 4.

The zeta potential was +37.4 to 45.8 mV, and we confirmed that all the nanoparticles have a high positive charge.

TABLE 4

| Dispersion solution | | Hydrothermal | Example 10 Zeta potential |
|---|---|---|---|
| Synthesis | Stabilizer | temperature | (pH 7) |
| Example 1 | Lysine | 120° C. | +37.4 mV |
| Example 2 | HEPES | 120° C. | +39.3 mV |
| Example 3 | Imidazole | 120° C. | +39.1 mV |

TABLE 4-continued

| Dispersion solution | | Hydrothermal | Example 10 Zeta potential |
|---|---|---|---|
| Synthesis | Stabilizer | temperature | (pH 7) |
| Example 4 | Poly(1-vinylimidazole) | 120° C. | +45.8 mV |
| Example 5 | Boric acid | 120° C. | +45.1 mV |
| Example 6 | Boric acid | 105° C. | +41.2 mV |
| Example 7 | Boric acid | 135° C. | +45.6 mV |

Comparative Example 9 Measurement of Zeta Potential of Dispersion Solution Containing Cerium Oxide Nanoparticles The zeta potential of each of the cerium oxide nanoparticles produced in Comparative Examples 6 and 7 was measured. Water was used as a solvent for measurement, and the pH of each sample was adjusted to 7 with nitric acid or sodium hydroxide. The obtained values are shown in Table 5.

The zeta potentials were −31.6 and +5.0 mV, respectively, and we confirmed that both nanoparticles are negatively charged or weakly positively charged.

TABLE 5

| Dispersion solution | | Hydrothermal | Comparative Example 9 Zeta potential |
|---|---|---|---|
| Synthesis | Stabilizer | temperature | (pH 7) |
| Comparative Example 6 | Citric acid | 120° C. | −31.6 mV |
| Comparative Example 7 | Dextran | 120° C. | +5.0 mV |

Example 11 XAFS Analysis of Dispersion Solution Containing Cerium Oxide Nanoparticles The X-ray absorption fine structure spectrum was measured by irradiating, with X-rays, each of the dispersion solutions of the cerium oxide nanoparticles produced in Examples 1 to 5, which have been adjusted to a concentration of 10 mg/ml, and measuring the absorption thereof. Measurement was performed using the Photon Factory BL12C of the High Energy Accelerator Research Organization as an experimental facility, a Si(111) double crystal spectrometer as a spectrometer, a Ce L3 absorption edge as an absorption edge, a transmission method as a detection method, and an ion chamber as a detector.

The Ce L3 edge XANES spectra of the cerium oxide nanoparticles produced in Examples 1 to 5 are illustrated in FIGS. 3 to 7. The vertical axis was set by taking the ratio with 5724.4 eV in the spectrum as the absorption edge (E0), the average value of absorption of −150 to −30 eV from E0 as 0, and the average value of absorption of +150 to +400 eV from E0 as 1.

From the results, we found that the nanoparticles of Example 1 have maximum absorptions at 5,729.598 eV and 5,736.424 eV, the nanoparticles of Example 2 have maximum absorptions at 5,729.588 eV and 5,736.424 eV, the nanoparticles of Example 3 have maximum absorptions at 5,729.588 eV and 5,736.263 eV, the nanoparticles of Example 4 have maximum absorptions at 5,729.433 eV and 5,736.424 eV, the nanoparticles of Example 5 have maximum absorptions at 5,729.598 eV and 5,736.287 eV, and the nanoparticles of Examples 1 to 5 have maximum absorptions of more than 5,729 eV and 5,731 eV or less and 5,735 eV or more and 5,739 eV or less.

Comparative Example 10 XAFS Analysis of Dispersion Solution Containing Cerium Oxide Nanoparticles As a comparison with Example 11, the cerium oxide nanoparticles of Comparative Examples 1 to 5 were measured. The Ce L3 edge XANES spectra of the cerium oxide nanoparticles produced in Comparative Examples 1 to 5 are illustrated in FIGS. 3 to 7.

From the results, we found that the nanoparticles of Comparative Example 1 have maximum absorptions at 5,727.705 eV and 5,736.964 eV, the nanoparticles of Comparative Example 2 have maximum absorptions at 5,727.990 eV and 5,736.570 eV, the nanoparticles of Comparative Example 3 have maximum absorptions at 5,728.003 eV and 5,736.263 eV, the nanoparticles of Comparative Example 4 have maximum absorptions at 5,728.003 eV and 5,736.582 eV, the nanoparticles of Comparative Example 5 have maximum absorptions at 5,727.974 eV and 5,736.964 eV, and the nanoparticles of Comparative Examples 1 to 5 have maximum absorptions between 5,735 to 5,739 eV, but do not have maximum absorptions of more than 5,729 eV and 5,731 eV or less.

Example 12 Measurement of molar ratio of $Ce^{4+}$ to $Ce^{3+}$ by XPS

The molar ratio of $Ce^{4+}$ to $Ce^{3+}$ of each of the cerium oxide nanoparticles obtained in Examples 1 to 7 was measured by X-ray photoelectron spectroscopy (XPS). In the measurement, the excited X-ray was a monocheomatic $AlK_{\alpha 1,2}$ ray (1486.6 eV), the X-ray diameter was set to 200 um, and the photoelectron escape angle was set to 45°. In the obtained spectrum, the horizontal axis correction was performed so that the main peak of $Ce^{4+}$ in $Ce3d_{5/2}$ was set to 881.8 eV. In the measurement of the cerium oxide nanoparticles produced in Examples 1 to 7, a dried powder obtained by freeze-drying the dispersion solution of the cerium oxide nanoparticles after purification was used. The obtained values are shown in Table 6.

From the results, we found that, in the cerium oxide nanoparticles produced in Examples 1 to 7, the molar ratio of $Ce^{4+}$ to $Ce^{3+}$ is 65:35 to 95:5, and the ratio of $Ce^{4+}$ is high.

In addition, from these results and Example 11, we found that the nanoparticles with improved coloring property have maximum absorptions of more than 5,729 eV and 5,731 eV or less and 5,735 eV or more and 5,739 eV or less in the Ce L3 edge XANES spectrum obtained by measurement of the X-ray absorption fine structure spectrum, and have a molar ratio of $Ce^{4+}$ to $Ce^{3+}$ of 40:60 to 100:0.

TABLE 6

| Dispersion solution | | Hydrothermal | Example 12 |
|---|---|---|---|
| Synthesis | Stabilizer | temperature | $Ce^{4+}$:$Ce^{3+}$ |
| Example 1 | Lysine | 120° C. | 83:17 |
| Example 2 | HEPES | 120° C. | 78:22 |
| Example 3 | Imidazole | 120° C. | 67:33 |
| Example 4 | Poly(1-vinylimidazole) | 120° C. | 65:35 |
| Example 5 | Boric acid | 120° C. | 91:9 |
| Example 6 | Boric acid | 105° C. | 95:5 |
| Example 7 | Boric acid | 135° C. | 90:10 |

Comparative Example 11 Measurement of molar ratio of $Ce^{4+}$ to $Ce^{3+}$ by XPS The molar ratio of $Ce^{4+}$ to $Ce^{3+}$ of each of the cerium oxide nanoparticles obtained in Comparative Examples 4 to 7 and the commercial product (Merck KGaA, 796077) as Reference Example 1 was measured by X-ray photoelectron spectroscopy (XPS). The measurement was performed under the same conditions as in Example 11. The obtained values are shown in Table 7.

From the results, we found that, in the cerium oxide nanoparticles of Comparative Examples 6 and 7 and the commercial product (Merck KGaA, 796077), the molar ratio of $Ce^{4+}$ to $Ce^{3+}$ is 7:93 to 39:61, and the ratio of $Ce^{4+}$ is low.

From the results and Comparative Example 10, we found that the cerium oxide nanoparticles of Comparative Examples 4 and 5, which have a coloring property, have a molar ratio of $Ce^{4+}$ to $Ce^{3+}$ of 40:60 to 100:0, and have maximum absorptions of 5,735 eV or more and 5,739 eV or less in the Ce L3 edge XANES spectrum obtained by measurement of the X-ray absorption fine structure spectrum, but do not have maximum absorptions of more than 5,729 eV and 5,731 eV or less.

TABLE 7

| Dispersion solution | | Hydro-thermal temper-ature | Comparative Example 11 |
|---|---|---|---|
| Synthesis | Stabilizer | | $Ce^{4+}$:$Ce^{3+}$ |
| Comparative Example 4 | Poly(1-vinylimidazole) | — | 64:37 |
| Comparative Example 5 | Boric acid | — | 99:1 |
| Comparative Example 6 | Citric acid | 120° C. | 7:93 |
| Comparative Example 7 | Dextran | 120° C. | 35:65 |
| Reference Example 1 | Commercial product (5 nm or less) | — | 39:61 |

Example 13 XRD Analysis of Cerium Oxide Nanoparticles

Each of the dispersion solutions of the cerium oxide nanoparticles produced in Examples 1 to 5, which have been adjusted to a concentration of 100 mg/ml, was measured by X-ray diffraction (XRD). As measurement conditions, a CuKα ray was used as a light source, the output was 40 kV and 40 mA, LynxEye was used as a detector, and the measurement range was 2θ=5 to 80°. The obtained XRD spectra are illustrated in FIGS. 8 to 12, and the peak intensity ratio of the peak intensity at 27° to 29° to the peak intensity at 46° to 48° is shown in Table 8.

From the results, we found that the nanoparticles of Example 1 have diffraction peaks at 2θ=28.360°, 32.899°, 47.400°, and 56.119°, the nanoparticles of Example 2 have diffraction peaks at 2θ=28.360°, 32.761°, 47.400°, and 56.340°, the nanoparticles of Example 3 have diffraction peaks at 2θ=28.400°, 32.960°, 47.240°, and 56.100°, the nanoparticles of Example 4 have diffraction peaks at 2θ=, 28.440°, 32.979°, 47.260°, and 56.140°, and the nanoparticles of Example 5 have diffraction peaks at 2θ=28.380°, 32.840°, 47.241°, and 55.861°. From the results, we found that the cerium oxide nanoparticles have diffraction peaks at Bragg angles 2θ of 27° to 29°, 31° to 33°, 46° to 48°, and 55° to 57°, respectively in the XRD spectrum.

In addition, we found that, in the obtained XRD spectra of the nanoparticles of Examples 1 to 5, the peak intensity ratio of the peak intensity at 27° to 29° to the peak intensity at 46° to 48° is 0.89 to 1.6.

Therefore, we found that the nanoparticles with improved coloring property have diffraction peaks at Bragg angles (2θ) of 27° to 29°, 31° to 33°, 46° to 48°, and 55° to 57° in the XRD spectrum, and have a peak intensity ratio of the peak intensity at 27° to 29° to the peak intensity at 46° to 48° of 1.8 or less.

TABLE 8

| Dispersion solution | | Hydrothermal | Example 13 Peak intensity ratio in |
|---|---|---|---|
| Synthesis | Stabilizer | temperature | XRD |
| Example 1 | Lysine | 120° C. | 1.3 |
| Example 2 | HEPES | 120° C. | 1.4 |
| Example 3 | Imidazole | 120° C. | 1.3 |
| Example 4 | Poly(1-vinylimidazole) | 120° C. | 0.89 |
| Example 5 | Boric acid | 120° C. | 1.6 |

Comparative Example 12 XRD Analysis of Cerium Oxide Nanoparticles

As a comparison with Example 13, the cerium oxide nanoparticles of Comparative Examples 1 to 7 and the commercial product (Merck KGaA, 796077) as Reference Example 1 were measured. The obtained XRD spectra are illustrated in FIGS. 13 to 20. From the results, we found that the nanoparticles of Comparative Examples 1 to 5 have diffraction patterns different from those of the nanoparticles of Examples 1 to 5.

In addition, in Comparative Examples 6 and 7 and the commercial product (Merck KGaA, 796077), the peak intensity ratio of the peak intensity at 27° to 29° to the peak intensity at 46° to 48° was calculated from the above-described measurement, and is shown in Table 9. In addition, for the cerium oxide nanoparticles described in FIG. 1 of US 2013/0273659, the peak intensity ratio of the peak intensity at 27° to 29° to the peak intensity at 46° to 48° was calculated from the disclosed spectrum, and is shown in Table 9.

From the results, we found that these nanoparticles have a peak intensity ratio of the peak intensity at 27° to 29° to the peak intensity at 46° to 48° of 1.9 or more.

TABLE 9

| Dispersion solution | | Hydro-thermal temper-ature | Comparative Example 12 Peak intensity ratio in XRD |
|---|---|---|---|
| Synthesis | Stabilizer | | |
| Comparative Example 6 | Citric acid | 120° C. | 2.0 |
| Comparative Example 7 | Dextran | 120° C. | 2.1 |
| Reference Example 1 | Commercial product (5 nm or less) | — | 2.3 |

Example 14 Virus Inactivation Test

A virus solution (0.1 ml, influenza virus, ATCC, VR-1679, influenza A virus (H3N2)) was mixed with 0.9 ml of each of the dispersion solutions of the cerium oxide nanoparticles produced in Examples 1 to 5, which have been adjusted to a concentration of 0.56 mg/ml, and the resulting mixture was allowed to act for 1 hour. Thereafter, a PBS (phosphate buffered saline) was added as a stop solution to stop the action on the virus. The infectivity titer was measured by the plaque measurement method using this solution as a stock solution of the sample for virus infectivity titer measurement. The logarithmic reduction value of the infectivity titer with respect to the infectivity titer before the cerium oxide nanoparticle is allowed to act is shown as the antiviral activity value in Table 10.

From the results, the antiviral activity value of the cerium oxide nanoparticles of Examples 1 to 5 was 2.7 to 4.5, and the antiviral activity was confirmed.

TABLE 10

| Dispersion solution | | Hydro-thermal temper-ature | Example 14 Antiviral activity | Example 15 Antibacterial activity |
|---|---|---|---|---|
| Synthesis | Stabilizer | | | |
| Example 1 | Lysine | Yes | 2.7 | 2.0 |
| Example 2 | HEPES | Yes | 3.4 | 2.5 |
| Example 3 | Imidazole | Yes | 3.8 | 2.8 |
| Example 4 | Poly (1-vinylimidazole) | Yes | 3.2 | 2.7 |
| Example 5 | Boric acid | Yes | 4.5 | 3.7 |

Comparative Example 13 Virus Inactivation Test

A reaction was performed under the same conditions as in Example 14 except that the cerium oxide nanoparticles produced in Comparative Examples 1 to 5 were used, to thereby perform a virus inactivation test. The obtained values are shown in Table 11.

From the results, we found that when the hydrothermal treatment is not performed, the antiviral activity value of the cerium oxide nanoparticle is 1.9 to 3.0, and the cerium oxide nanoparticle has an antiviral activity, but its activity is lower than that of the cerium oxide nanoparticle subjected to the hydrothermal treatment.

TABLE 11

| Dispersion solution | | Hydro-thermal temper-ature | Comparative Example 13 Antiviral activity | Comparative Example 14 Antibacterial activity |
|---|---|---|---|---|
| Synthesis | Stabilizer | | | |
| Comparative Example 1 | Lysine | No | 1.9 | 1.4 |
| Comparative Example 2 | HEPES | No | 2.0 | 2.0 |
| Comparative Example 3 | Imidazole | No | 2.1 | 2.0 |
| Comparative Example 4 | Poly (1-vinylimidazole) | No | 2.3 | 2.2 |
| Comparative Example 5 | Boric acid | No | 3.0 | 2.2 |

Example 15 Antibacterial Test

*Escherichia coli* precultured in an LB medium were suspended in a bacteria preparation solution (0.1% tryptone, 0.85% NaCl) to prepare a bacterial suspension having a concentration of 108 CFU/ml. Then, 0.1 ml of this bacterial suspension and 0.9 ml of each of the dispersion solutions of cerium oxide nanoparticles produced in Examples 1 to 5, which have been adjusted to a concentration of 0.11 mg/ml, were mixed, and the resulting mixture was allowed to stand at room temperature for one hour. Thereafter, a dilution series was prepared using this mixed solution as a stock solution, and this was seeded on a LB agar medium, and the number of colonies was counted. The logarithmic reduction value of the number of colonies with respect to the number of colonies before the cerium oxide nanoparticle is allowed to act is shown as the antibacterial activity value in Table 10.

From these results, the antibacterial activity value of the cerium oxide nanoparticles of Examples 1 to 5 was 2.0 to 3.7, and the antibacterial activity was confirmed.

Comparative Example 14 Antibacterial Test

A reaction was performed under the same conditions as in Example 15 except that the cerium oxide nanoparticles produced in Comparative Examples 1 to 5 were used, to thereby perform an antibacterial test. The obtained values are shown in Table 11.

From the results, we found that when the hydrothermal treatment is not performed, the antibacterial activity value of the cerium oxide nanoparticle is 1.4 to 2.2, and the cerium oxide nanoparticle has an antibacterial activity, but its activity is lower than that of the cerium oxide nanoparticle subjected to the hydrothermal treatment.

Example 16

A resin composition was obtained by blending 97 parts by mass of ABS resin pellets (general-purpose resin "TOYOLAC (registered trademark)" 100 322 manufactured by Toray Industries, Inc.), 3 parts by mass of the cerium oxide nanoparticles produced in Example 5, and 0.5 parts by mass of pure water as a spreader, mixing the blend at 23° C. for 60 seconds using a Henschel mixer, and then melt-kneading the obtained mixture at an extrusion temperature of 230° C. and extruding the mixture into a string using an extruder with a 40 mmϕ vent, followed by pelletizing. Next, the obtained pellets were molded into a square sheet having a thickness of 3 mm by an injection molding machine set at a cylinder temperature of 230° C. As the color tone of the obtained square sheet, the YI value was measured as the yellowness index (YI) using a color computer manufactured by Suga Test Instruments Co., Ltd. The virus inactivation test was performed by the following method. The molded article of the resin composition prepared as a square sheet of 50 mm×50 mm× 1 mm was placed on a moisturizing petri dish. Onto the molded article of the resin composition, 0.4 ml of a virus solution (feline calicivirus F-9, ATCC, VR-782, substitute for norovirus) was dropped, and this was allowed to act for 24 hours in a state in which a 4 cm×4 cm PP film was placed thereon. Thereafter, a PBS was added as a stop solution to stop the action on the virus, and the virus on the molded article of the resin composition was washed out and recovered. Using the recovered solution as a stock solution of the sample for virus infectivity titer measurement, the infectivity titer was measured by the TCID50 method.

The antiviral property was evaluated by using, as a virus inactivation index, a difference between the common logarithm value of the infectivity titer of the virus in a test using the molded article of the resin composition and the common logarithm value of the infectivity titer of the virus in a test using a resin composition (blank) not containing the cerium oxide nanoparticle. A larger virus inactivation index indicates a higher antiviral property. Specifically, a logarithmic reduction value of the infectivity titer (virus inactivity index) of 2.0 or more was determined to be effective in antiviral performance.

The evaluation results are shown in Table 12.

Example 17

A resin composition was obtained in the same manner as in Example 16 except that 97 parts by mass of ABS resin pellets (durable anti-static resin "TOYOLACPAREL (registered trademark)" TP10 manufactured by Toray Industries, Inc.), 3 parts by mass of the cerium oxide nanoparticles produced in Example 5, and 0.5 parts by mass of pure water as a spreader were blended. The evaluation results are shown in Table 12.

Example 18

A resin composition was obtained in the same manner as in Example 16 except that 90 parts by mass of ABS resin pellets (durable anti-static resin "TOYOLACPAREL (registered trademark)" TP10 manufactured by Toray Industries, Inc.), 10 parts by mass of the cerium oxide nanoparticles produced in Example 5, and 0.5 parts by mass of pure water as a spreader were blended. The evaluation results are shown in Table 12.

Example 19

A resin composition was obtained by blending 97 parts by mass of nylon 6 resin pellets (manufactured by Toray Industries, Inc.) and 3 parts by mass of the cerium oxide nanoparticles produced in Example 5, melt-kneading the blend at an extrusion temperature of 250° C., and then extruding the mixture into a string using an extruder with a 40 mmϕ vent, followed by pelletizing. Next, the obtained pellets were molded into a square sheet having a thickness of 3 mm using an injection molding machine set at a cylinder temperature of 250° C. As the color tone of the obtained square sheet, the YI value was measured as the yellowness index (YI) using a color computer manufactured by Suga Test Instruments Co., Ltd. The antiviral performance of the obtained resin composition was measured by the method described above. The evaluation results are shown in Table 12.

Example 20

A resin composition was obtained in the same manner as in Example 19 except that 90 parts by mass of nylon 6 resin pellets (manufactured by Toray Industries, Inc.) and 10 parts by mass of the cerium oxide nanoparticles produced in Example 5 were blended. The evaluation results are shown in Table 12.

Example 21

A resin composition was obtained by blending 97 parts by mass of polybutylene terephthalate (PBT) resin pellets (manufactured by Toray Industries, Inc.) and 3 parts by mass of the cerium oxide nanoparticles produced in Example 5, and melt-kneading the blend at an extrusion temperature of 250° C. and extruding the mixture into a string using an extruder with a 40 mmϕ vent, followed by pelletizing. Next, the obtained pellets were molded into a square sheet having a thickness of 3 mm by an injection molding machine set at a cylinder temperature of 250° C. As the color tone of the obtained square sheet, the YI value was measured as the yellowness index (YI) using a color computer manufactured by Suga Test Instruments Co., Ltd. The antiviral performance of the obtained resin composition was measured by the method described above. The evaluation results are shown in Table 12.

Example 22

A resin composition was obtained in the same manner as in Example 21 except that 90 parts by mass of polybutylene terephthalate resin (PBT) pellets (manufactured by Toray Industries, Inc.) and 10 parts by mass of the cerium oxide nanoparticles produced in Example 5 were blended. The evaluation results are shown in Table 12.

Comparative Example 15

A resin composition was obtained in the same manner as in Example 16 except that 97 parts by mass of ABS resin pellets (general-purpose resin "TOYOLAC (registered trademark)" 100 322 manufactured by Toray Industries, Inc.), 3 parts by mass of the cerium oxide nanoparticles produced in Comparative Example 5, and 0.5 parts by mass of pure water as a spreader were blended. The evaluation results are shown in Table 12.

Comparative Example 16

A resin composition was obtained in the same manner as in Example 16 except that 97 parts by mass of ABS resin pellets (durable anti-static resin "TOYOLACPAREL (registered trademark)" TP10 manufactured by Toray Industries, Inc.), 3 parts by mass of the cerium oxide nanoparticles produced in Comparative Example 5, and 0.5 parts by mass of pure water as a spreader were blended. The evaluation results are shown in Table 12.

Comparative Example 17

A resin composition was obtained in the same manner as in Example 19 except that 97 parts by mass of nylon 6 resin pellets (manufactured by Toray Industries, Inc.) and 3 parts by mass of the cerium oxide nanoparticles produced in Comparative Example 5 were blended. The evaluation results are shown in Table 12.

Comparative Example 18

A resin composition was obtained in the same manner as in Example 21 except that 97 parts by mass of polybutylene terephthalate resin pellets (manufactured by Toray Industries, Inc.) and 3 parts by mass of the cerium oxide nanoparticles produced in Comparative Example 5 were blended. The evaluation results are shown in Table 12.

TABLE 12

| | Base resin | Hydrothermal treatment | Antiviral activity | YI |
|---|---|---|---|---|
| Example 16 | ABS | Yes | 2 | 2.2 |
| Example 17 | ABS | Yes | 2.2 | 3.2 |
| Example 18 | ABS | Yes | 2.7 | 3.8 |
| Example 19 | Nylon 6 | Yes | 2 | 3 |
| Example 20 | Nylon 6 | Yes | 2.3 | 4.8 |
| Example 21 | PBT | Yes | 2 | 2.1 |
| Example 22 | PBT | Yes | 2.2 | 3.4 |
| Comparative Example 15 | ABS | No | 1.8 | 18.8 |
| Comparative Example 16 | ABS | No | 2 | 23 |

TABLE 12-continued

| | Base resin | Hydrothermal treatment | Antiviral activity | YI |
|---|---|---|---|---|
| Comparative Example 17 | Nylon 6 | No | 1.7 | 33.1 |
| Comparative Example 18 | PBT | No | 1.5 | 21.7 |

We confirmed that the resin compositions of Examples 16 to 22 have higher antiviral activity and better color tone than the resin compositions of Comparative Examples 15 to 18.

Example 23

A polypropylene spunbonded nonwoven fabric (manufactured by Toray Industries, Inc.) was cut into a 5 cm square, and immersed in an aqueous dispersion containing 1 part by mass of the cerium oxide nanoparticles produced in Example 5, 1 part by mass of a self-crosslinking acrylic binder (VONCOAT AN-1170, manufactured by DIC Corporation), and 98 parts by mass of water for 1 hour. Then, the nonwoven fabric was lightly squeezed, and then dried in an oven at 130° C. for 2 hours. The coloring of the obtained nonwoven fabric on which cerium oxide nanoparticles were immobilized was visually confirmed. The antiviral performance of the obtained nonwoven fabric was measured by the method described above. The evaluation results are shown in Table 13.

Example 24

A nonwoven fabric on which cerium oxide nanoparticles were immobilized was obtained in the same manner as in Example 23 except that an aqueous dispersion containing 5 parts by mass of the cerium oxide nanoparticles produced in Example 5, 5 parts by mass of a self-crosslinking acrylic binder (VONCOAT AN-1170, manufactured by DIC Corporation), and 90 parts by mass of water was used instead of the aqueous dispersion of Example 23. The evaluation results of the coloring and antiviral performance are shown in Table 13.

Example 25

A nonwoven fabric on which cerium oxide nanoparticles were immobilized was obtained in the same manner as in Example 23 except that a rayon nonwoven fabric (manufactured by Kuraray Kuraflex Co., Ltd.) was used instead of the polypropylene spunbonded nonwoven fabric (manufactured by Toray Industries, Inc.). The evaluation results of the coloring and antiviral performance are shown in Table 13.

Example 26

A nonwoven fabric on which cerium oxide nanoparticles were immobilized was obtained in the same manner as in Example 23 except that a rayon nonwoven fabric (manufactured by Kuraray Kuraflex Co., Ltd.) was used instead of the polypropylene spunbonded nonwoven fabric (manufactured by Toray Industries, Inc.), and an aqueous dispersion containing 5 parts by mass of the cerium oxide nanoparticles produced in Example 5, 5 parts by mass of a self-crosslinking acrylic binder (VONCOAT AN-1170, manufactured by DIC Corporation), and 90 parts by mass of water was used instead of the aqueous dispersion of Example 23. The evaluation results of the coloring and antiviral performance are shown in Table 13.

Comparative Example 19

A nonwoven fabric on which cerium oxide nanoparticles were immobilized was obtained in the same manner as in Example 23 except that an aqueous dispersion containing 1 part by mass of the cerium oxide nanoparticles produced in Comparative Example 5, 1 part by mass of a self-crosslinking acrylic binder (VONCOAT AN-1170, manufactured by DIC Corporation), and 98 parts by mass of water was used instead of the aqueous dispersion of Example 23. The evaluation results of the coloring and antiviral performance are shown in Table 13.

Comparative Example 20

A nonwoven fabric on which cerium oxide nanoparticles were immobilized was obtained in the same manner as in Example 23 except that an aqueous dispersion containing 5 parts by mass of the cerium oxide nanoparticles produced in Comparative Example 5, 5 parts by mass of a self-crosslinking acrylic binder (VONCOAT AN-1170, manufactured by DIC Corporation), and 90 parts by mass of water was used instead of the aqueous dispersion of Example 23. The evaluation results of the coloring and antiviral performance are shown in Table 13.

Comparative Example 21

A nonwoven fabric on which cerium oxide nanoparticles were immobilized was obtained in the same manner as in Example 23 except that a rayon nonwoven fabric (manufactured by Kuraray Kuraflex Co., Ltd.) was used instead of the polypropylene spunbonded nonwoven fabric (manufactured by Toray Industries, Inc.), and an aqueous dispersion containing 1 part by mass of the cerium oxide nanoparticles produced in Comparative Example 5, 1 part by mass of a self-crosslinking acrylic binder (VONCOAT AN-1170, manufactured by DIC Corporation), and 98 parts by mass of water was used instead of the aqueous dispersion of Example 23. The evaluation results of the coloring and antiviral performance are shown in Table 13.

Comparative Example 22

A nonwoven fabric on which cerium oxide nanoparticles were immobilized was obtained in the same manner as in Example 23 except that a rayon nonwoven fabric (manufactured by Kuraray Kuraflex Co., Ltd.) was used instead of the polypropylene spunbonded nonwoven fabric (manufactured by Toray Industries, Inc.), and an aqueous dispersion containing 5 parts by mass of the cerium oxide nanoparticles produced in Comparative Example 5, 5 parts by mass of a self-crosslinking acrylic binder (VONCOAT AN-1170, manufactured by DIC Corporation), and 90 parts by mass of water was used instead of the aqueous dispersion of Example 23. The evaluation results of the coloring and antiviral performance are shown in Table 13.

We confirmed that the fiber materials of Examples 23 to 26 have higher antiviral activity and no coloration than the fiber materials of Comparative Examples 19 to 22.

TABLE 13

| | Fiber base material | Hydrothermal treatment | Antiviral activity | Coloring |
|---|---|---|---|---|
| Example 23 | Polypropylene | Yes | 2.7 | No |
| Example 24 | Polypropylene | Yes | >3.0 | No |
| Example 25 | Rayon | Yes | 2.5 | No |
| Example 26 | Rayon | Yes | >3.0 | No |
| Comparative Example 19 | Polypropylene | No | 1.2 | Yes |
| Comparative Example 20 | Polypropylene | No | 1.5 | Yes |
| Comparative Example 21 | Rayon | No | 1.1 | Yes |
| Comparative Example 22 | Rayon | No | 1.6 | Yes |

Example 27

A polypropylene SMS nonwoven fabric (manufactured by Toray Industries, Inc.) having a basis weight of 65 g/$m^2$ was cut into the A4 size (298 mm×210 mm). Next, an aqueous dispersion containing 2.5 parts by mass of the cerium oxide nanoparticles produced in Example 5, 1.5 parts by mass of a self-crosslinking acrylic binder (VONCOAT AN-1170, manufactured by DIC Corporation), and 96.0 parts by mass of water was impregnated into the cut nonwoven fabric by dipping and nipping using P-215 manufactured by O-M Machinery Ltd. at a cylinder pressure of 0.2 MPa and a speed of 2.0 m/min, and then the resulting nonwoven fabric was dried using a pin tenter (manufactured by Hanayama Kogyo Co., Ltd.) at 130° C. for 2 minutes. The coloring of the obtained nonwoven fabric on which cerium oxide nanoparticles were immobilized was visually confirmed. The virus inactivation test was performed by the following method. The obtained nonwoven fabric was cut into 50 mm x 50 mm and placed on a moisturizing petri dish. Onto the obtained nonwoven fabric, 0.4 ml of a virus solution (feline calicivirus F-9, ATCC, VR-782, substitute for norovirus) was dropped, and this was allowed to act for 2 hours in a state in which a 4 cm×4 cm PP film is placed thereon. Thereafter, a PBS was added as a stop solution to stop the action on the virus, and the virus on the obtained nonwoven fabric was washed out and recovered. Using the recovered solution as a stock solution of the sample for virus infectivity titer measurement, the infectivity titer was measured by the $TCID_{50}$ method.

The antiviral property was evaluated by using, as a virus inactivation index, a difference between the common logarithm value of the infectivity titer of the virus in a test using the obtained nonwoven fabric and the common logarithm value of the infectivity titer of the virus in a test using an SMS nonwoven fabric (blank) not containing the cerium oxide nanoparticle. A larger virus inactivation index indicates a higher antiviral property. Specifically, a logarithmic reduction value of the infectivity titer (virus inactivity index) of 2.0 or more was determined to be effective in antiviral performance.

The water pressure resistance of the obtained nonwoven fabric was measured using FX-3000-IV "Hydro Tester" manufactured by TEXTEST AG in accordance with the JIS L1092 A method (low water pressure method). The evaluation results are shown in Table 14.

Example 28

A nonwoven fabric on which cerium oxide nanoparticles were immobilized was obtained in the same manner as in Example 27 except that an aqueous dispersion containing 3.3 parts by mass of the cerium oxide nanoparticles produced in Example 5, 2.0 parts by mass of a self-crosslinking acrylic binder (VONCOAT AN-1170, manufactured by DIC Corporation), and 94.7 parts by mass of water was used instead of the aqueous dispersion of Example 27. The coloring, antiviral performance, and water pressure resistance were evaluated in the same manner as in Example 27, and the evaluation results are shown in Table 14.

We confirmed that the fiber materials of Examples 27 and 28 have high antiviral activity and high water pressure resistance, and no coloration.

TABLE 14

| | Fiber base material | Hydrothermal treatment | Antiviral activity | Water pressure resistance [$mmH_2O$] | Coloring |
|---|---|---|---|---|---|
| Example 27 | Polypropylene | Yes | 2.1 | 1,050 | No |
| Example 28 | Polypropylene | Yes | 2.1 | 570 | No |

The invention claimed is:

1. A cerium oxide nanoparticle comprising a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein an APHA of a 1 mass % dispersion solution is 400 or less.

2. The cerium oxide nanoparticle according to claim 1, wherein the cerium oxide nanoparticle has a zeta potential at pH 7 of +10 mV or more.

3. The cerium oxide nanoparticle according to claim 1, wherein the cerium oxide nanoparticle has a molar ratio of $Ce^{4+}$ to $Ce^{3+}$ of 40:60 to 100:0.

4. A cerium oxide nanoparticle comprising a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein the cerium oxide nanoparticle has a maximum absorption of more than 5,729 eV and 5,731 eV or less and 5,735 to 5,739 eV in a Ce L3 edge XANES spectrum obtained by measurement of an X-ray absorption fine structure spectrum, and has a molar ratio of $Ce^{4+}$ to $Ce^{3+}$ of 40:60 to 100:0.

5. A cerium oxide nanoparticle comprising a basic amino acid, an alicyclic amine, an aromatic heterocyclic compound containing a nitrogen atom in a ring structure of the aromatic heterocyclic compound, a polymer having a heterocyclic amine skeleton, or a boron compound, as a stabilizer, wherein the cerium oxide nanoparticle has diffraction peaks at Bragg angles (2θ) of 27° to 29°, 31° to 33°, 46° to 48°, and 55° to 57° in an XRD spectrum, and has a peak intensity ratio of a peak intensity at 27° to 29° to a peak intensity at 46° to 48° of 1.8 or less.

6. The cerium oxide nanoparticle according to claim 1, wherein the alicyclic amine is represented by general formula (I):

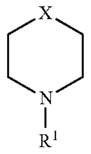

(I)

wherein X represents $NR^2$, O, or S, $R^1$ and $R^2$ represent a hydrogen atom, an alkyl group having 1to 4 carbon atoms, a hydroxyalkyl group having 1 to 4 carbon atoms, an aminoalkyl group having 1 to 4 carbon atoms, or an alkyl sulfonate group having 1 to 4 carbon atoms, and $R^1$ and $R^2$ are optionally the same or different.

7. The cerium oxide nanoparticle according to claim 1, wherein the aromatic heterocyclic compound containing the nitrogen atom in the ring structure of the aromatic heterocyclic compound is an aromatic heterocyclic compound having no substituent or having at least one substituent selected from the group consisting of a methyl group, an ethyl group, an amino group, an aminomethyl group, a monomethylamino group, a dimethylamino group, and a cyano group, and containing 2 to 8 carbon atoms and 1 to 4 nitrogen atoms in the ring structure of the aromatic heterocyclic compound.

8. The cerium oxide nanoparticle according to claim 1, wherein the polymer having the heterocyclic amine skeleton is a vinyl-based polymer having a heterocyclic amine skeleton or a polyamide having a heterocyclic amine skeleton.

9. The cerium oxide nanoparticle according to claim 1, wherein the boron compound is represented by general formula (II):

$$Br_n(OR')_{3-n} \quad \text{(II)}$$

wherein n is an integer of 0 to 2, R represents any of an alkyl group having 1 to 4 carbon atoms, a phenyl group, or a tolyl group, R' represents any of hydrogen, an alkyl group having 1 to 4 carbon atoms, a phenyl group, or a tolyl group, and when a plurality of Rs or R's are present, the plurality of Rs or R's are optionally the same or different.

10. The cerium oxide nanoparticle according to claim 1, wherein the cerium oxide nanoparticle has a particle size of 1 to 300 nm.

11. A dispersion solution comprising the cerium oxide nanoparticle according to claim 1.

12. An antiviral agent comprising the cerium oxide nanoparticle according to claim 1.

13. An antibacterial agent comprising the cerium oxide nanoparticle according to claim 1.

14. A resin composition comprising the cerium oxide nanoparticle according to claim 1.

15. A resin product comprising the resin composition according to claim 14.

16. The resin product according to claim 15, wherein the resin product is selected from the group consisting of an automobile interior material, an electrical appliance housing, a strap, a handrail, a door knob, and a partition plate.

17. A fiber material comprising the cerium oxide nanoparticle according to claim 1.

18. The fiber material according to claim 17, wherein the fiber material has a water pressure resistance of 500 $mmH_2O$ or more.

19. A fiber product comprising the fiber material according to claim 17.

20. The fiber product according to claim 19, wherein the fiber product is selected from the group consisting of a mask, a protective clothing, a filter, a mat, a chair, a gown, a white coat, a curtain, a sheet, an automobile interior material, and a wipe.

21. A method of producing a cerium oxide nanoparticle, comprising:

step a) adding an oxidizing agent to a solution containing a basic amino acid, an alicyclic amine, an aromatic heterocyclic compound containing a nitrogen atom in a ring structure of the aromatic heterocyclic compound, a polymer having a heterocyclic amine skeleton or a boron compound, and a cerium (III) ion; and step b) subjecting a solution obtained in step a) to a hydrothermal treatment.

22. The method of producing a cerium oxide nanoparticle according to claim 21, wherein an APHA of a 1 mass % dispersion solution of the cerium oxide nanoparticle is 400 or less.

* * * * *